(12) United States Patent
Stolarz

(10) Patent No.: US 6,240,421 B1
(45) Date of Patent: May 29, 2001

(54) SYSTEM, SOFTWARE AND APPARATUS FOR ORGANIZING, STORING AND RETRIEVING INFORMATION FROM A COMPUTER DATABASE

(76) Inventor: Edwin J. Stolarz, 1325 Helms Dr., Wabash, IN (US) 46992

( * ) Notice: Subject to any disclaimer, the term of this patent is extended or adjusted under 35 U.S.C. 154(b) by 0 days.

(21) Appl. No.: 09/149,724

(22) Filed: Sep. 8, 1998

(51) Int. Cl.[7] .................................................... G06F 17/00
(52) U.S. Cl. ......................... 707/102; 707/104; 707/103; 345/357; 345/419; 725/116
(58) Field of Search ..................... 707/574, 102, 707/104; 704/9; 395/159; 345/357, 419, 355, 156; 700/215; 725/116; 358/504; 382/167

(56) References Cited

U.S. PATENT DOCUMENTS

| | | | |
|---|---|---|---|
| 5,065,347 | * 11/1991 | Pajak et al. | 395/159 |
| 5,157,783 | 10/1992 | Anderson et al. | 395/600 |
| 5,159,180 | 10/1992 | Feiler | 235/375 |
| 5,182,705 | 1/1993 | Barr et al. | 364/401 |
| 5,251,294 | 10/1993 | Abelow | 395/155 |
| 5,369,508 | 11/1994 | Lech et al. | 358/462 |
| 5,381,158 | * 1/1995 | Takahara et al. | 345/156 |
| 5,448,375 | 9/1995 | Cooper et al. | 358/403 |
| 5,452,468 | * 9/1995 | Peterson | 395/800 |
| 5,495,607 | * 2/1996 | Pisello et al. | 707/10 |
| 5,555,354 | 9/1996 | Strasnick et al. | 395/127 |
| 5,557,515 | 9/1996 | Abbruzzese et al. | 364/401 R |
| 5,590,259 | 12/1996 | Anderson et al. | 395/764 |
| 5,596,502 | 1/1997 | Koski et al. | 364/468.01 |
| 5,608,899 | 3/1997 | Li et al. | 395/604 |
| 5,608,900 | 3/1997 | Dockter et al. | 395/613 |
| 5,794,178 | * 8/1998 | Caid et al. | 704/9 |
| 5,835,094 | * 11/1998 | Ermel et al. | 345/355 |
| 5,870,734 | * 2/1999 | Kao | 707/2 |
| 5,905,992 | * 2/1999 | Lucas et al. | 707/514 |
| 6,097,393 | * 8/2000 | Prouty, IV et al. | 345/419 |

\* cited by examiner

Primary Examiner—Hosaint T. Alam
Assistant Examiner—Anh Ly
(74) Attorney, Agent, or Firm—Michael B. McNeil

(57) ABSTRACT

A Method and System and Apparatus for the organization, storage and retrieval of information from both computer databases and from hard copy files. The system uses a three dimensional graphical interface that aids the user in visualizing the virtual three dimensional organizational scheme of the invention. Each orthogonal face of the Filecube Virtual File Cabinet graphical interface is intended to represent different ways of organizing individual files. For instance, one face of the Filecube could represent the time based phases of a file, another face of the Filecube could represent different types of files and a third face of the Filecube could represent different categories of files. Each computer based and hard copy file contains identifier fields that identify each item of information associated with an individual file, whether it may be found in a computer database or in a hard copy file and a brief summary identifying the contents of each item of information.

21 Claims, 30 Drawing Sheets

E-FILE SYSTEM
MULTIPLE FILECUBE COMPILER

| RETURN TO JOHN'S ROOM | ▲ ▽ △ ▼ | RETURN TO FILE FOLDER | PRINT THIS E-NUMBER | PRINT ALL FOUND | 460 465 |
|---|---|---|---|---|---|

FILELIST  
SORTED BY: E-NUMBER — 462  
JOHN SMITH — 461  
ALL SHARED FILES — 464  
FILECUBE NAVIGATOR

| E-NUMBER SHARING | FILE NAME | PRIORITY | GENERAL FILE CATEGORY | SPECIFIC FILE CATEGORY — 463 | | |
|---|---|---|---|---|---|---|
| JJS - 002 SHARED | FILE 2 | N | CAREER AND EDUCATION | JOB SEARCH | | 0 |
| JJS - 003 SHARED | FILE 3 | H | HOME AND FAMILY | LANDSCAPING | | 0 |
| JJS - 004 SHARED | FILE 4 | 1 | PERSONAL AND SOCIAL | | | 0 |
| JJS - 005 SHARED | FILE 5 | 2 | HEALTH AND FITNESS | | | 0 |
| JJS - 008 SHARED | FILE 8 | 3 | CAREER AND EDUCATION | SPORTS | | 0 |
| JJS - 009 SHARED | FILE 9 | C | HOME AND FAMILY | | | 0 |
| JJS - 010 SHARED | FILE 10 | C | CAREER AND EDUCATION | SOFTWARE | | 0 |
| JJS - 011 SHARED | FILE 11 | C | PERSONAL AND SOCIAL | BANKING | | 0 |
| JJS - 012 SHARED | FILE 12 | H | HEALTH AND FITNESS | | | 0 |
| JJS - 013 SHARED | FILE13 | 3 | HEALTH AND FITNESS | | | 0 |
| JJS - 014 SHARED | FILE 14 | 2 | CAREER AND EDUCATION | | | 0 |
| JJS - 015 SHARED | FILE 15 | H | PERSONAL AND SOCIAL | CREDIT CARDS | | 0 |
| JJS - 018 SHARED | FILE 18 | C | HOME AND FAMILY | | | 0 |
| JJS - 019 SHARED | FILE 19 | 1 | CAREER AND EDUCATION | MATH BOOKS | | 0 |
| JJS - 020 SHARED | FILE 20 | 2 | HEALTH AND FITNESS | SPORTS | | 0 |
| JJS - 023 SHARED | FILE 23 | 1 | HOME AND FAMILY | VACATIONS | | 0 |
| JJS - 025 SHARED | FILE 25 | 1 | CAREER AND EDUCATION | | | 0 |

PRINT DATE: 466 467  
Page 1 OF 1  
469 468

Fig. 17

| RETURN TO JOHN'S ROOM | ▲ ▽ △ ▼ | RETURN TO FILE FOLDER | PRINT THIS E-NUMBER | PRINT ALL FOUND | 480 482 |

E-File FilePage

FILECUBE NAVIGATOR

| FILE NUMBER: JJS – 002 SHARED | FILE NAME: FILE 2         481 | FILE BELONGS TO: JOHN SMITH | FILE INITIATED BY: JOHN SMITH |
|---|---|---|---|
| KEY WORDS: | ANY KEY WORDS | DATE FILE INITIATED: 9/9/99 | |
| | | DATE LAST MODIFIED: 9/9/99 | |
| DESCRIPTION: | ANY DESCRIPTION | SCHEDULE:    EXP    ACT | |
| | | START: | |
| | | FINISH: | |
| | | PRIORITY: NONE | |

483 FILECUBE INFO:

| FILE PHASE | GENERAL FILE CATEGORY | TYPE OF FILE |
|---|---|---|
| ● FILE INITIATION | ● HOME AND FAMILY | ● REF INFORMATION |
| ○ LIVE | ○ CAREER AND EDUCATION | ○ ISSUES / PROBLEMS |
| ○ ARCHIVED | ○ HEALTH AND FITNESS | ○ PROJECTS |
| ○ DISCARDED | ○ PERSONAL AND SOCIAL | ○ ONGOING |

| WHERE FILE STORED: MAIN FILE CABINET | SPECIFIC FILE CATEGORY: | FREQUENCY IF ONGOING: NOT APPLICABLE |
|---|---|---|

GOAL:

CURRENT STATUS:

COST:

| SUPPLIER NAME | EST. COST | ACT. COST | VARIANCE |
|---|---|---|---|
| | | | |
| | | | |
| | | | |
| | | | |
| | | | |
| | | | |
| | | | |
| | | | |
| TOTALS: | | | |

FILE NOTES:

PRINT DATE:                                                       PAGE 1 OF 1

Fig. 18

SYSTEM, SOFTWARE AND APPARATUS FOR ORGANIZING, STORING AND RETRIEVING INFORMATION FROM A COMPUTER DATABASE

TECHNICAL FIELD

The present invention relates generally to computer aided systems and methods for organizing, storing and retrieving information, and more particularly to such systems and methods for the organization, storage, retrieval of information from a computer database having a three dimensional address structure.

BACKGROUND OF THE INVENTION

Overview:

The organization, storage and retrieval of information in both hard copy form as well as in electronic form has always been and continues to be a problem. With the continuous expansion of information available to everyone, especially with the rapid growth of the Internet, the problem of "Information Overload" has grown exponentially. Daily, an overwhelming amount of information comes into our lives in both hard copy form as well as in electronic form. The sight of offices and desks filled with piles of papers, documents, books, etc. is a common occurrence in business as well as in the home.

Growing Need for Better Record Keeping:

In addition, the need for better record keeping including good organization, storage, retrieval of information, documents, and files is becoming more important than ever. The need for better record keeping exists in business as well as in the home. In addition to organizing, storing and retrieving of information in both hard copy as well as in electronic form, good record keeping also includes the ability to purge or discard selected files, documents and items at the appropriate time and in a totally controlled manner. Therefore, there is a need for a system that provides a method and a process for the systematic handling of all types of information in both hard copy form as well as electronic form, from cradle to grave in an intuitive and easy to use manner.

Electronic vs. Paper Hard Copy:

Since the beginning of the computer age it has been suggested that virtually everything worth knowing would be stored electronically and would be accessible on a screen, eliminating the need for and use of paper or hard copy information. With the continued increases in the use of computers to generate, transmit and share information electronically as well as more recent increases in the use of scanning devices to convert hard copy information into electronic form, there has been increased talk about the concept of a "Paperless Office" or a "Paperless Society". Although these concepts seem to be eventually possible, recent studies have indicated that virtually all people of all ages, even young children that do not have preconceived preferences for paper or hard copy materials, do in fact prefer in many instances their information to be in a hard copy or physical form as opposed to or in addition to in electronic form. People of all ages generally prefer their materials to be in hard copy form to allow them to hold, fold, fax, copy, write on, refer to, post for others to see and/or keep for future reference. It has been shown that most people experience a more total feeling of ownership and a feeling of being in control that comes from having their information, documents, files and items in physical or hard copy form.

Although most people prefer tangible documents, others have different preferences for either hard copies or electronic copies of documents or both. In addition, people's preferences may change with time and as further advances are made in computing. Thus, there is a need for a system, a process, an apparatus, a method and a computer program product that is totally flexible, versatile and consistent for various users who have different preferences along a spectrum that spans from hard copy information and tangible things only, to that of totally electronic (no hard copy) forms of information and all possible combinations in-between.

For some Items a hard copy is preferred or even required:

In addition, for the foreseeable future, there will continue to be many types of documents and records that will need to be maintained in hard copy form only. Examples of these types of documents, for say a home application would include, birth certificates, diplomas, passports, a colored brochure for your favorite car, clippings and information about your spouses or child's accomplishment, etc. With a suitable system, these types of documents, information and items could be organized, stored, retrieved and discarded in a systematic and controlled manner that allows for instant retrieval by anyone in the family.

The Internet/World Wide Web:

The recent explosive expansion of the Internet/world wide web has made a vast amount of information available on virtually any and all topics in electronic form. With the Internet, this material can be stored on any computer, in any part of the world, and be instantly accessed by anyone who has a computer tied to the web. With the advent of the Internet/world wide web the typical use of computers has evolved from that of stand alone desk type devices in the early to mid 1980's to computers tied to Local Area Networks (LAN's) and Wide Area Networks (WAN's) in the late 80's and early 90's to computers that are all interconnected by the World Wide Web through various forms of Intranets, Extranets and the Internet itself. This interconnection is able to provide ubiquitous access and sharing of information and documents instantly by virtually all people around the globe. Although the Internet provides a universal method for the connection of people and computers in essentially one large world wide network with widespread access to various types of information, the Internet has not helped much in the area of organization, storage and retrieval of this information. Much work is being done in the development of better search engines which should help users to more easily find the specific information for which they are looking. However, for the foreseeable future, the Internet/World Wide Web has essentially added to the "Information Overload" phenomenon that we all face.

Solution to a widespread/universal problem:

The problem of "Information Overload" continues to grow as more and more information becomes available through new and different channels and media. The need to better manage this information in both hard copy form as well as in electronic form is a widespread and universal problem. Although new products and upgrades to existing products for various computers and applications continue to be developed and introduced, truly new innovation and truly useful new solutions to these real life information processing problems are few and far between. To date, a system or product has not been introduced that is or does what is needed to truly provide "A place for everything". Thus, there is a need for a truly new system, process, apparatus, method, and computer program product that solves a widespread and well known universal problem, saves time, and makes life easier.

SUMMARY OF THE INVENTION

In one embodiment, an information organization, storage and retrieval system includes a memory storage device operably connected to a computer. A plurality of virtual file folders that contain items of information are labeled with different identifiers and stored in the memory storage device. An input device and an output device are operably connected to the computer. The system includes a means for locating the virtual file folders in a three dimensional address structure having an X-axis with a plurality of first descriptors, a Y-axis with a plurality of second descriptors and a Z-axis with a plurality of third descriptors. Each of the virtual file folders is classified into one of the first descriptors, one of the second descriptors and one of the third descriptors.

In another embodiment, a method of organizing information to facilitate storage and retrieval includes the step of placing an item of information into a virtual file folder, which is labeled with an identifier. The virtual file folder is classified into one of a plurality of first descriptors, one of a plurality of second descriptors and one of a plurality of third descriptors. The virtual file folder is then located into a three dimensional address structure having an X-axis with the plurality of first descriptors, a Y-axis with the plurality of second descriptors and a Z-axis with the plurality of third descriptors.

In still another embodiment, a computer program is stored in memory executable by a processor for organizing, storing and retrieving information. The program includes a means for creating a three dimensional address structure having an X-axis with a plurality of first descriptors, a Y-axis with a plurality of second descriptors and a Z-axis with a plurality of third descriptors. Also included is a means for locating virtual file folders in the three dimensional address structure at least in part by classifying each with one of the first descriptors, one of the second descriptors and one of the third descriptors. The program also includes a means for placing items of information into said virtual file folders and a means for retrieving the virtual file folders.

BRIEF DESCRIPTION OF THE DRAWINGS

FIG. 15A is a drawing of a three dimensional address structure which is used as a basis for the user filecubes and navigation schemes that are utilized in one aspect of the invention.

FIG. 15P is a drawing of a filecube navigator indicating that a user has chosen to approach the top side face of the filecube and view the second box in the first drawer in the forth column (all Discarded—Home and Family—Issue and Problem file folders in the illustrated example).

FIG. 17 is a drawing that depicts a typical list printout of all shared file folders of a user (John Smith) as they would appear in the first drawer in the first column of the front face of the users filecube.

FIG. 18 is a drawing that depicts an example filepage form printout that summarizes the contents of a single virtual file folder according to one aspect of the invention.

BEST MODE FOR CARRYING OUT THE INVENTION

Figure 1:
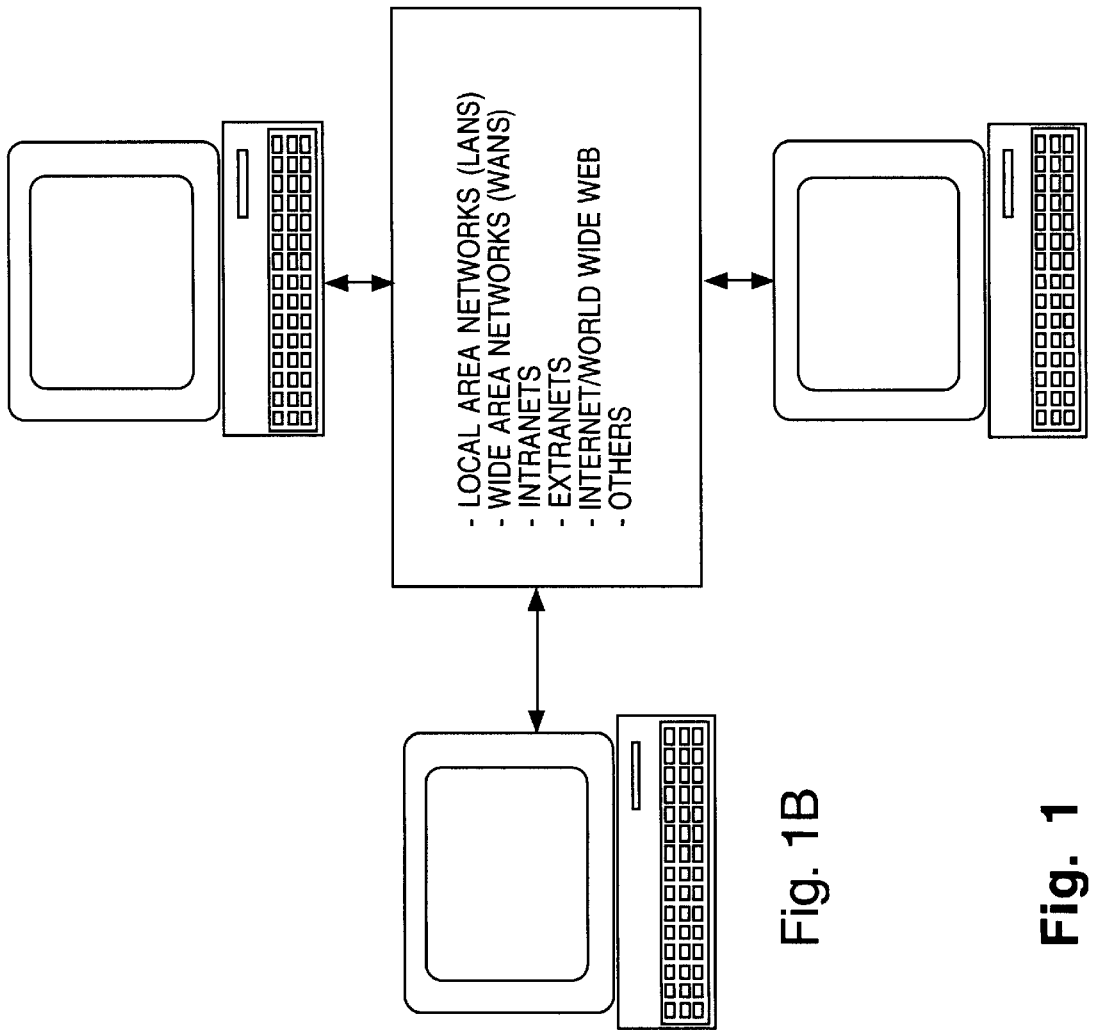
FIG. 1A is a front diagrammatic view of a typical stand alone digital computer utilized in one aspect of the invention.
FIG. 1B is a schematic view of a typical computer network utilized in another aspect of the invention.

This disclosure describes a method, an apparatus, a data processing system and a computer program product for organizing, storing, retrieving and discarding information from both computer databases and from hard copy files utilizing a three dimensional graphical interface that aids the user in visualizing the virtual three dimensional organizational scheme of the invention.

Terms and Definitions

The following definitions will simplify the explanation herein of the background and details of the present invention, although it will be understood that their use should not be interpreted as limiting the spirit and scope of the present invention.

Alphanumeric: a group of characters consisting of letters and/or numbers and/or conventional symbols, such as punctuation marks and mathematical symbols.

File Folder: a receptacle that holds related items of information, such as loose objects, documents, cards, or any collection of small items, preferably in useful order. The term "file folder" and "file" are used interchangeably throughout this text. In the system of the present invention, a file folder is represented on a computer screen by a conventional file folder. Each file folder within the present invention is labeled with a unique alphanumeric identifier, which preferably relates in some way to the owner of the file folder. Within the present invention the designation of this label is E-Number. The file folders also carry other identifier fields such as the File Name, Key Words, File Phase, File Type, File Category, etc. These and other identifier fields are used in various ways to organize, store and retrieve the various file folders in the system as well as the items of information contained in those file folders.

File Number/E-Number: The File Number or E-Number is the identifier that is used as the basis of the chronological or consecutive numbering scheme that is used as the basis for the system, as opposed to say alphabetical or some other organizational scheme. A typical E-Number appears as follows; JJS-023. The first portion of the File Number, the "JJS" portion, illustrates an identifier which is chosen by the creator of the file folder. This portion is typically up to four characters and would typically be letters indicating possibly a user's initials or possibly letters or other characters which may designate a company name for example. The second portion of the File Number, the "023" portion, illustrates simply the number or position of that specific File in the chronological or consecutive number listing of all files in the system. As new files are initiated, each file is simply given the next number in the consecutive order of File Numbers regardless of the alphabetical name of the file or any of the File Attributes such as file type, file category, etc. It should be noted that the File Number seen by the user is a cosmetic number since it preferably can be changed at any time as desired by the user.

Item of Information: a single article or unit included in a collection, enumeration, or series and specified separately. In the system, an Item of Information is represented by a conventional index card. The terms "Item of Information" and "Item" are used interchangeably throughout this text. The designation of an Item of Information within the present invention can be as an E-Item. In addition, any and all Items of Information within the present invention fall into one of just three overall categories. The categories of Items of Information are, or are related to, either a Person, Place or Thing. This selection of categories is not flexible and cannot be changed by a user of the system. All Items of Information stored within the system fall into one of these three categories. However, there can be lists of sub-categories for each of these main Item Categories and those sub-categories can be revised as desired by a user of the system. All Items within a certain file folder can be of two general types, E-Items and "other" Items. E-Items are assigned a specific Item Identifier called an Item Number. It should be noted, that the use of Item numbers for specific Items provide enhanced control for specific Items of any type, however, the use of specific Item numbers is optional and not required to effectively use the system. The system allows for "other" Items which are simply labeled with the E-Number for that file folder and placed into the file folder in any order desired, but preferably behind the consecutively numbered E-Items of that file folder. Thus, users have total flexibility to choose which Items, if any, should be E-Items with specific Item Numbers and which Items can be "Other" Items which simply have the E-Number of that particular file folder on them. E-Items are easily distinguished by the presence of the additional dash number indicating that Item's position in the chronological/numerical listing of E-Items within that file folder, whereas "other" Items simply have the E-Number of that specific file folder placed on them.

Item Number: An Item Number is the identifier that is used as the basis of the chronological or consecutive numbering scheme for individual E-Items within the file folders of the system. The Item Number is simply a logical extension of the File Numbers used in the system. A typical Item Number appears as follows; JJS-023-17. The first portion of the Item Number, the "JJS-023" portion illustrates simply the File Number of the file folder that the Item in question is filed within. The second portion of the Item Number, the "-17" portion, illustrates simply the number or position of that specific Item in the chronological or consecutive number listing of all E-items within that particular file folder. As new Items are initiated and added to a specific file folder, each E-Item is simply given the next number in the consecutive order of Item Numbers within that particular file folder regardless of the alphabetical name of the Item or any other identifier attributes of the Item. It should be noted that the Item Number seen by the user is cosmetic since the number can be changed, and the item moved to a different file folder, at any time as desired by the user.

Entity: An Entity is defined as the fact of existence or being. Something that exists independently, not relative to other things. A particular and discrete unit, an entirety. Persons and corporations are equivalent entities under the law. In the present invention, the smallest entity is an individual person with their own individual personal filecube. The largest entity on the other hand, will be defined as required as various logical groupings of entities to in essence form an enterprise.

Enterprise: An Enterprise is defined as an undertaking, especially one of some scope, complication and risk. A business; An industrious effort, especially when directed toward making money. In the present invention, enterprise shall refer to a logical collection of entities that shall form some unit such as a family, a business or company, a department, etc.

Enterprise Compiler: In the present invention, enterprise compiler shall refer to a system that combines or merges individual Files and Items of a group of individual entities that form some unit or enterprise such as a Family. The Enterprise Compiler merges the files and items into an enterprise wide system that provides access to either all or selected files and items based on File and Item sharing settings selected by both individual entities or users of the system within the enterprise as well as the system administrator, if any.

File Owner: In the present invention, File Owner refers to the person or entity that has ultimate ownership and control over all Files and Items within a specific filecube. An example would be an entity such as individual person being the owner of all of his or her personal Files and Items.

File Visitor: In the present invention, File Visitor refers to the person or entity that is granted access to a File Owner's Files and Items. That entity can access the file owner's files and items and perform operations based on the access privileges granted by the File Owner.

Current User: In the present invention, Current User refers to the person or entity that has signed on to the system to access his or her Files and Items.

Visited User: In the present invention, Visited User refers to the person or entity who's room/office and Files and Items are being viewed or visited by another user. Access to another person's or entity's room/office and Files and Items are based on access privileges granted by the owner of the Files and Items.

Filecube: The Filecube represents the entity that owns the Files and Items within that particular system. In addition, the Filecube represents a virtual three dimensional filing cabinet that has drawers on three orthogonal sides of the cube. The drawers can be opened from any of these three sides to provide access to Files and Items within the E-File System based on the File Attributes of File Phase, File Type and File category assigned to each of the files.

Filecube Navigator: The Filecube Navigator is an interactive icon which indicates the location of individual Files and Items as well as various groupings of Files and Items within the System. The Filecube Navigator computer screen Icon automatically changes to reflect the current status of the File Attributes of File Phase, File Type and File Category of any specific File or Item or groupings of Files and Items. Examples of different combinations of File Attributes as indicated by the Filecube Navigator are illustrated in FIGS. 15A through 15P in the drawings.

File Attributes: In the present invention, File Attributes refer generally to the three orthogonal axes of the Filecube. The X axis of the Filecube relates to the time continuum or phase aspects of the Files and Items contained within the System. The Y axis of the Filecube relates to a breakdown of components or elements of the system such as the types of Files and Items contained within the system. The Z axis of the Filecube relates to a breakdown of categorizations or categories of the system such as the categories of Files and Items contained within the system.

File Attributes Phrase: In the present invention, the File Attributes Phrase refers generally to the descriptive phrase that is generated by combining the three File Attribute aspects of the Files and Items contained within the system. The three File Attributes are combined in such a way as to clearly describe the location of a particular box of Files or groups of Files and/or Items contained within a particular filecube. To form the File Attributes Phrase, the File Attributes are combined in the following order. First, the X axis of the Filecube, second, the Z axis of the Filecube and third, the Y axis of the Filecube. An example of a typical File Attributes Phrase using the case of the Personal or Family application of the system would be the Files and/or Items designated as "Live—Home and Family—Projects". It can be seen that the File Attributes phrase forms an easy to understand description of the specific location of the particular Files and/or Items within the Filecube System and greatly enhances the user's ability to easily focus on a very specific area within the overall three dimensional address structure of the system.

File Types: In the illustrated example of the present invention, there are four Types of Files; 1) Reference Information Files, 2) Issue/Problem Files, 3) Project Files, 4) Ongoing Files. All Files and Items within the system fall into one of those four types of files. The four types of files form not only a set of logical groupings of files and items but also actually work in conjunction with the File Phase aspect of the Filecube organizational scheme to form a logical flow diagram for Files and Items as further detailed in FIG. 3 in the drawings. File Types correspond to the Y-axis of the filecube. It should be noted that these four file types are shown for illustrative purposes only and should not be construed as limiting the spirit or intent of the present invention.

File Phases: In the illustrated example of the present invention, there are four File Phases; 1) The File Initiation Phase, 2) The Live Phase, 3) The Archived Phase, 4) The Discarded Phase. All Files and Items within the system fall into one of those four File Phases. The four types of files form not only a set of logical groupings of files and items but also actually work in conjunction with the File Type aspect of the Filecube organizational scheme to form a logical flow diagram for Files and Items as further detailed in FIG. 3 in the drawings. File Phases corresponds to the X-axis of the filecube or three dimensional address structure. It should be noted that these four file phases are shown for illustrative purposes only and should not be construed as limiting the spirit or intent of the present invention.

File Categories: In the present invention, there are four categories for a file. The use of four categories is chosen presently for simplicity and to maintain symmetry with the two other File Attributes to complete the cubical configuration of the filecube. However, the use of four categories of file should not be construed as limiting the present invention from being expanded to any number of additional categories as required by other applications of the invention. In addition, File Categories are dependent upon the specific application of the system. In the present example being used to illustrate one possible application of the present invention, namely a Family system, the four categories of file have been chosen to be as follows; 1) The Home and Family category, 2) The Career and Education category, 3) The Health and Fitness category, 4) The Personal and Social category. The File Categories corresponds to the Z-axis of the filecube, or three dimensional address structure. It should be noted that these categories are shown for illustrative purposes only and should not be construed as limiting the spirit or intent of the present invention.

DETAILED DESCRIPTION OF THE DRAWINGS

FIG. 1 is a diagram of a typical digital computer utilized by a preferred embodiment of the invention. FIG. 1A is a diagram of a typical digital computer such as a desk top computer, a laptop computer, a Personal Digital Assistant (PDA), or other digital computing device that is used as a stand alone device and is not connected to other digital computers through networks local area networks (LAN's), wide area networks (WAN's), Intranets, Extranets or the Internet/World Wide Web. FIG. 1B is a diagram of a typical digital computer such as a desk top computer, a laptop computer, a Personal Digital Assistant (PDA), or other digital computing device that is connected to other digital computers through an interface of any type to networks including but not limited to local area networks (LAN's), wide area networks (WAN's), Intranets, Extranets and the Internet/World Wide Web. The software of the present invention can be operated on any of these machines and is preferably remotely usable over any computer network.

Figure 2:
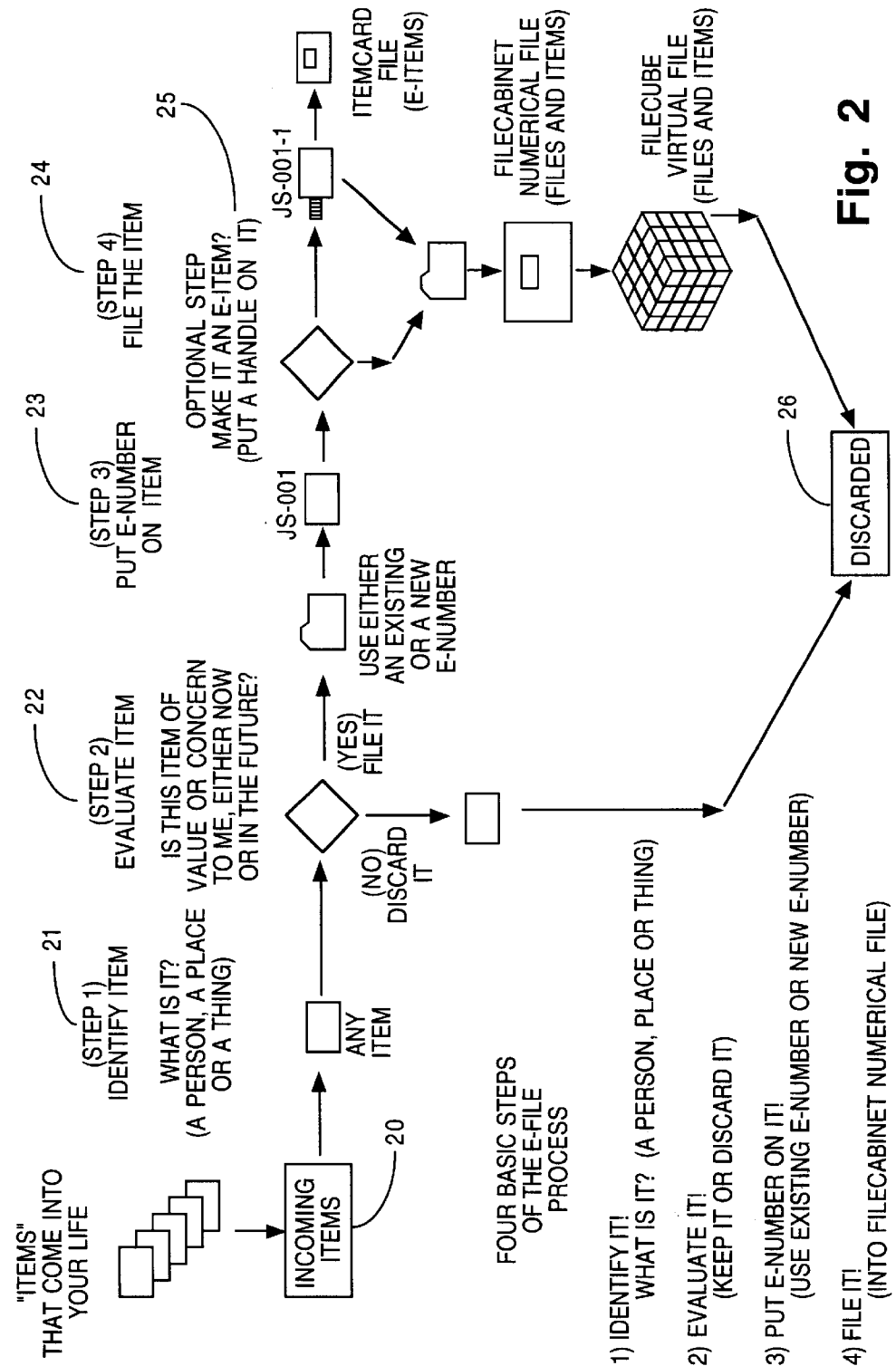
FIG. 2 is a schematic flow diagram of the processing and storage of various items of information according to the invention.

FIG. 2 is an overall flow diagram depicting the flow of and retention of Items and Files within a preferred embodiment of the present invention. In the first portion 20, all incoming items are shown flowing into an inbox for accumulation prior to being Identified and evaluated by the user of the system. Portion 21 indicates the first step in the process which is the Identification Step. In a preferred embodiment of the invention, the user answers one simple question, "What is it?, or What does this item of information relate to? (A Person, Place or Thing)". Portion 22 indicates the second step in the process which is the Evaluation Step. In a preferred embodiment of the invention, the user answers the question, "Is this Item of value or concern to me, either now or in the future?". If the answer to the question is (No), the user simply discards the Item and returns to Step 1, portion 20, to process the next Item in the inbox. For instance, if the item is a piece of uninteresting junkmail, it is discarded without ever entering the system. If the answer to the question is (Yes), the user moves to Step 3, portion 23, in the process which is "Put an E-Number on it". For instance, the item might be a sale receipt for the purchase of a new washing machine. At this point, the user must decide whether to use an existing E-Number/File Number indicating that the Item in question would fit appropriately into one of the existing file folders within the system or, whether a new E-Number/File Number should be taken out, indicating that there is no existing file folder in which the Item in question should be filed. The user typically will either know if a File already exists or will first do a search of the existing E-numbers to determine if a File exists that would be suitable for the Item in question. If a suitable file does exist, the user simply uses that number for the Item and places it in that file folder. If the item is a tangible item, such as a document, it is placed in the corresponding hardcopy file folder having that E-Number. If a suitable File does not exist, the user will go into File initiation mode by clicking on the button labeled "New File" where a blank file folder will appear on the screen for the user to fill out with the appropriate information for that Item. At or about the same time, a hardcopy file folder with the same E-Number is created if the item is a tangible thing, such as a document.

Step 4, portion 24, of the process entails simply filing the specific Item. If the user chooses to maintain that Item as one of the "Other Items" that are not E-Items and are not given a specific Item Number, the process is complete for that particular Item. If however, the user chooses to take the optional additional step of making that Item an E-Item, portion 25, the user will click on the button labeled "New Item" where a blank ltemCard (index card) will appear and will be filled out by the user with the appropriate information for that particular Item. At that point, the E-Item is filed in the appropriate file folder in the tabbed section labeled E-Items. Once those steps are completed, the Item is available for instant retrieval through various routes as selected by the user. The File and/or Item can be retrieved through the FileCabinet Numerical File, the Filecube virtual file and/or if the Item is an E-Item, it can be retrieved through or in the ltemCard (index card) file. Throughout the useful life of that File or Item the information can be organized, stored, retrieved and utilized as desired by the user of the system. Also, at any time, Items can easily be moved from one File to another File as desired by the user of the system simply by changing the E-Item number for that item of information. In addition, at any time the materials (Files and/or Items) can be discarded as indicated in step 26 on the flow diagram. This ability provides a complete system that enables total access and control of all information (Files and Items) from the point that they come into the system through the inbox, through the entire time they are stored within the system and up to the time when they are finally discarded from the system. The system, also provides the ability to keep a record of any and all Files and Items that are discarded if so desired by the user of the system.

Figure 3:
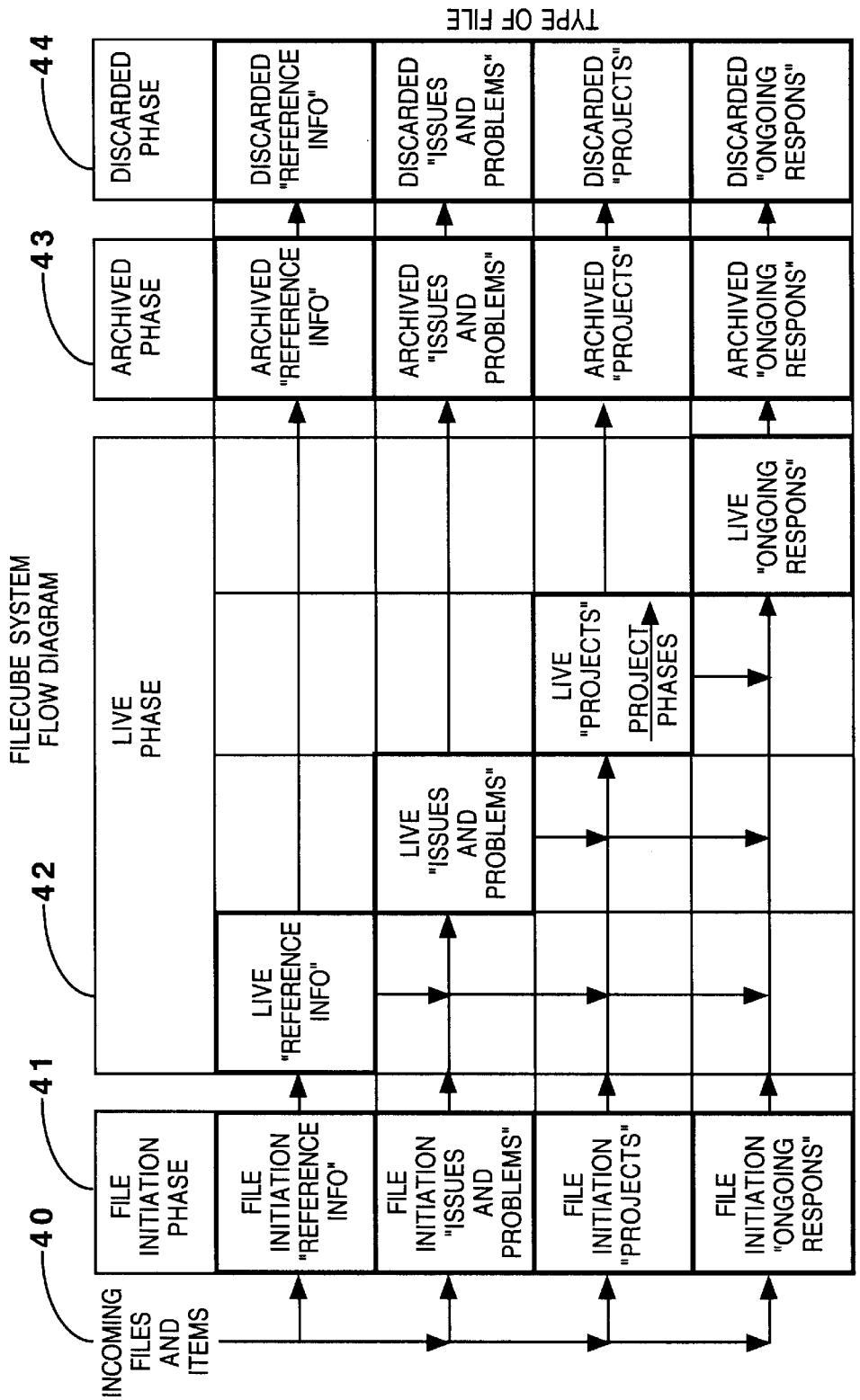
FIG. 3 is a flow diagram depicting the time based or phased flow of the various types of Files and Items through the virtual file cabinet system of a preferred embodiment of the invention.

FIG. 3 is a block diagram or flow diagram depicting the time based or phased flow of the various types of Files and Items through the Filecube virtual file cabinet system in a preferred embodiment of the invention. At the left side of the diagram, portion 40, Files and Items are shown coming into the system. Assuming a new File or E-Number needs to be created, the new File will be created in the File Initiation phase, portion 41. This Phase corresponds to the first column or blue colored area on the front face of the Filecube Virtual file cabinet. The blue color denotes that the File is "cool" since it has just been initiated and is really not active. An example of such a file would be as a "potential Problem" or a "future or potential Project". As can be seen, the File Initiation Phase, as all phases do, contains all types of files. In this example the four types of files (Z-axis) are "Reference Information" Files, "Issue and Problem" Files, "Project" Files and "Ongoing" Files. The system is designed in such a way that any and all information will fall into one of those choices of "File Type".

It should also be noted, that a new File being initiated can immediately become live or archived as well. The "Live" Phase, or portion 42, of the flow diagram depicts the area where all live or active Files and Items reside. This Phase corresponds to the green colored area or second column on the front face of the Filecube Virtual file cabinet. The green color is derived from the notion of a "traffic light" that virtually all users will readily be familiar with. As with the traffic light, the green color denotes "go" or a live or active File and/or Item. Once again, all four File Types are available within the "Live" Phase of the flow diagram. Also, it can be seen that the flow diagram illustrates the live phase spread horizontally (X-axis) to allow for a better understanding as to how Files and Items can actually flow through the system and change file attributes during the life of a file. In other words, a File may be initiated as say reference information on some topic. This information may be pertinent to some potential or future issue of concern or possibly a potential project, for example. As time progresses, it may become appropriate for that entire file to be changed from say Reference information that is in the File Initiation phase, to say a "Live Project" File. This is accomplished simply by changing the appropriate "File Attributes" for that file, which corresponds to moving the file to a different virtual box within the three dimensional address structure of the filecube.

It can be readily seen that the system is designed to allow for any combination of logical flow through the system as desired by the user. Another example of such a flow would be where a Reference Information File would become a "Problem" that might need to be solved. That file might then become a "Project" that is completed and could ultimately become an "Ongoing" (Responsibility) File which may require some ongoing tasks or activities at some regular or irregular frequency for the foreseeable future or some finite time which is predetermined. The E-system provides mechanisms to control and aid in the ongoing activities and, at the appropriate time, aid in the Archiving and Discarding of those Files as well. In another aspect of the invention, the system includes various "FocusManagers" such as the ProblemSolver, IssuesManager, Project Manager, etc. that assist the user in the thought process and flow of Files and Items through the Filecube System, and more specifically through the concepts in the flow diagram depicted in FIG. 3 of the drawings.

The "Archived" Phase, or portion 43, of the flow diagram depicts the area where all Archived or inactive Files and Items reside. This Phase corresponds to the yellow colored area or third column of the front face of the Filecube Virtual file cabinet. The yellow color is also derived from the notion of a "traffic light" that virtually all users will readily be familiar with. Similar to the traffic light, the yellow color denotes Files and Items that are still within the system but are inactive. Once again, all four File Types are available within the "Archived" Phase of the flow diagram.

The "Discarded" Phase, or portion 44, of the flow diagram depicts the area where all Discarded Files and Items reside. This Phase corresponds to the red colored area or fourth column of the front face of the Filecube Virtual file cabinet. The red color is also derived from the notion of a "traffic light" that virtually all people will readily be familiar with. As with the traffic light, the red color, or "stop", denotes Files and Items that are discarded from within the system but are still on record that they in fact existed. Thus the system can keep track as desired by the user, of all files and items that have been discarded. In addition, as desired by the user, the discarded files and Items can also be "Blanked Out" thus eradicating all record of that File and/or Item. In that case, The E-Number of that blanked item can be reused for any new file or item that comes into the in box. Once again, all four File Types are available within the "Discarded" Phase of the flow diagram. Thus it can be seen from the flow diagram or block diagram in FIG. 3, that any and all Files and Items within the system come into, are stored within and flow through the system in a totally controlled and logical manner as defined by the user of the system and as assisted by the various FocusManagers included in the system.

Figure 4:
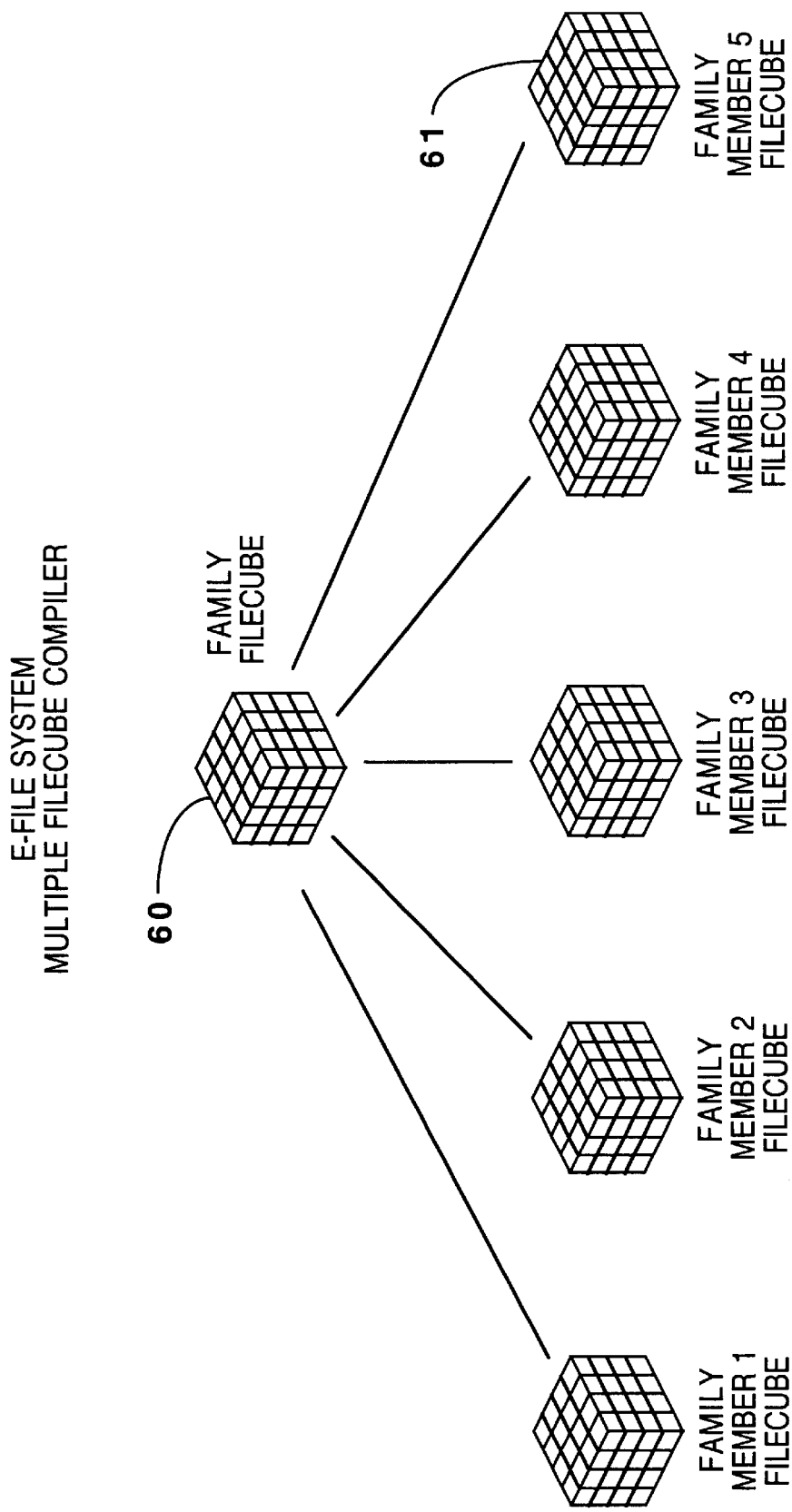
FIG. 4 is a block diagram illustrating a typical enterprise grouping of entities and the enterprise compiler function in a preferred embodiment of the invention.

FIG. 4 is a block diagram illustrating a typical enterprise grouping of individual entities within the System and also depicts the enterprise compiler function which merges or combines the files and items of individual entities into an enterprise wide system. The enterprise filecube contains all the files of all the entities and provides access to either all or selected files and items based on File and Item sharing settings selected by both individual entities or users of the system within the enterprise as well as the system administrator, if any. In the present example of the Family System, portion 60, of the diagram depicts the Family Filecube which contains files and Items that do not specifically belong to any one individual or entity within the family but are Files and/or Items that are jointly owned or shared between two or more members of the family. A possible example of such a file would be a file that contains say the legal documents, i.e. title, mortgage information, etc. for the house in which that the family lives. This information is made jointly accessible to some or all members of the family as selected by the parents and/or the administrator of the system. Portion 61, of the block diagram indicates five (5) individual Filecubes which belong specifically to individual members of the family. Each of these cubes contains all of the Files and Items that belong to each of the individual members of the family. Each of the individual family members has full and total control of each of the Files and Items within that person's cube and has total control as to which files and Items are considered Shared and which are considered Private. In addition, that person can decide about sharing those files and items as desired with other members of the family. In addition, the grouping of Filecubes shown in FIG. 4, can also be looked at or considered as a Family Network or Intranet in which all the members of that family have a total but selectively controlled access to any and all Files and Items within that Family system yet can protect that information from being accessed by others outside the family if so desired by the family. The system can also provide however, either full or partial access to visitors as desired and selected by the family and/or administrator of the system.

Figure 5:
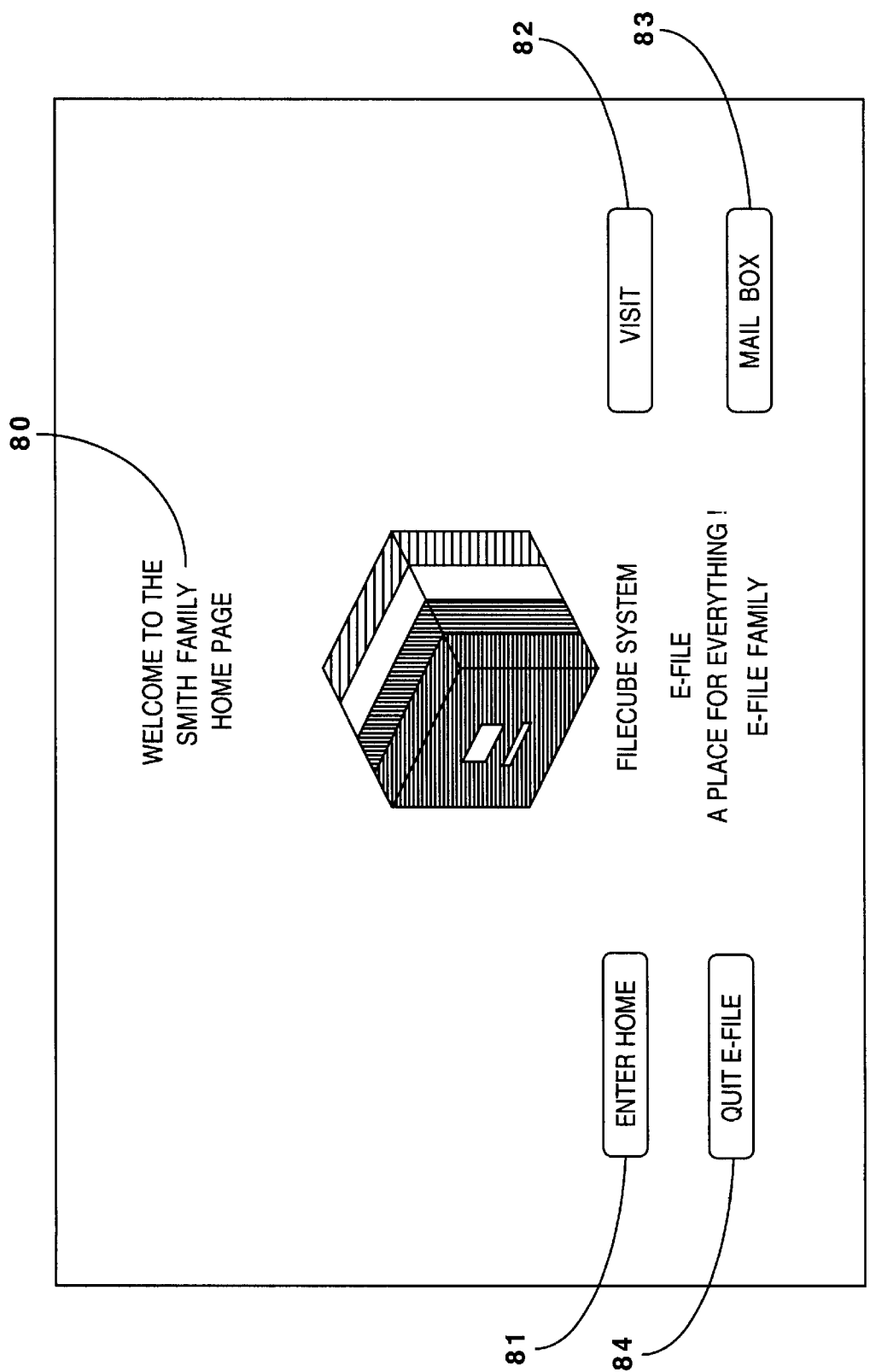
FIG. 5 is an example starting or home page screen for the computer program according to the invention.

FIG. 5 depicts a typical entry screen or Home Page for entry into the system when the software of the invention is launched. When the system is started, such as by entering an appropriate command into an input device operably connected to the computer, the entry screen is displayed on a suitable video output device that is also operably coupled to the computer running the software. After the initial set up steps are completed the first time the system is used, the system will stop at the system Home Page. This home page acts as the front door or access door into the system, or in this case into the household or files of a particular family. Portion 80 of the diagram indicates that after the one time set up is completed, the Home Page Screen is actually individualized for that family by indicating the family's name at the top of the page.

Figure 6:
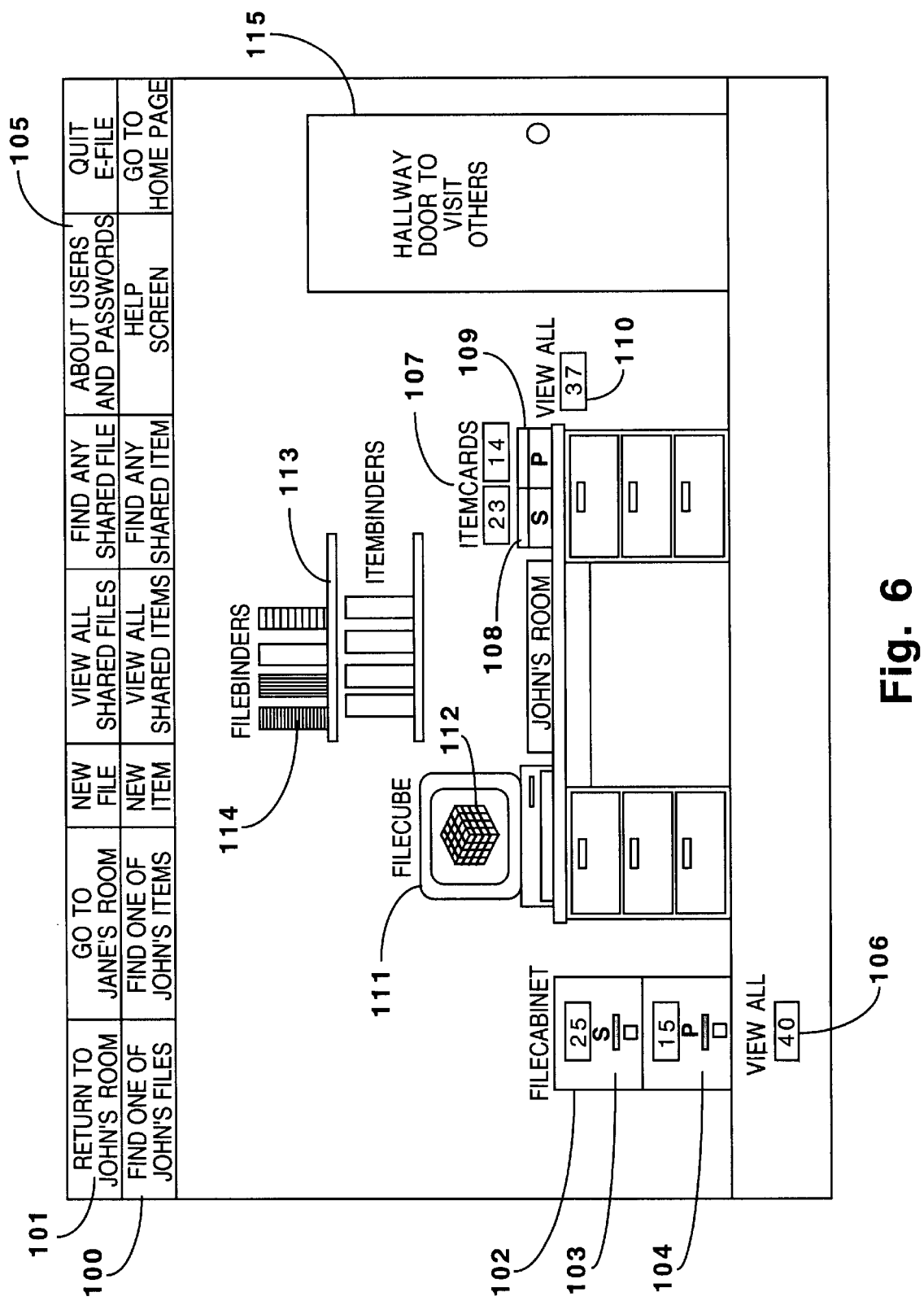
FIG. 6 is an example user's virtual room screen which acts as the user's "home base" during the use of the system in a preferred embodiment of the invention.

Portion 81 of the diagram indicates a button that is clicked to enter the home, which is the first step to gaining access to the files in the system. When this button is activated by a click of a mouse or some other input device, the system proceeds to a screen which asks for password, which in this example is termed the family's "House" Key" password. This house key password, as is parallel with the real world house key and is identical for all members of the family. After a user correctly enters the "house key" password, the user is taken to a screen indicating a list of registered users of the system, in this case members of the family, where the user is asked to click on his or her own name and enter that user's personal "sign on" password to enter the system. This action will designate that user as the "current user" of the system and will take the user to their "room" screen as indicated in FIG. 6 of the drawings. Portion 82 of the diagram indicates a button labeled "Visit". If the family has chosen to allow visitors into a specific section which gives access to certain family files, this button will take the visitor to the visitors information screen. Portion 83 of the diagram indicates a button labeled "Mail Box". If the family has chosen to allow visitors access to their e-mail addresses, this button will take a visitor to a screen containing the e-mail addresses for the family and allow the visitor to send e-mail messages to them. Portion 84 of the diagram indicates a button labeled "Quit E-File". If the user chooses not to enter the system or cannot due to the lack of a password, the user can simply click this button to quit the program.

Figure 9A:
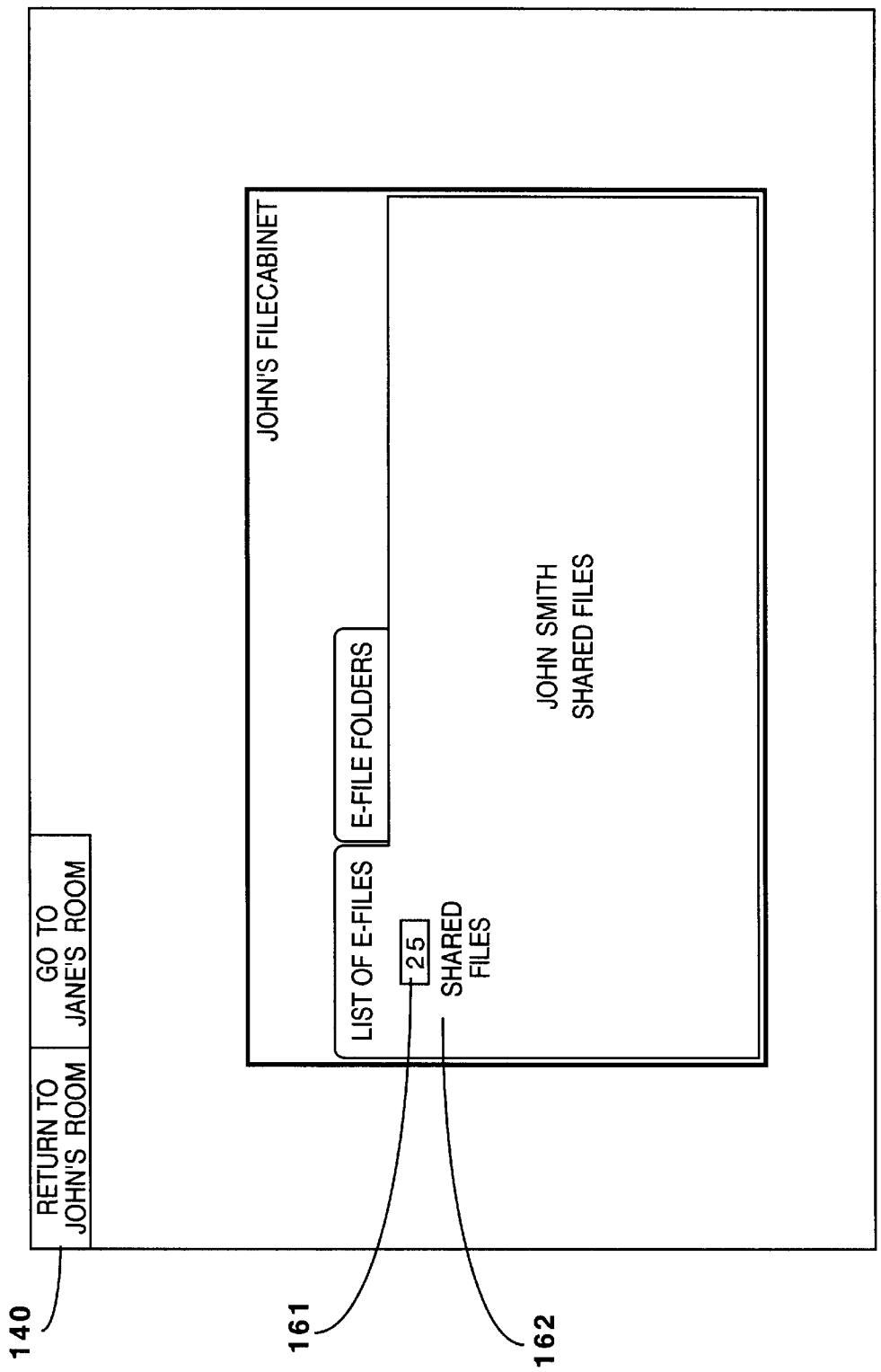
FIG. 9A is an example open file drawer screen with file tabs in one aspect of the invention.

FIG. 6 depicts a typical user's room screen or virtual office which acts as the user's "home base" during the use of the system in a preferred embodiment of the invention. After a user has signed on as "current user" of the system, that user will be taken to their "current user's" room screen. That "room" is parallel and analogous to the users own physical room or office. In other words, all of the virtual file folders, index cards and binder listings shown in this screen can and usually should exist in parallel with tangible counterparts in the users actual office things. Portion 100 of FIG. 6 shows the navigation buttons that are used to perform various functions as indicated by the self explanatory labels on the individual buttons. Portion 101 of the diagram indicates that, after the user "sign-on" step is completed, the User's Room/Office Screen is actually individualized for that particular user/family member by indicating that person's name in the button at upper left hand corner of the page. In addition, other sections of that screen as well as other screens throughout the system indicate in various ways who the "current user" is. Another preferred aspect of the present invention, indicated by portion 102, is the user's FileCabinet or numerical file cabinet in which all Files and Items are stored in sequential numerical order by E-Number. The user would preferably also have a hardcopy filecabinet with sequentially numbered file folders in which tangible things, such as documents, are physically stored. Portion 103, indicates the "S" drawer that contains the user's "Shared" Files and Items. The box on the front of the drawer indicates that it currently holds 25 shared files. All Files that are designated as shared or non-private by the user/file owner are automatically accessible in that drawer. On the electronic screen, the file drawer face is actually a button which, when activated by a click of a mouse or any other appropriate input device, the drawer opens taking the user to another screen indicating an open file drawer with tabs as shown in FIG. 9A of the drawings. This file drawer is totally parallel and analogous to the physical file drawer that a user will have for any physical/hard copy shared Files and Items as part of the system. In addition, both the electronic file drawer on the screen as well as the physical file drawer are not locked since they contain the files and items that are designated as shared by the user/file owner.

Portion 104, indicates the "P" drawer that contains the user's "Private" or non-shared Files and Items. The box indicates that there are 15 such files in this case. All Files that are designated as private or non-shared by the user/file owner are automatically accessible in that drawer. On the electronic screen, the file drawer face is actually a button which when activated by a click of a mouse or any other appropriate input device, the drawer opens taking the user to another screen indicating an open file drawer with tabs similar to those shown in FIG. 9A of the drawings. This file drawer is totally parallel and analogous to the physical file drawer that a user will have for any physical/hard copy private Files and Items as part of the system. In addition, both the electronic file drawer on the screen as well as the physical file drawer are locked since they contain the files and items that are designated as private by the user/file owner. For a user that may be visiting the file owner's room, to gain access to the users private files and items, the visitor would need to have the file owner's "private file key" password. The selections as to who is given access to a users various keys and passwords is made in the system security and access portions of the system which are accessed by the button labeled "About users and passwords", Portion 105, on FIG. 6.

Figure 16A:
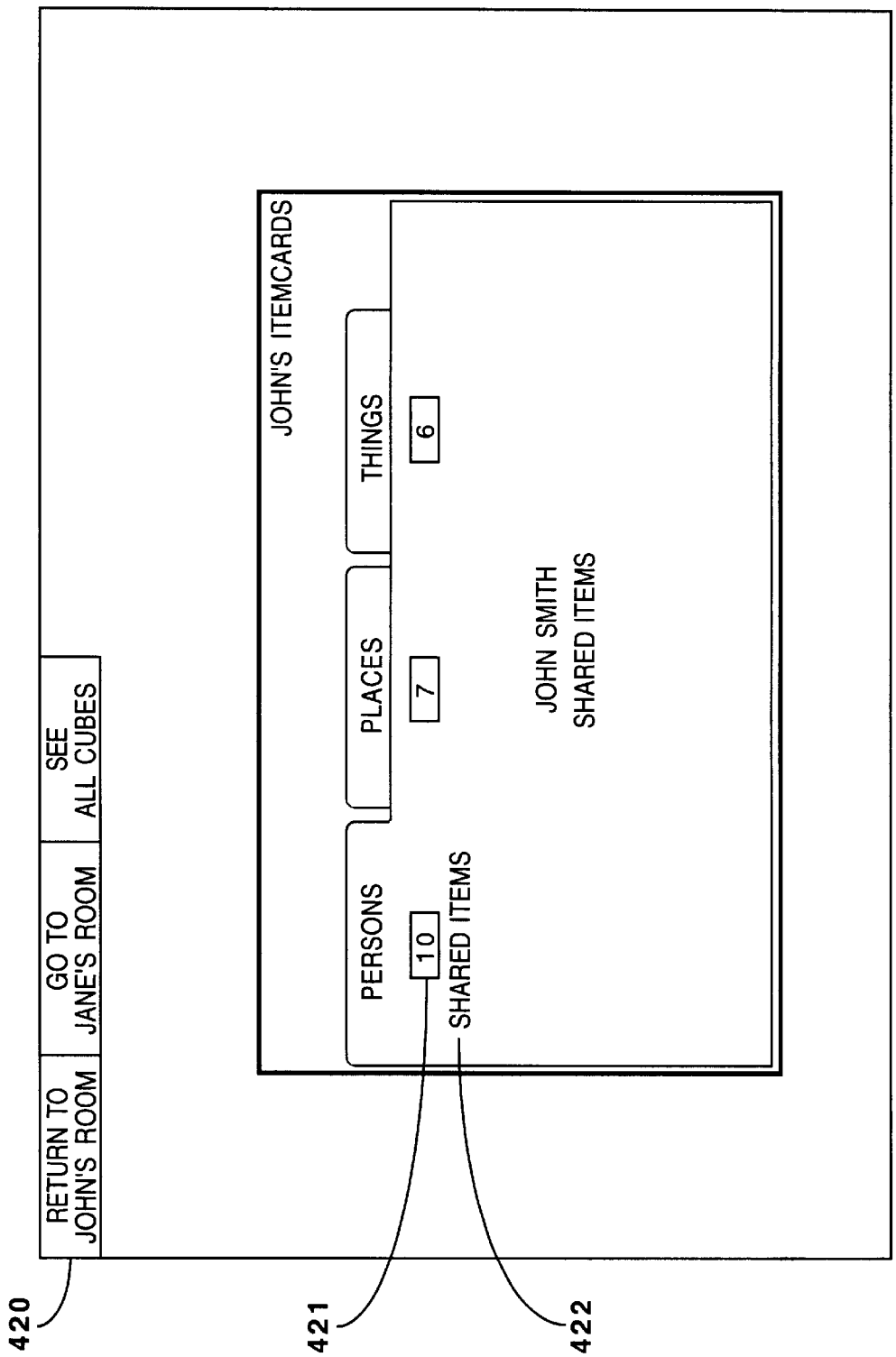
FIG. 16A is a drawing that depicts an example open itemcard drawer screen with item tabs according to one aspect of the invention.

In another preferred aspect of the present invention, indicated in portion 106, of FIG. 6, are the FileQuantity Calculator Fields that automatically calculate and indicate the total quantity of Files either shared or private or total as appropriate, on the screen in FIG. 6. These FileQuantity Calculator Fields are used throughout the system to calculate and indicate quantities of Files as appropriate for that particular screen. It should be pointed out that if a visitor is at the virtual office screen of another user, the filecount boxes relating to private file and item counts are preferably blank so that unauthorized persons cannot see or determine how many private files and items that particular user has. In another preferred aspect of the present invention, indicated by portion 107, is the users ltemCards file in which all E-Items are retrievable in numerical order by ItemNumber. Portion 108, indicates the "S" ltemCard drawer that contains the user's "Shared" E-Items. All E-Items that are designated as shared or non-private by the user/file owner are automatically accessible in that index card drawer. On the electronic screen, each ltemCard drawer face is actually a button which when activated by a click of a mouse or any other appropriate input device, opens the drawer taking the user to another screen indicating an open card file drawer with tabs as shown in FIG. 16A of the drawings. This ItemCard drawer is totally parallel and analogous to an optional physical card file drawer that a user may have if desired for any physical/hard copy shared ItemCards as part of the system. In addition, both the electronic ItemCard drawer on the screen as well as any physical ItemCard drawer are not locked since they contain the E-Items that are designated as shared by that user.

Portion 109, indicates the "P" ItemCard drawer that contains the users "Private" or non-shared E- Items. All E-Items that are designated as private or non-shared by the user/file owner are automatically accessible in that drawer. On the electronic screen, the ItemCard drawer face is actually a button which when activated by a click of a mouse or any other appropriate input device, opens the drawer taking the user to another screen indicating an open file drawer with tabs similar to those shown in FIG. 16A of the drawings. This E- Items drawer is totally parallel and analogous to an optional physical card file drawer that a user may have if desired for any physical/hard copy private ItemCards as part of the system. In addition, both the electronic file drawer on the screen as well as the physical file drawer are locked since they contain the E- Items that are designated as private by the user/file owner. For a user that may be visiting the file owners room, to gain access to the users private files and items, the visitor would need to have the file owner's "private file key" password. The selections as to who is given access to a user's various keys and passwords is made in the system security and access portions of the system which are accessed by the button labeled "About users and passwords", in portion 105 of FIG. 6. Above each indexcard drawer is a box that indicates the number of shared and private E-items, respectively, in the user's system. The item count box portion 110, of FIG. 6, shows the ItemQuantity Calculator Fields that automatically calculate and indicate the total quantity of Items either shared or private or total as appropriate, that the user has in the system. For a visitor, this number would correspond only to available or shared files and items. These ItemQuantity Calculator Fields are used throughout the system to calculate and indicate quantities of Items and files as appropriate for that particular screen.

Figure 10:
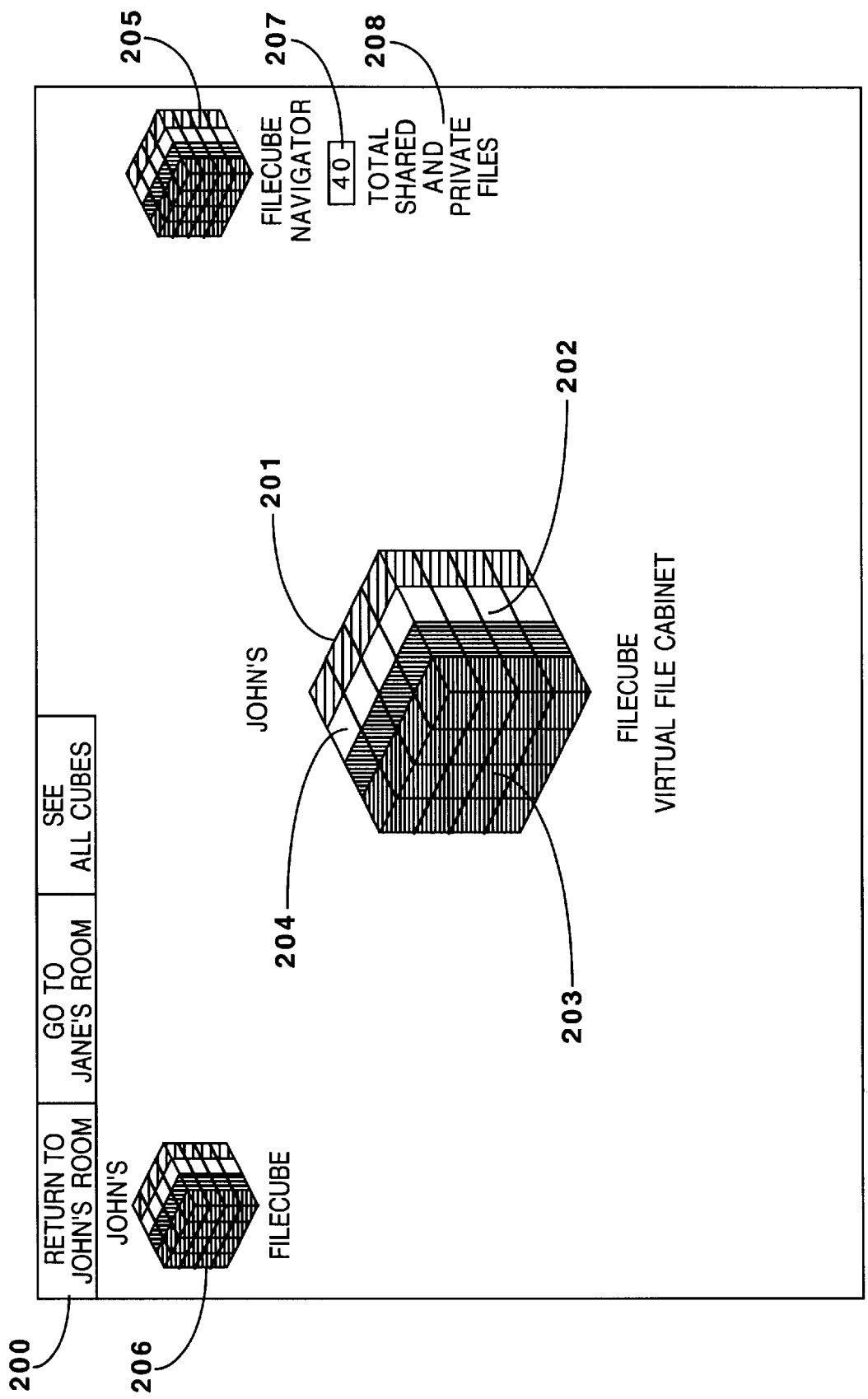
FIG. 10 is an example user's Filecube screen which provides a way to access to all three working sides of the three dimensional virtual file cabinet according to an aspect of the invention.

In another preferred aspect of the present invention, indicated by portion 111 on FIG. 6, a computer screen on a desk top computer is depicted. On the virtual computer screen, portion 112, is actually a button which when activated by a click of a mouse or any other appropriate input device, takes the user into the virtual three dimensional address structure via another screen indicating that user's Filecube Virtual File Cabinet as shown in FIG. 10 of the drawings. In other words, this button represents one route by which the user may begin navigating through their virtual three dimensional filing cabinet to store and/or retrieve information in the system.

Figure 13:
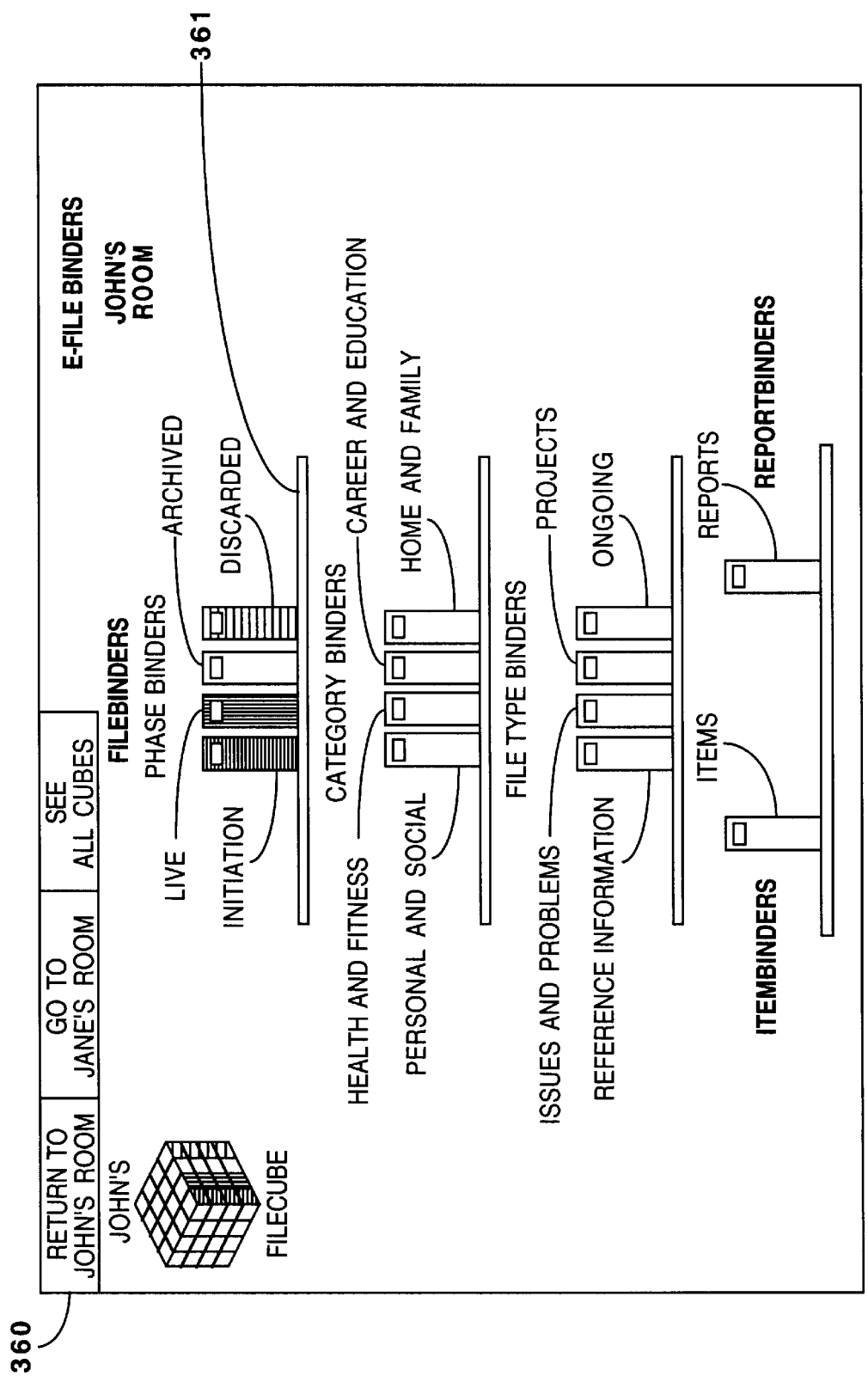
FIG. 13 is a screen depicting virtual shelves of binders which can be used to organize lists of different groupings of virtual file folders according to one aspect of the invention.

In another preferred aspect of the present invention, indicated by portion 113 on FIG. 6, a set of shelves with binders is depicted. On the electronic screen, the shelves and binders, portion 114, is a button which when activated by a click of a mouse or any other appropriate input device, takes the user to another screen showing that user's FileBinders, ItemBinders as well as other Binders as shown in FIG. 13 of the drawings. The binders provide the user with another route by which their stored information can be accessed.

Figure 7:
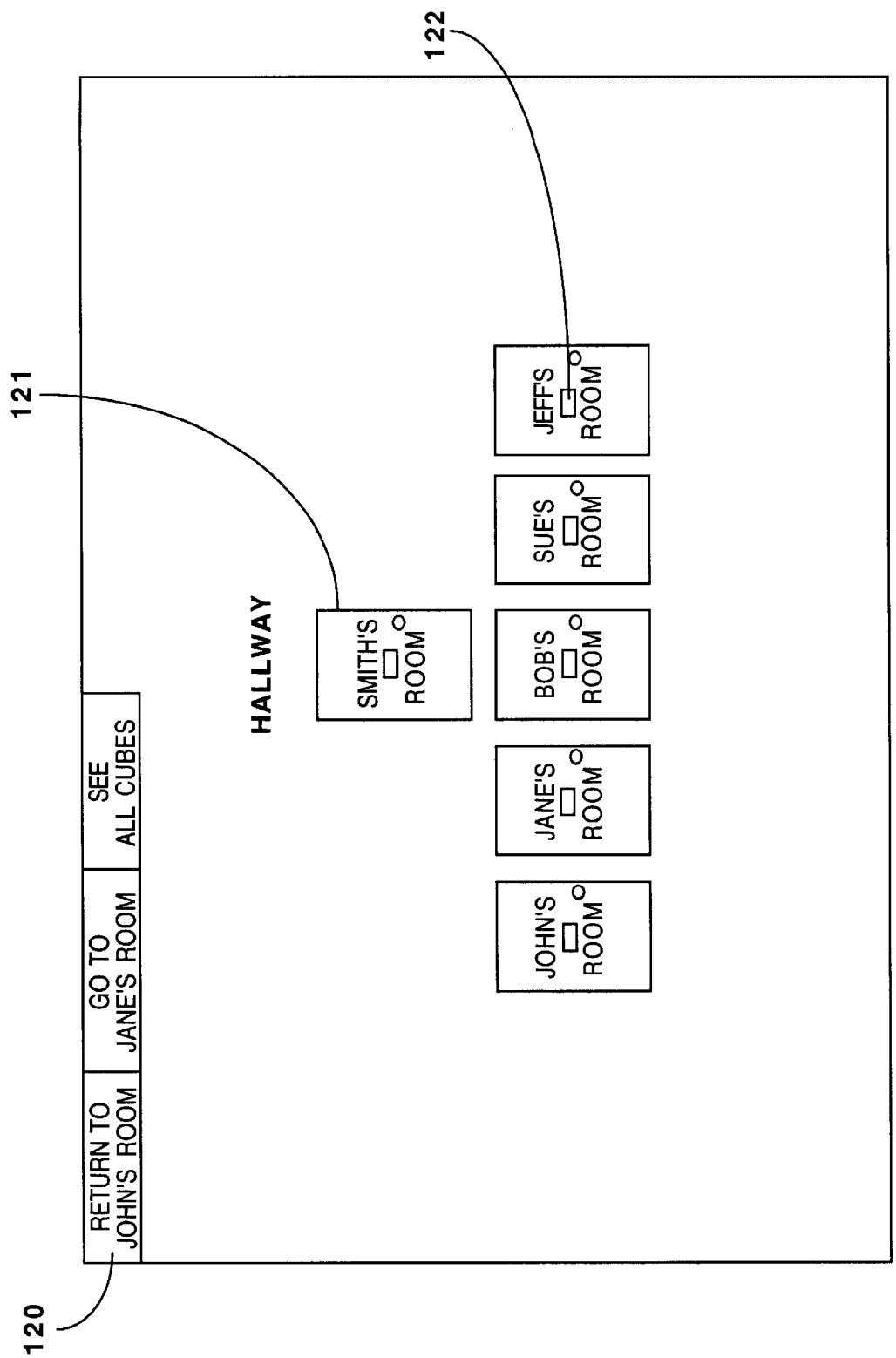
FIG. 7 is an example hallway screen which provides an easy to understand way for users to access other user's stored information in a preferred embodiment of the invention.

In another preferred aspect of the present invention, indicated by portion 115 on FIG. 6, a door is depicted. On the electronic screen, the door, portion 115, is a button which when activated by a click of a mouse or any other appropriate input device, takes the user to another screen that represent a virtual hallway that contains doors to the rooms of all the other users of a group system, which in this example are members of the user's family, as shown in FIG. 7 of the drawings. FIG. 7 depicts an example virtual hallway screen which provides an easy to understand way to visit other user's rooms within the system in one aspect of the invention. The hallway is parallel and analogous to a hallway in a home or office building which includes doors that can be locked for controlled access to selected persons and provides a metaphor for navigation which is easy to understand and relate to by virtually any user. Portion 120 of FIG. 7 shows the navigation buttons that are used to perform the self explanatory functions as indicated by the labels on the individual buttons. Portion 121 of FIG. 7 shows a typical room door which is used to provide access by the "current user" to the rooms/offices of other users, who when visited are termed "visited user". On the electronic screen, the door, portion 121, is a button which when activated by a click of a mouse or any other appropriate input device, takes the user to another screen indicating the room or office of a "visited user" which is depicted by a room screen similar to that shown in FIG. 6 of the drawings. Portion 122 on FIG. 7, indicates a room door lock indicator which indicates to a user whether a particular door is locked or not. If a door is locked, after clicking on the door button, the user is asked to provide the specific "room door key" password for the particular office room that is going to be visited. If the current user provides the correct password, access is granted, and if not, access is not granted. In another aspect of the invention, the selection by the registered users of the system as to whom they will share room key passwords with, is made on appropriate screens within the security and access portions of the system.

Figure 8:
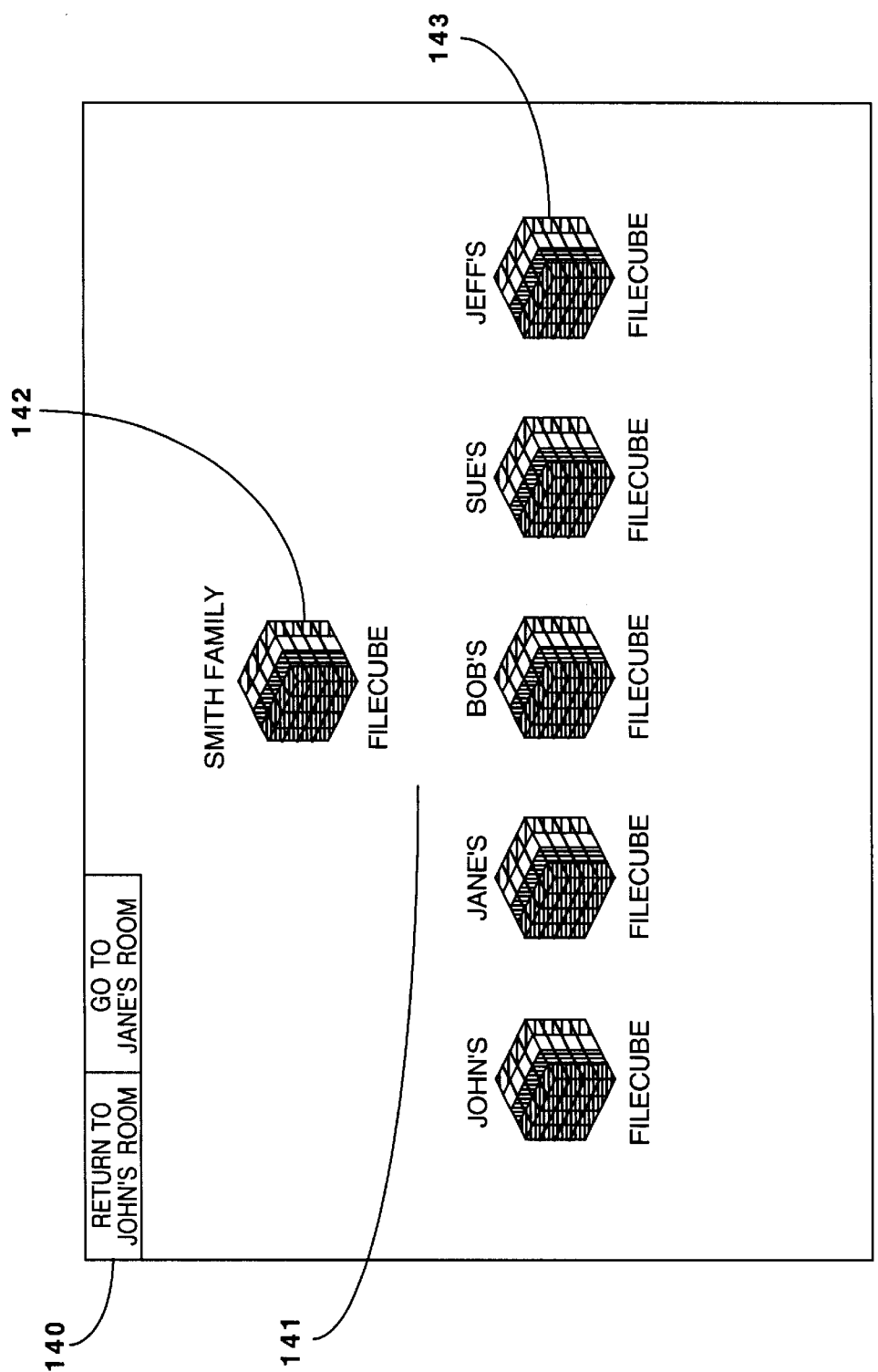
FIG. 8 is an example multiple Filecube screen which illustrates a grouping of entity Filecubes forming an enterprise such as a family and provides an easy to understand access to visit other user's Filecubes within the system of the invention.

FIG. 8 depicts a typical multiple Filecube screen which is accessed by clicking on the "See All Cubes" button of FIG. 7. This screen illustrates a grouping of entity Filecubes forming an enterprise such as a family and provides another easy to understand way to gain access or visit other users Filecubes within the system. However, it should be pointed out that the same security protocols applicable in the doorway access of FIG. 78 are also present in the direct filecube access provided in FIG. 8. Portion 140 of FIG. 8 shows the self explanatory navigation buttons that are used to perform various functions as indicated by the labels on the individual buttons. Portion 141, of FIG. 8 shows various individual Filecubes in this particular enterprise, which includes a separate Filecube for each individual member of the group or enterprise, in this case depicting individual family members as well as the shared Family Filecube. Beside the Enterprise wide shared Filecube, Portion 142, which in this example is the Family Filecube, the number of additional individual Filecubes is determined by the total number of users currently registered to use the system. In this example, the number of Filecubes would coincide with the number of members in the family. Portion 143 of FIG. 8 depicts one of the individual Filecubes. On the electronic screen, this Filecube as well as all of the other Filecubes are actually buttons which when activated by a click of a mouse or any other appropriate input device, take the user to another screen indicating the Filecube Virtual File Cabinet of a visited user which is depicted by a screen as shown in FIG. 10 of the drawings.

Figure 9B:
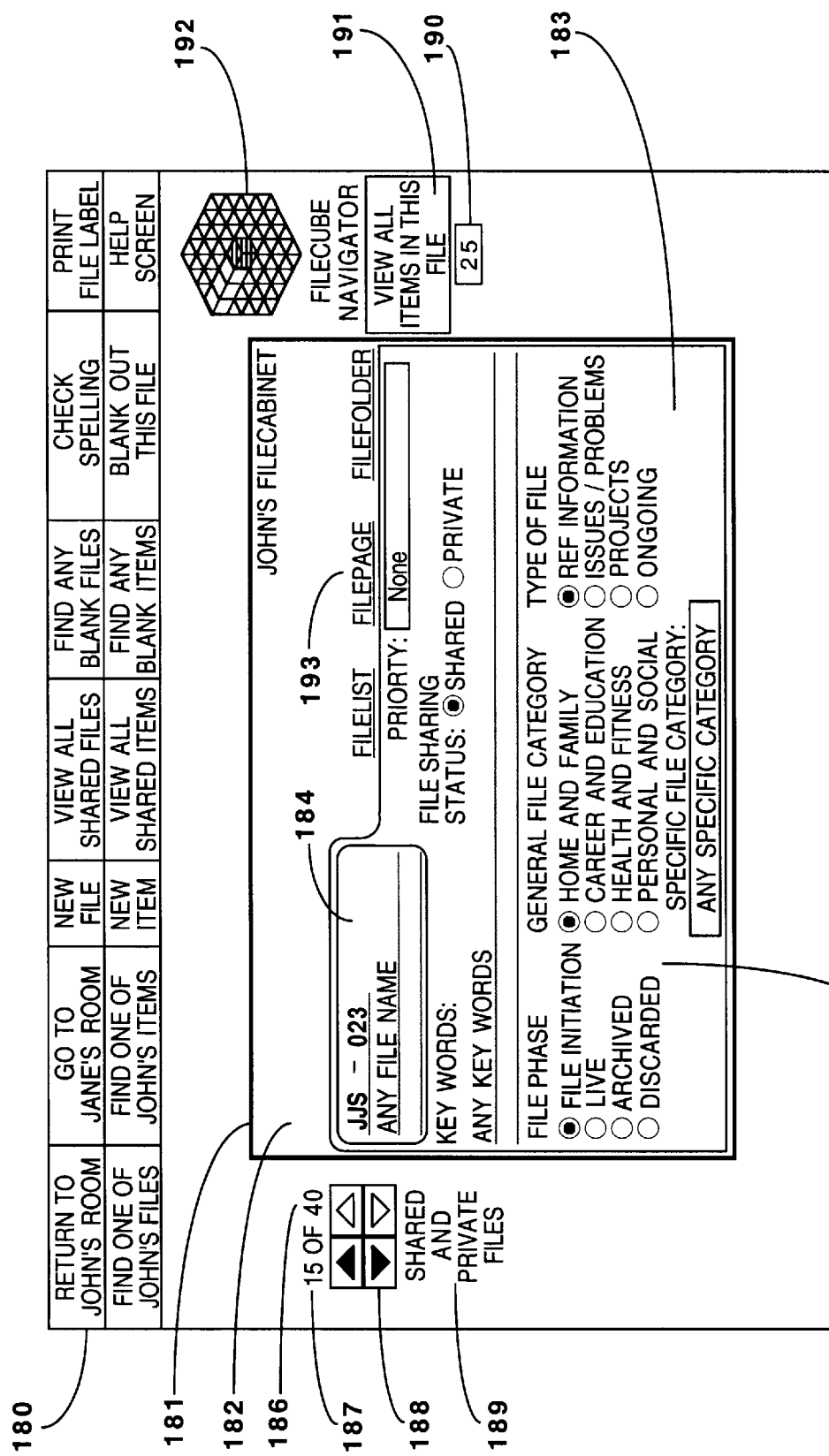
FIG. 9B is an example virtual file folder screen showing the virtual outer cover of one virtual file folder according to one aspect of the invention.

FIG. 9A depicts a typical open file drawer screen with file tabs in a preferred embodiment of the invention that can be accessed by clicking on the face of the "S" file drawer 103 of FIG. 6. That open file cabinet drawer and tabs are identical to and parallel and analogous to the users own numerical File cabinet in that persons physical room or office. On the electronic screen, the File Tabs portion 160, are actually buttons which when activated by a click of a mouse or any other appropriate input device, take the user to other screens as indicated by the labels on the File Tabs. In this case, the File Tab labeled "List of E-Files" will take the user to a list screen similar to that shown in FIG. 17 of the drawings and the File Tab labeled "E-File Folders" will take the user to a File Folder screen as shown in FIG. 9B of the drawings. These tabs and the screens they navigate to, are completely parallel with the physical file cabinet that the user will have to store his or her numerical Folders thus making the interface and navigation extremely intuitive and easy to use. Portion 161 of FIG. 9A indicates the FileQuantity Calculator Field that indicates the total number or count of Files that have been found in this particular "Find" or inquiry. Portion 162 of FIG. 9A is a field which indicates specifically the type of grouping of the Files found in this particular "Find" or inquiry, which in this case, indicates the grouping of "Shared Files". Thus the file count in this example screen should be identical to the count indicated on the front face of "S" drawer 103 in FIG. 6. Portion 163 of FIG. 9A shows the navigation buttons that are used to perform various functions as indicated by the labels on the individual buttons.

FIG. 9B depicts a typical manila file folder screen that could be accessed by clicking on the "E-File Folders" button of FIG. 9A. This File Folder is parallel and analogous to the users physical or hardcopy numerical File Folders that are stored within the FileCabinet Numerical File. Portion 180 of FIG. 9B shows the self explanatory navigation buttons that are used to perform various functions as indicated by the labels on the individual buttons. Background portion 181 of FIG. 9B indicates the beige colored File Cabinet drawer, the color of the "S" file drawer 103 of FIG. 6, that the numerical files are stored within. On the electronic screen, the colored upper portion of the drawer as indicated by portion 182, is actually a button which, when activated by a click of a mouse or any other appropriate input device, returns the user to the screen indicating the File Tabs as shown in FIG. 9A of the drawings. Portion 183 of FIG. 9B, shows what might be printed on the outer cover of the hardcopy manila file folder which is parallel and analogous to the virtual file folders utilized within one embodiment of the invention. The File Folder has a conventional tab with information as shown in portion 184, of FIG. 9B. This folder tab contains information about that file including the file's E-Number or File Number as well as the actual Name of the File. This also is identical to the tab and information included on the tabs of the counterpart hardcopy file folders, if any.

The remaining area of the front of the File Folder as indicated in portion 185, of FIG. 9B, contains the other key information about that particular file including the File Attributes of File Phase, File Category and Type of File. The attributes correspond to the coordinates (X, Z and Y axis) within the three dimensional address structure in which the file is currently stored. Also included is information about the sharing status of the file, a key words field to further aid in file retrieval as well as the specific file category, if any, of that particular file. Other types of information may also be included as required for other possible applications of the present invention. For instance, FIG. 18 shows an expanded summary page that includes additional information that could be included on the face of the file folder of FIG. 9B.

Portion 186 of FIG. 9B indicates the FileQuantity Calculator Field that indicates the total number or count of Files that have been found in this particular "Find" or inquiry. Portion 187 of FIG. 9B is the field that indicates the order of that particular File within the particular group of files that have been found and retrieved in this particular "Find" or inquiry. Portion 188 of FIG. 9B shows the indexing buttons that are used to scroll through the group of Files found in this particular "Find" or inquiry. Portion 189 of FIG. 9B is a field which indicates specifically the type of grouping of the Files found in this particular "Find" or inquiry, which in this case, it indicates the grouping of "All Shared and Private Files". Note that FIG. 6 also indicates 40 such files. Portion 190 of FIG. 9B indicates the ItemQuantity Calculator Field that indicates the total number or count of E-Items that are contained within this particular file. It should be noted that the quantity of Items automatically changes based on any additions or removals of items to or from that particular file. Portion 191 indicates a button which on the electronic screen, when activated by a mouse or some other input device, takes the user directly to a screen similar to that shown in FIG. 16B of the drawings, which permits the user to view all of the Items (itemcards) stored within that particular file.

Portion 192 of FIG. 9B shows the Filecube Navigator interactive icon which is used to indicate the current location of the user in the three dimensional address structure represented by the cubical structure, as well as various groupings of Files and Items within the system. The Filecube Navigator Icon automatically changes to reflect the current status of the File Attributes of File Phase, File Type and File Category (X, Z and Y coordinates) of any specific File or Item or groupings of Files and Items. Examples of different combinations of File Attributes as indicated by the Filecube Navigator are illustrated in FIGS. 15A through 15P in the drawings. Portion 193 are additional buttons which take the user to the specific screens as indicated by the name underlined.

Figure 9C:
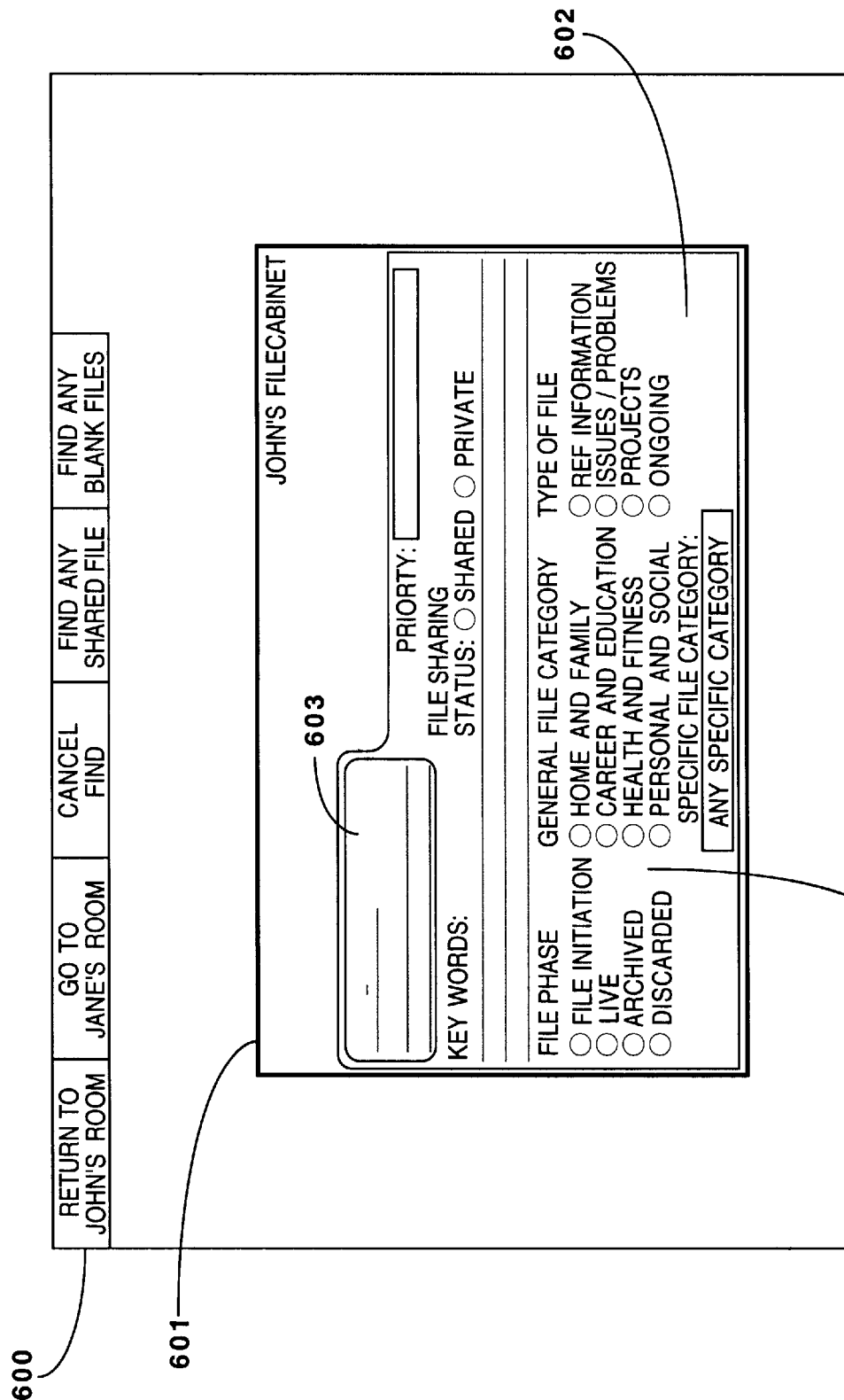
FIG. 9C is an example file search or find screen that shows a file folder that is similar to FIG. 9B except the various searchable fields are blank and awaiting a user query.

FIG. 9C depicts a typical blank "Find" screen in the form of a manila file folder within a preferred embodiment of the invention that could be accessed by clicking on the "Find One of John's Files" button in FIG. 6. This File Folder is parallel and analogous to the users physical numerical File Folders that are stored within various parts of the system. A blank "Find" screen contains information fields that are blank to allow a user to insert information as desired to be used as criteria to find Files based on the information provided. The information provided as find criteria may be, for example, the E-Number of the file desired to be retrieved, information in the form of one or more characters or words inserted into the "key words" field, one or more characters or words inserted into the "file name" field, one or more of the file attributes or descriptors of File Phase, General File Category or Type of File filled in, or any other information inserted into any one or more of the searchable fields that may be available on the particular "Find" screen that is provided.

Portion 600 of FIG. 9C shows the navigation buttons that are used to perform various self explanatory functions as indicated by the labels on the individual buttons. Portion 601 of FIG. 9C indicates the beige colored File Cabinet drawer that the numerical files are stored within, which should correspond to the color of the file drawer 102 of FIG. 6. Portion 602 of FIG. 9C, shows the manila file folder which is parallel and analogous to the physical manila file folders utilized within a specific embodiment of the invention. The File Folder has a conventional tab for information as shown in portion 603, of FIG. 9C. This folder tab contains information fields about a file including the file's E-Number or File Number as well as the Name of the File and the initials of the file's creator. This also is identical to the tab and information included on the tabs of the physical file folders. The remaining area of the front of the File Folder as indicated in portion 604, of FIG. 9C, contains the other key information searchable fields about a file including the File Attributes of File Phase, File Category and Type of File. Also included are fields about the sharing status of the file, a key words field to further aid in file retrieval as well as the specific file category field. Other types of information fields may also be included as required for other possible applications of the present invention.

As an example of the use of the general "Find" function, a blank "Find" screen similar to that shown in FIG. 9C is displayed whenever one of the general "Find" buttons in the system is activated with a mouse or some other input device. An example of one of the general "Find" buttons is shown in the navigation buttons at the top of the "Current User's Room" screen shown in FIG. 6 of the drawings. This navigation button is labeled "Find one of John's Files". When this button is activated, the user is taken to the blank "Find" screen as shown in FIG. 9C. There, the user is able to fill in any information in any one or more of the blank searchable fields to retrieve one or more Files based on the information supplied in the query. Thus the user may fill in, for example, one or more key words into the "Key Words" field then hit the return key to trigger the find. In this example, all of John's files that contain those key words would be found. If no files matched that "Find" request, a message would appear telling the user to try the find again with different information or cancel the find if so desired. Another example of a general "Find" button is the button labeled "Find Any Shared File" included in the navigation buttons at the top of FIG. 9C. This button would trigger a "Find" of files belonging to any of the users of the system, which in the example of the family would include all of the family members as well as the general family files belonging jointly to all of the members of the family. It should be noted, that many other types of general "Find" function buttons and general "Find" screens are included in the present invention for Items as well as the Files. It should be noted, that these general "Find" functions, allow users the total freedom and flexibility to find any and all information on files and/or items, contained within the system, based on any criteria desired by the user. Also, it should also be noted however, that the system is at the same time, designed to preserve all of the security and privacy desired by the users based on the key and password settings defined by the various users and the system administrator.

FIG. 10 depicts a typical Filecube Virtual File Cabinet screen within a preferred embodiment of the invention that can be accessed in a number of ways, including the icon 192 of FIG. 10, the virtual computer screen 112 of FIG. 6, or the left most cube icon 143 of FIG. 8. Portion 200 of FIG. 10 shows the navigation buttons that are used to perform the various self explanatory functions indicated on the labels of the individual buttons. For instance, the "See All Cubes" button would take the user to the screen of FIG. 8. Portion 201 of FIG. 10, shows the main Filecube navigation Icon which is used to navigate to one of the three orthogonal sides or faces of the Filecube as chosen by the User. On the electronic screen, all three sides of the Filecube, the front or right side indicated as portion 202, the left side indicated as portion 203, and the top side indicated as portion 204 are actually buttons that when activated by a click of a mouse or any other appropriate input device, take the user to specific screens based on the particular side of the Filecube Virtual File Cabinet. For instance, if the user click on front face 202 of cube 201, the user is taken to a screen such as the one shown in FIG. 11A of the drawings, which in this case is the front side of the Filecube. Portion 205 of FIG. 10, shows the field which indicates the Filecube Navigator interactive icon which is used to indicate the location of individual Files and Items as well as various groupings of Files and Items within the system. As stated earlier, the Filecube Navigator Icon automatically changes to reflect the current status of the File Attributes of File Phase, File Type and File Category of any specific File or Item or groupings of Files and Items. In this screen, the filecube navigator is shown whole since the user has not entered a specific part or face of the filecube. Examples of different combinations of File Attributes (i.e. groupings of files) as indicated by the Filecube Navigator are illustrated in FIGS. 15A through 15P in the drawings. Portion 206 of FIG. 10, is available on most other screens, and is simply a button which returns the user from any screen back to the Filecube Virtual File Cabinet screen as shown in FIG. 10. Portion 207 of FIG. 10 indicates the FileQuantity Calculator Field that indicates the total number or count of Files that have been found in this particular "Find" or inquiry. Portion 208 of FIG. 10 is a field which indicates specifically the type of grouping of the Files found in this particular "Find" or inquiry, which in this case, it indicates the grouping of "Total Shared and Private Files".

Figure 11A:
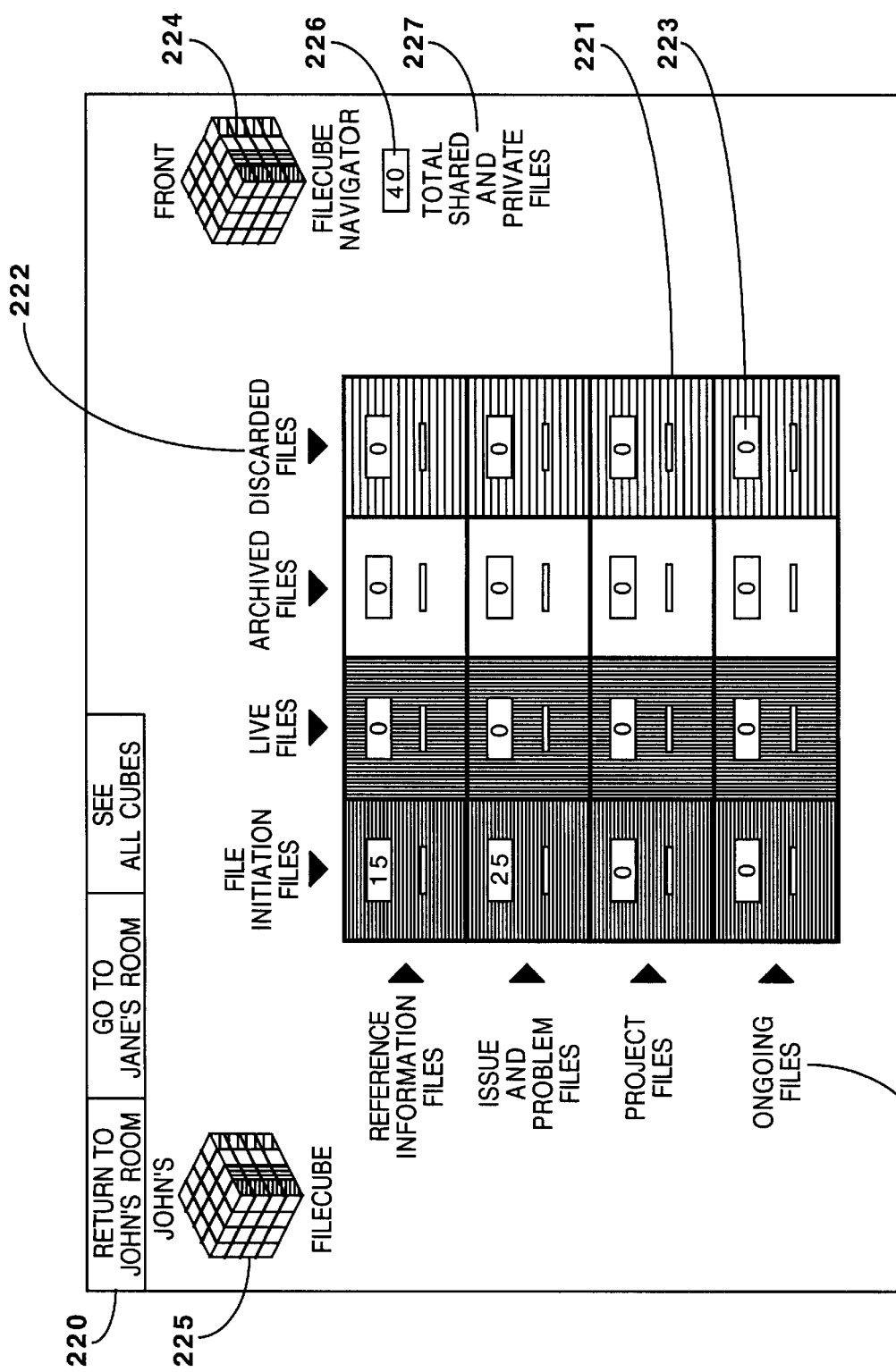
FIG. 11A is screen showing the front side of the three dimensional virtual file cabinet that provides direct access to the various virtual file drawers on the front face of a user's filecube in one aspect of the invention.

FIG. 11A depicts a screen showing a view of the front side of the Filecube Virtual File Cabinet which could be accessed by clicking on face 202 of FIG. 10. In the illustrated example, each face of the file cube represents four side-by-side filing cabinets that each have four drawers. An actual physical filecube having the mechanical abilities (drawers on three sides) would be difficult to impossible to actually build in the real world, and virtually impossible or extremely unwieldy to use if it could be built. The filecube of the present invention frees one from the gravitational and other physical constraints of the real world, yet retains the intuitive ease of use of conventional physical filing cabinets. Portion 220 of FIG. 11A shows the self explanatory navigation buttons that are used to perform various functions as indicated by the labels on the individual buttons. Portion 221 of FIG. 11A shows the enlarged view of the front side of the Filecube Virtual File Cabinet. This portion as graphically shown, consists of 16 drawers which contain all of the appropriate Files and Items as indicated by the drawer labels, 222. The four different phase attributes or descriptors 222 correspond to the X-axis of the three dimensional address structure, and the four vertically displayed file type attributes or descriptors corresponds to the Z-axis. On the electronic screen, each of the 16 file drawer faces is actually a button which when activated by a click of a mouse or any other appropriate input device, open the chosen drawer taking the user to another screen indicating the open file drawer with tabs similar to those shown in FIG. 12A of the drawings. Portion 223 of FIG. 11A, indicates the various FileQuantity calculation fields which automatically calculate and indicate the total number of Files in each of the individual 16 drawers based on the File attributes of File Phase and File Type specified for each and every File stored within that user's system (see area 185 of FIG. 9B). As the person uses the system and manipulates the Files in various ways, the FileQuantity Calculator Fields automatically recalculate and indicate the exact number of files in each of the 16 file drawers. Portion 224 of FIG. 11A, shows the field which indicates the Filecube Navigator interactive icon which is used to indicate the current location of the user in the system, which in this screen the user is virtually standing in front of the filecube three dimensional filing cabinet. As stated earlier, the Filecube Navigator Icon automatically changes to reflect the current status of the File Attributes of File Phase, File Type and File Category of any specific File or Item or groupings of Files and Items. Examples of different combinations of File Attributes as indicated by the Filecube Navigator are illustrated in FIGS. 15A through 15P in the drawings. Portion 225 of FIG. 11A, is simply a button which returns the user from any screen back to the Filecube Virtual File Cabinet screen as shown in FIG. 10 of the drawings. Portion 226 of FIG. 11A indicates the FileQuantity Calculator Field that indicates the total number or count of Files that have been found in this particular "Find" or inquiry. Portion 227 of FIG. 11A is a field which indicates specifically the type of grouping of the Files found in this particular "Find" or inquiry, which in this case, it indicates the grouping of "Total Shared and Private Files".

Figure 11B:
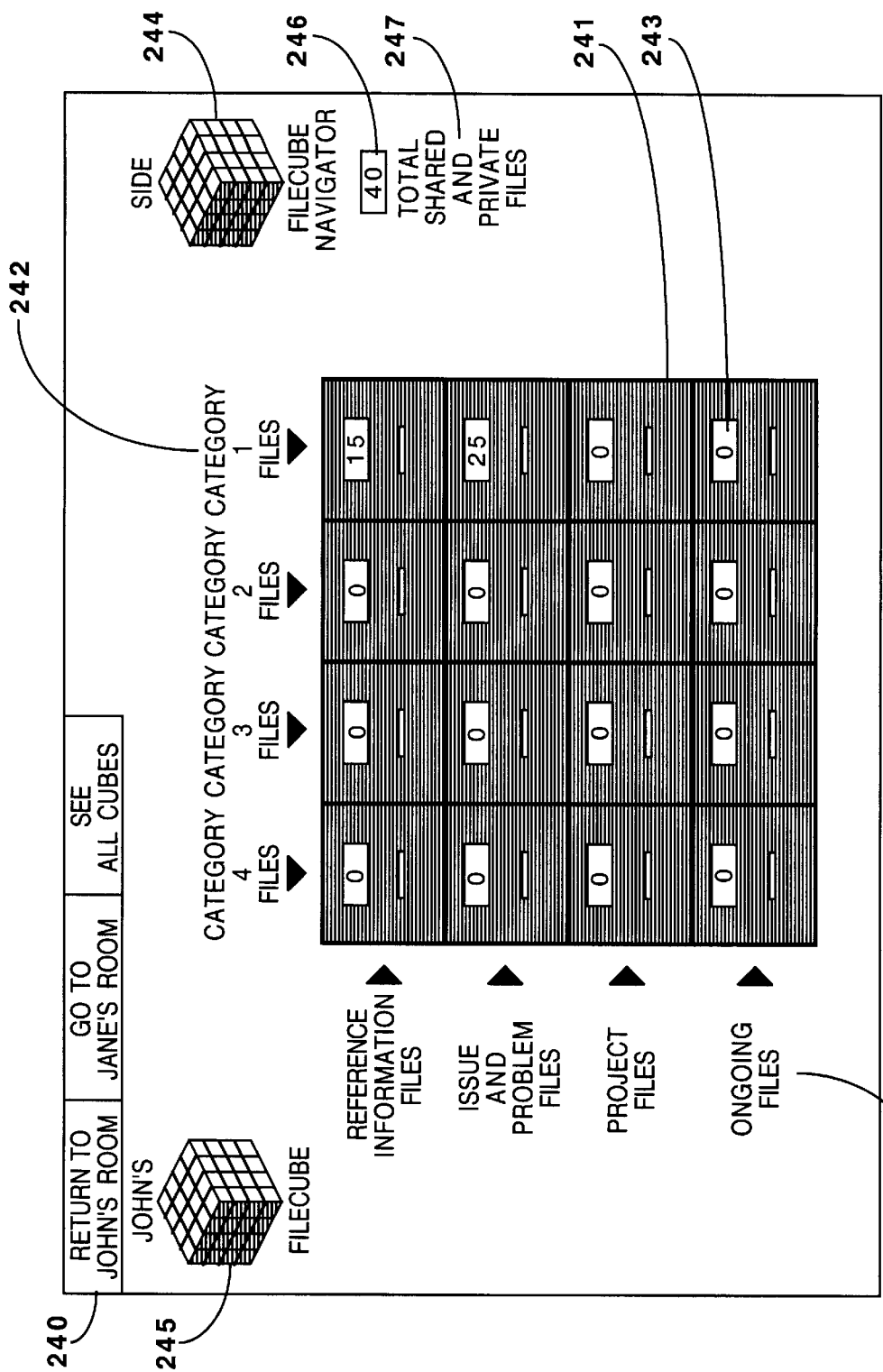
FIG. 11B is a screen showing the left side of the three dimensional virtual file cabinet that provides direct access to the various virtual file drawers on the left side face of a user's filecube.

FIG. 11B depicts a screen similar to FIG. 11A except showing a view of the left side of the Filecube Virtual File Cabinet that would be accessible by clicking on side 203 of FIG. 10. Portion 240 of FIG. 11B shows the navigation buttons that are used to perform various functions as indicated by the labels on the individual buttons. Portion 241 of FIG. 11B shows the enlarged view of the left side of the Filecube Virtual File Cabinet. Like the front face shown in FIG. 11A, this portion, as graphically shown, consists of 16 drawers which contain all of the appropriate Files and Items as indicated by the drawer descriptors or attributes 242 that are distributed vertically and horizontally adjacent the appropriate drawers. The four categories across the top of the cabinet corresponds to the Z-axis of the three dimensional address structure of the invention. On the electronic screen, each of the 16 file drawer faces, is actually a button which when activated by a click of a mouse or any other appropriate input device, open the chosen drawer taking the user to another screen indicating the open file drawer with tabs similar to those shown in FIG. 12A of the drawings. Portion 243 of FIG. 11, indicates the various FileQuantity calculation fields which automatically calculate and indicate the total number of Files in each of the individual 16 drawers based on the File attributes of File Phase and File Type specified for each and every File stored within that user's system. As the person uses the system and manipulates the Files in various ways, the FileQuantity Calculator Fields automatically recalculate and indicate the exact number of files in each of the 16 file drawers. It should be noted that every file is accessible through different drawers on each of the three faces of the filecube. Portion 244 of FIG. 11B, shows the field which indicates the Filecube Navigator interactive icon which indicates that the user is currently on the screen which is the left side of the Filecube. Examples of different combinations of File Attributes as indicated by the Filecube Navigator are illustrated in FIGS. 15A through 15P in the drawings. Portion 245 of FIG. 11B, is simply a button which returns the user from any screen back to the Filecube Virtual File Cabinet screen as shown in FIG. 10 of the drawings. Portion 246 of FIG. 11B indicates the FileQuantity Calculator Field that indicates the total number or count of Files that have been found in this particular "Find" or inquiry. Portion 247 of FIG. 11B is a field which indicates specifically the type of grouping of the Files found in this particular "Find" or inquiry, which in this case, it indicates the grouping of "Total Shared and Private Files".

Figure 11C:
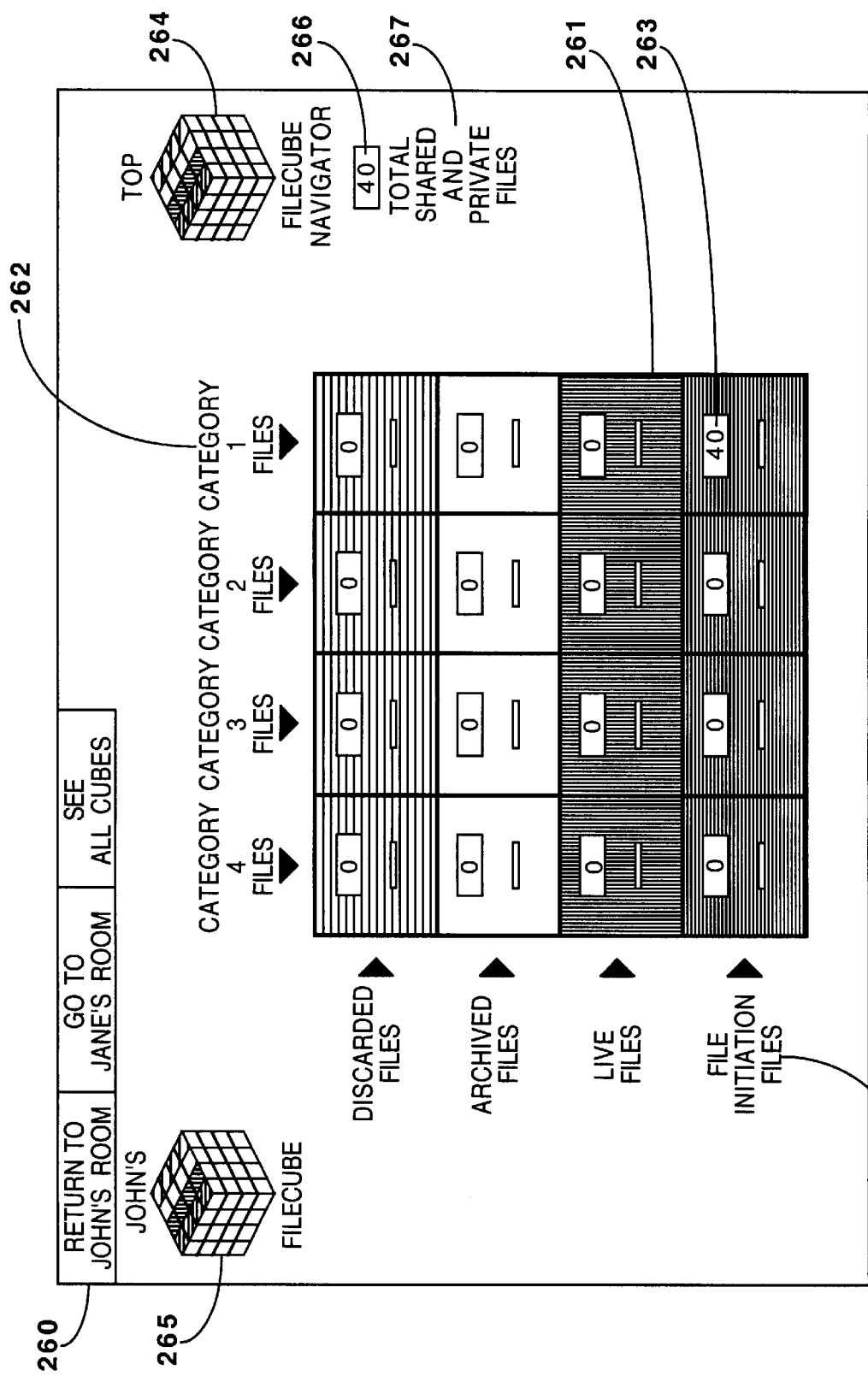
FIG. 11C is a screen showing the top side of the three dimensional virtual file cabinet that provides direct access to the various file drawers on the top side face of a user's filecube.

FIG. 11C depicts a screen similar to FIGS. 11A and B except showing a view of the top side of the Filecube Virtual File Cabinet which could be accessed by clicking on the top side 204 of cube 201 in FIG. 10. Portion 260 of FIG. 11C shows the navigation buttons that are used to perform various functions as indicated by the labels on the individual buttons. Portion 261 of FIG. 11C shows the enlarged view of the top side of the Filecube Virtual File Cabinet. This portion as graphically shown, consists of 16 drawers which contain all of the appropriate Files and Items as indicated by the drawer or axes descriptors or attributes 262 distributed along the sides of the cabinet. On the electronic screen, each of the 16 file drawer faces, is actually a button which when activated by a click of a mouse or any other appropriate input device, open the chosen drawer taking the user to another screen indicating the open file drawer with tabs similar to those shown in FIG. 12A of the drawings. Portion 263 of FIG. 11C, indicates the various FileQuantity calculation fields which automatically calculate and indicate the total number of Files in each of the individual 16 drawers based on the File attributes of File Phase and File Type specified for each and every File stored within that user's system. As the person uses the system and manipulates the Files in various ways, the FileQuantity Calculator Fields automatically recalculate and indicate the exact number of files in each of the 16 file drawers. Portion 264 of FIG. 11C, shows the field which indicates the Filecube Navigator interactive icon which is used to indicate that the user is currently on the screen which is the top side of the Filecube. Examples of different combinations of File Attributes or descriptors as indicated by the Filecube Navigator are illustrated in FIGS. 15A through 15P in the drawings. Portion 265 of FIG. 11C, is simply a button which returns the user from any screen back to the Filecube Virtual File Cabinet screen as shown in FIG. 10 of the drawings. Portion 266 of FIG. 11C indicates the FileQuantity Calculator Field that indicates the total number or count of Files that have been found in this particular "Find" or inquiry. Portion 267 of FIG. 11 is a field which indicates specifically the type of grouping of the Files found in this particular "Find" or inquiry, which in this case, it indicates the grouping of "Total Shared and Private Files".

Figure 12A:
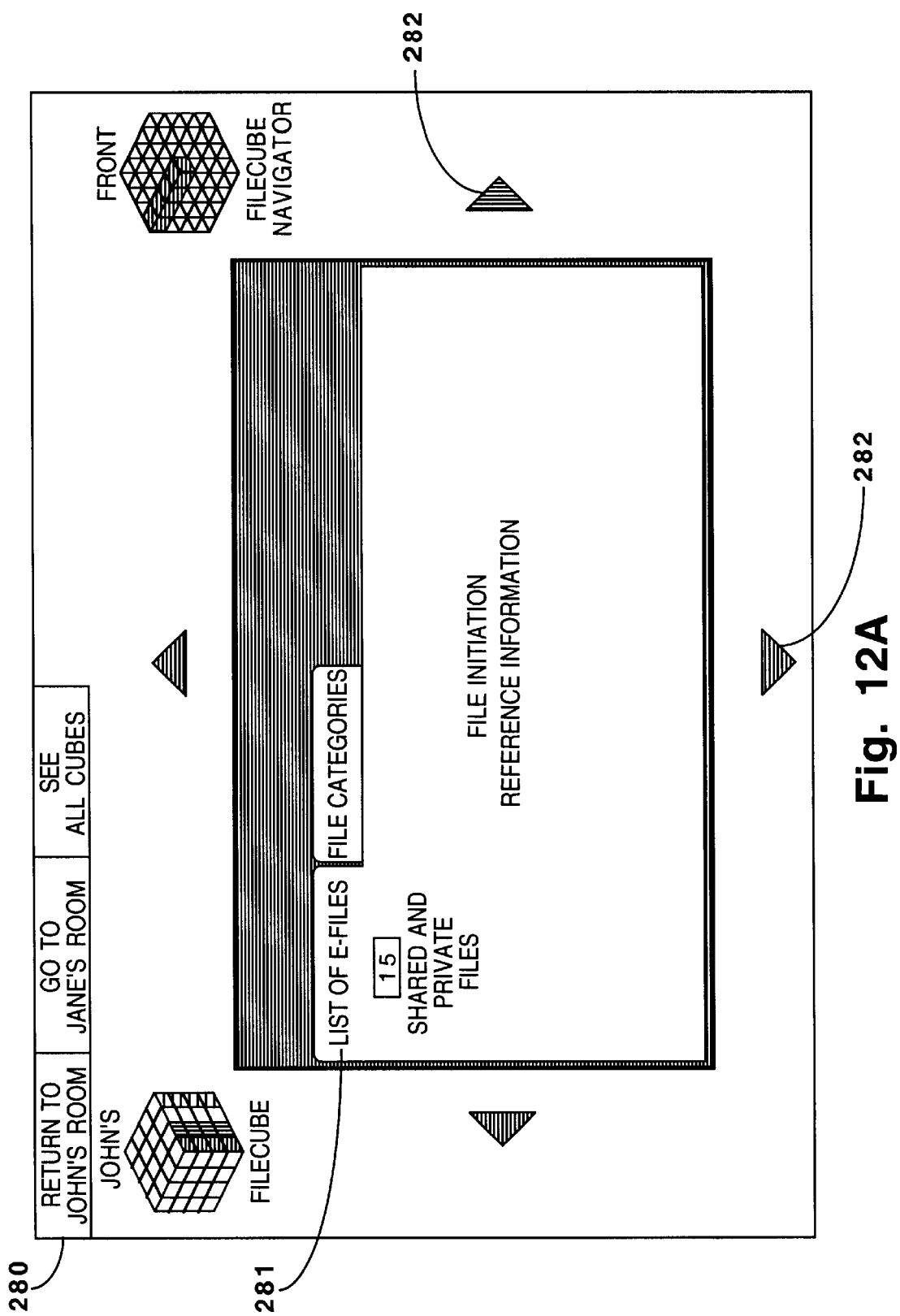
FIG. 12A is an example open file drawer screen for the upper left drawer on the front side face of a user's filecube.
Figure 12B:
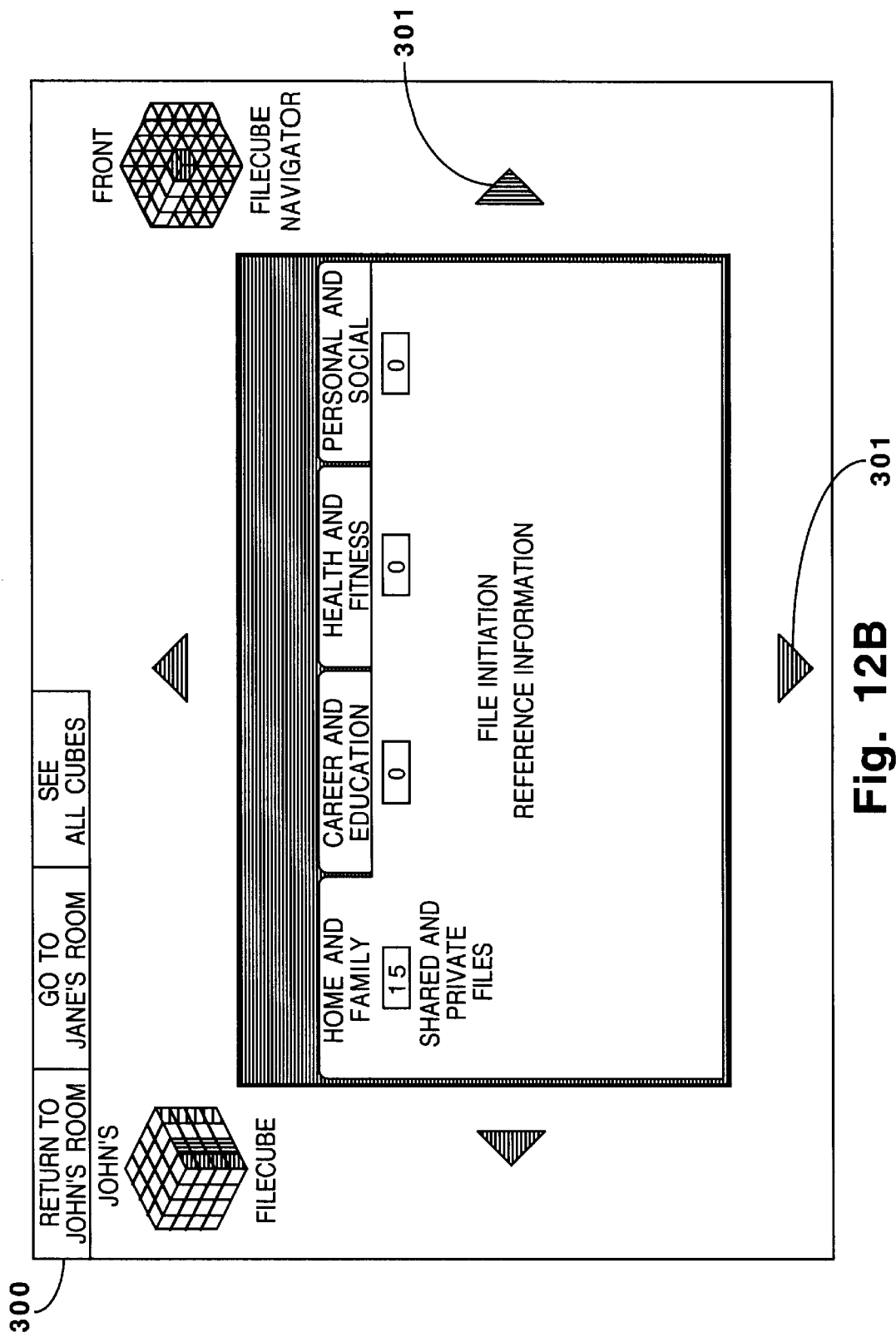
FIG. 12B is an example open file drawer screen similar to that of FIG. 12A, except showing a different category tab for each of the virtual boxes in the upper left drawer on the front side face of a user's filecube.

FIG. 12A depicts a typical open file drawer screen with file tabs that would be accessed by clicking on the upper left hand drawer (Initiation—Reference Information drawer) of FIG. 11A. The background area above the tabs is color coded to match the color of that particular drawer. Portion 280 of FIG. 12A shows the navigation buttons that are used to perform various functions as indicated by the labels on the individual buttons. On the electronic screen, the File Tabs portion 281, are actually buttons which when activated by a click of a mouse or any other appropriate input device, take the user to other screens as indicated by the labels on the File Tabs. In this case, the File Tab labeled "List of E-Files" will take the user to a list screen as shown in FIG. 17 of the drawings and the File Tab labeled "File Categories" will take the user to a File Tab screen as shown in FIG. 12B of the drawings, which show individual Tabs for each of the General File Categories which are contained within that File Drawer. Portions 282 indicate vertical and horizontal navigation buttons, which when activated by a click of a mouse or any other appropriate input device, take the user to other screens which indicate the adjacent Filecube drawer depending on the direction chosen by the user. In this case, the filecube navigator shows that the user can only move to different drawers to the right or downward. These navigation buttons allow the user to quickly navigate between the various drawers on most of the screens within the Filecube Virtual File Cabinet. The filecube navigator shows that the user has chosen the complete drawer of Initiation—Reference Information files.

FIG. 12B depicts a typical open file drawer screen with "File Category" file tabs within the Filecube drawers with the filecube navigator showing the user currently in the box containing Initiation—Reference Information—Home and Family files. On the electronic screen, the File Category Tabs portion 300, are actually buttons which when activated by a click of a mouse or any other appropriate input device, take the user to other screens (other boxes within the drawer) as indicated by the labels on the File Tabs. In this case, the File Tab labeled "Home and Family" will take the user to a manila FileFolder screen as shown in FIG. 12D of the drawings and will automatically find all of the Files and E-Items within those files that belong to the "Current User" and that fall into the File Initiation Phase, the Reference Information Type of File and the Home and Family Category box of files. It should be noted that this "find" or inquiry was completed simply by the current user opening the drawers on the screen by clicking on the desired drawer face buttons and by clicking on the desired file tabs. The Filecube system always knows and keeps track of for navigation, access and security purposes, who the "current user" is as well as who the "visited user" is, thus the find or inquiry indicated above is accomplished with two simple clicks of a mouse with absolutely no other inputs or data filled in by the user of the system. It should also be noted that the entire Filecube system works in this fashion thus greatly assisting the user by being able to easily focus on specific groupings of files and items and by saving great amounts of time by easily navigating through potentially thousands of files and Items with a few simple clicks of a mouse or other appropriate input device, such as a touch screen user interface. Arrow buttons 301 indicate vertical and horizontal navigation buttons, which when activated by a click of a mouse or any other appropriate input device, take the user to other screens which indicate the adjacent Filecube drawer depending on the direction chosen by the user. These navigation buttons allow the user to quickly navigate between the various drawers on most of the screens within the Filecube Virtual File Cabinet.

Figure 12C:
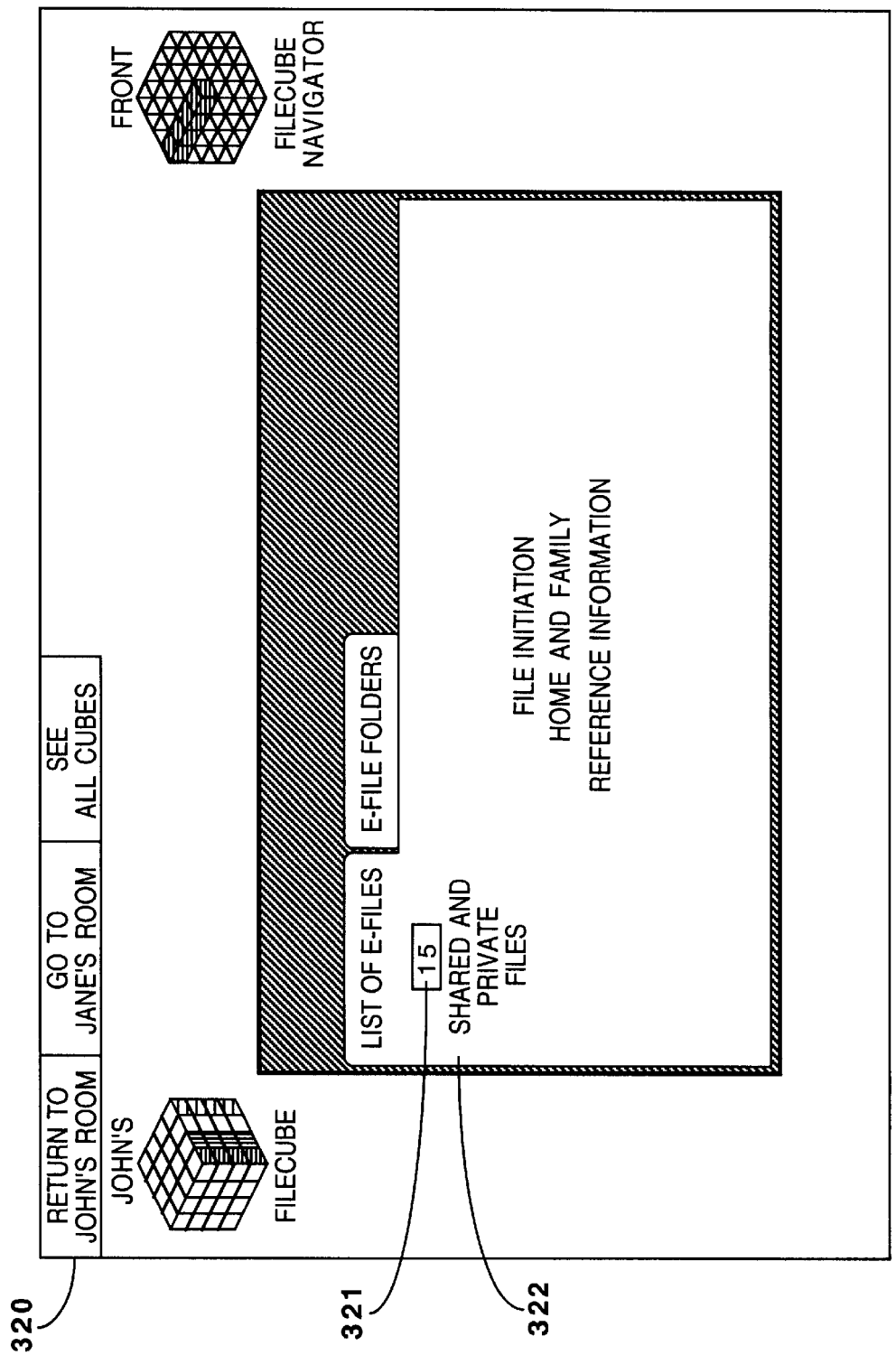
FIG. 12C is a drawing screen similar to that of FIG. 12A, except the filecube navigator is focused on a single box within a drawer rather than the complete drawer or strand of FIG. 12A.
Figure 12D:
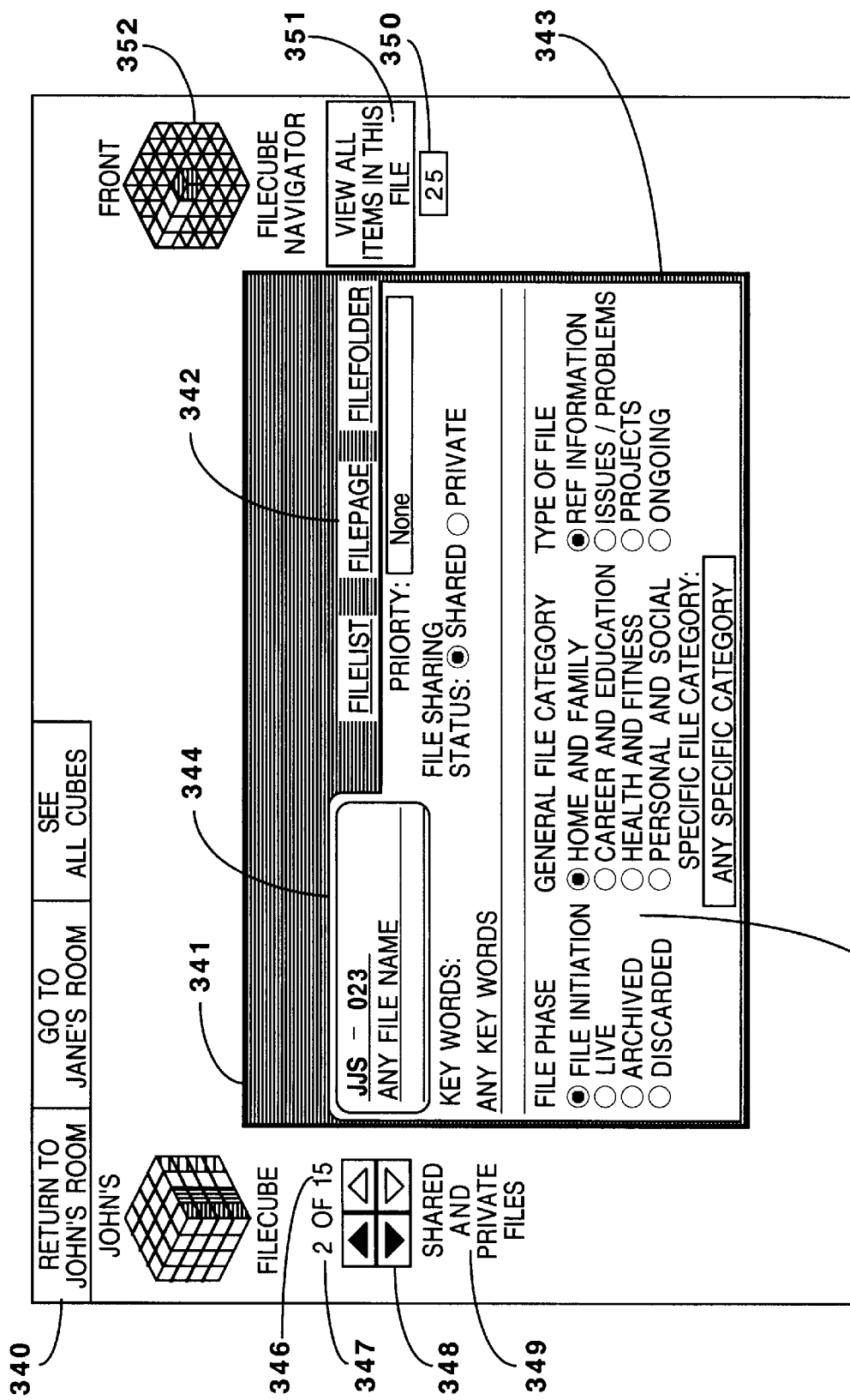
FIG. 12D is an example virtual file folder screen showing the virtual outer cover of one virtual file folder in the first virtual box in the upper left drawer on the front side face of a user's filecube.

FIG. 12C depicts a typical open box and file drawer screen with file tabs in a preferred embodiment of the invention. In this case, the user is in the Initiation—Reference Information—Home and Family box of files. On the electronic screen, the File Tabs portion 320, are actually buttons which when activated by a click of a mouse or any other appropriate input device, takes the user to other screens as indicated by the labels on the File Tabs. In this case, the File Tab labeled "List of E-Files" will take the user to a list screen as shown in FIG. 17 of the drawings and the File Tab labeled "E-File Folders" will take the user to a File Folder screen as shown in FIG. 12D of the drawings. Portion 321 of FIG. 12C indicates the FileQuantity Calculator Field that indicates the total number or count of Files that have been found in this particular "Find" or inquiry. Portion 322 of FIG. 12C is a field which indicates specifically the type of grouping of the Files found in this particular "Find" or inquiry, which in this case, indicates the grouping of "Shared and Private Files".

FIG. 12D depicts a typical manila file folder screen within a preferred embodiment of the invention. This screen is similar to the screen depicted in FIG. 9B of the drawings except it has been accessed through the filecube navigator. Portion 340 of FIG. 12D shows the navigation buttons that are used to perform various functions as indicated by the labels on the individual buttons. Portion 341 of FIG. 12D indicates the blue colored File Cabinet drawer that the File Initiation phase Files are stored within. On the electronic screen, the upper background portion 342, is actually a button which, when activated by a click of a mouse or any other appropriate input device, returns the user to the screen indicating the File Tabs as shown in FIG. 12A of the drawings. Portion 343 of FIG. 12D, shows the outer cover of one of the manila file folders which is parallel and analogous to the physical manila file folders utilized within a specific embodiment of the invention. The File Folder has a conventional tab with information as shown in portion 344, of FIG. 12D. This folder tab contains information about that file including the file's E-Number or File Number as well as the Name of the File. This also is identical to the tab and information included on the tabs of the physical file folders. The remaining area of the front of the File Folder as indicated in portion 345, of FIG. 12D, contains the other key information about that particular file including the File Attributes or descriptors of File Phase, File Category and Type of File. Also included is information about the sharing status of the file, a key words field to further aid in file retrieval as well as the specific file category of that particular file. Other types of information may also be included as required for other possible applications of the present invention. Portion 346 of FIG. 12D indicates the FileQuantity Calculator Field that indicates the total number or count of Files that have been found in this particular "Find" or inquiry. Portion 347 of FIG. 12D is the field that indicates the number of that particular File being viewed within the group of files that have been found in this particular "Find" or inquiry. Portion 348 of FIG. 12D shows the indexing buttons that are used to scroll through the group of Files found in this particular "Find" or inquiry. Portion 349 of FIG. 12D is a field which indicates specifically the type of grouping of the Files found in this particular "Find" or inquiry, which in this case, it indicates the grouping of "All Shared and Private Files". Portion 350 of FIG. 12D indicates the ItemQuantity Calculator Field that indicates the total number or count of E-Items that are contained within this particular group of files. It should be noted that the quantity of Items automatically changes based on any additions or removals of items to or from that particular files. Portion 351 indicates a button which on the electronic screen, when activated by a mouse or some other input device, takes the user directly to a screen similar to that shown in FIG. 16B of the drawings, which allows the user to scroll through the itemcards corresponding to the E-items stored in this group of files. Portion 352 of FIG. 12D is a field which indicates the Filecube Navigator interactive icon which is used to indicate the reflect the current status of the File Attributes of File Phase, File Type and File Category of any specific File or Item or groupings of Files and Items. In this case, the filecube navigator shows the user in the box of Initiation—Reference Material—Home and Family files.

It should also be noted that the entire Filecube system works in a fashion similar to that indicated in FIGS. 10, 11, 12A, 12B, 12C, 12D and the description in the associated text above. Users of the system are thus greatly assisted by being able to easily focus on specific groupings of files and items and by saving great amounts of time by easily navigating through potentially thousands of files and Items with a few simple clicks of a mouse or other appropriate input device.

FIG. 13 depicts the screen which contains the Binders used in a preferred embodiment of the present invention that could be accessed by clicking on the binder button 113 of FIG. 6. Binders are used to organize and list information contained in the system in a manner that is consistent between the physical/hard copy aspects of the system and the electronic/computer screen aspects of the system. Binders provide an easy to understand metaphor which assists the user in organizing and listing various types of information contained within the system. In addition, the Binders allow users to print out specific types of information in the form of Lists, Forms, and Reports all designed specifically for that particular application and organize and store them in a manner that makes the information much more useful for the user of the system. All of the pages within the Binders whether in the format of Lists, 8 ½ by 11 Forms, Reports, etc. are identical and consistent both in electronic form on the computer screen as well as in hard copy form. On the screen, the forms appear as a piece of paper which is clamped in a binder with rings and when that is printed, it looks identical to the form on the computer screen including the space to punch holes for placing into a physical binder. The system includes various types of binders for various types of uses. The types of binders include but are not limited to, FileBinders including Phase Specific Binders, Category Specific Binders, File Type Specific Binders, ItemBinders for various information about the E-Items stored within the system as well as ReportBinders that contain reports of various types for the Files and Items within the system. The array of types and configurations of the Binders has virtually no limit and will evolve as the system is utilized for virtually an unlimited variety of applications. The letters on the outside of the binders correspond to specific attributes or descriptors. For instance, one could expect to find a listing of all live files in the second binder on the first shelf, or a list of all project files in the third binder on the third shelf. In FIG. 13, portion 360 shows the navigation buttons that are used to perform various functions as indicated by the labels on the individual buttons. Portion 361 of FIG. 13 depicts the bookshelf section of the screen which contains various shelves on which the various Binders are stored. On the electronic screen, each of the individual Binders, is actually a button which, when activated by a click of a mouse or any other appropriate input device, takes the user to a screen indicating an open binder as shown in FIG. 14 of the drawings.

Figure 14:
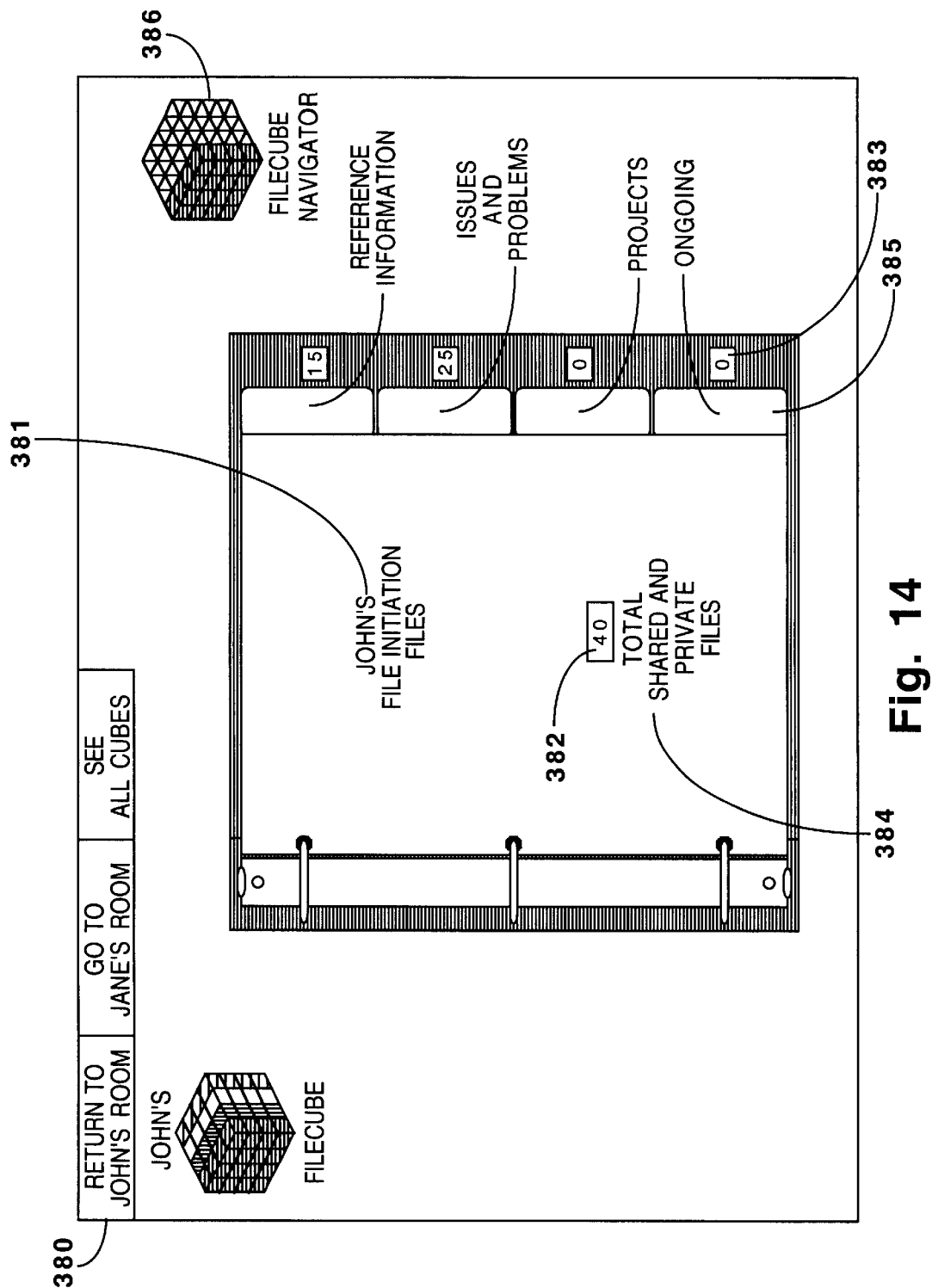
FIG. 14 is a screen depicting an open virtual binder with various tabs corresponding to the drawers of the left most virtual drawers on the front side face of a user's filecube.

FIG. 14 depicts the screen which shows an open Binder used in a preferred embodiment of the present invention. In this example, the binder corresponds to the first binder on the first shelf of FIG. 13. Portion 380 of FIG. 14 shows the navigation buttons that are used to perform various functions as indicated by the labels on the individual buttons. Portion 381 shows that the binder is personalized to show the first name of either the current user or visited user as appropriate. Portion 382 shows the FileQuantity Calculator Field which indicates the total number of Files included or listed in this particular binder. Portion 383 shows the FileQuantity Calculator Fields which indicate the total number of Files in each of the individual tabbed sections in this particular binder. Portion 384 shows the field which indicates the description of the files in this particular binder, which in this case shows "Total Shared and Private Files". Portion 385 indicates the Binder Tabs which, on the electronic screen, are actually buttons that when activated by a click of a mouse or any other appropriate input device, take the user to other screens depicting either lists, forms, reports, etc. as appropriate for that particular binder and as indicated by the labels on the File Tabs. For instance, clicking on the "Ongoing" tab button would allow the user to see a list of all Initiation-Ongoing files and allow the generation of relevant forms and reports regarding this particular group of files.

Portion 386 of FIG. 13 is a field which indicates the Filecube Navigator interactive icon which is used to indicate the location of individual Files and Items as well as various groupings of Files and Items within the Filecube System. In this case, as shown on FIG. 13, the Filecube Navigator indicates a "wall" configuration grouping of sub-cubes or column of drawers which means that all of the Files in the File Initiation Phase are included in this binder. The Navigator Icon reflects the appropriate grouping of Files and Items that are being viewed.

Figure 15:
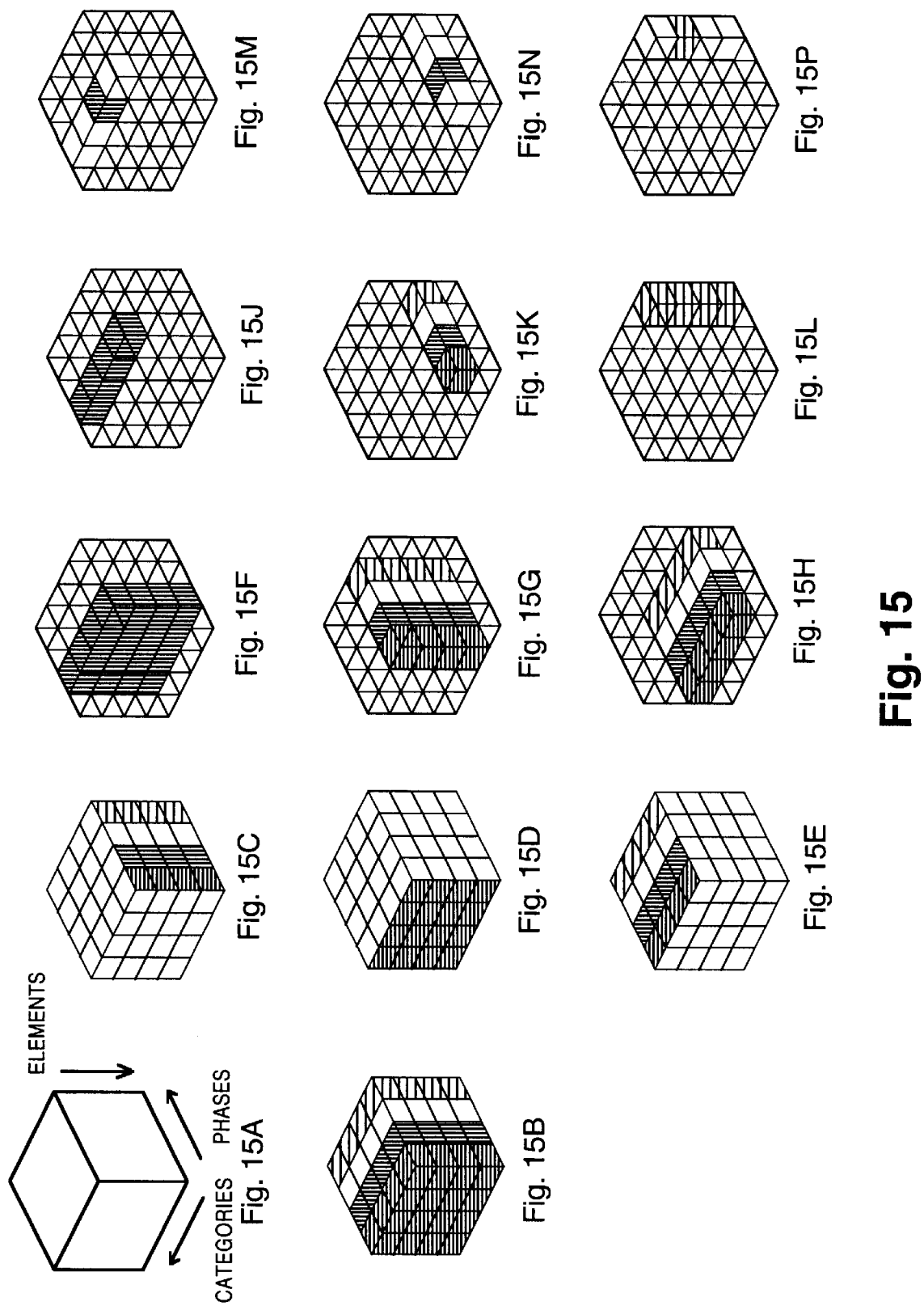
FIG. 15A–P are generally drawings indicating some of the various possible retrievable groupings of virtual file folders as they would be depicted in the filecube navigator according to one aspect of the invention.
FIG. 15B is a drawing of a full filecube containing all files within one user's filecube in one aspect of the invention.
FIG. 15C is a drawing of a filecube navigator indicating that a user has chosen to view the front side face of a filecube.
FIG. 15D is a drawing of a filecube navigator indicating that a user has chosen to view the left side face of a filecube.
FIG. 15E is a drawing of a filecube navigator indicating that a user has chosen to view the top side face of a filecube.
FIG. 15F is a drawing of a filecube navigator indicating that a user has chosen to view the second "wall" or stack of drawers on the front side face of a filecube (all live file folders in the illustrated example).
FIG. 15G is a drawing of a filecube navigator indicating that a user has chosen to view the second "wall" or stack of drawers on the left side face of a filecube (all career and education file folders in the illustrated example).
FIG. 15H is a drawing of a filecube navigator indicating that a user has chosen to view the second "wall" or stack of drawers on the left side face of a filecube (all project file folders in the illustrated example).
FIG. 15J is a drawing of a filecube navigator indicating that a user has chosen to view the first "strand" or drawer in the second column on the front side face of a filecube (all Live—Reference Information file folders in the illustrated example).
FIG. 15K is a drawing of a filecube navigator indicating that a user has chosen to view the third "strand" or drawer in the first column on the left side face of a filecube (all Home/Family—Project file folders in the illustrated example).
FIG. 15L is a drawing of a filecube navigator indicating that a user has chosen to view the first "strand" or drawer in the forth column on the top side face of a filecube (all Archived—Home/Family file folders in the illustrated example).
FIG. 15M is a drawing of a filecube navigator indicating that a user has chosen to approach the front side face of the filecube and view the second box in the first drawer in the second column (all Live—Career and Education—Reference Information file folders in the illustrated example).
FIG. 15N is a drawing of a filecube navigator indicating that a user has chosen to approach the left side face of the filecube and view the second box in the third drawer in the first column (all Live—Home and Family—Project file folders in the illustrated example).

FIG. 15 is a group of drawings indicating some of the various possible combinations of file attributes or descriptors of File Phase, File Type and File Category as they are depicted in the Filecube Navigator in a preferred embodiment of the invention. FIG. 15A is a drawing of the Generic Cube System which is used as a basis for the Filecube System as well as other Cube and Sub-Cube storage and navigation schemes that are utilized in a three dimensional address structure of the preferred embodiment of the invention. Some examples of other Cubes include but are not limited to, IssueCube, ProjectCube, ProblemCube, etc. FIG. 15B is a drawing of the complete or whole Filecube Navigator indicating the full Filecube containing all files within the Filecube System in a preferred embodiment of the invention (see FIG. 10). FIG. 15C is a drawing of the Filecube Navigator indicating a view of the front side face of the Filecube in a preferred embodiment of the invention (see FIG. 11A). FIG. 15D is a drawing of the Filecube Navigator indicating a view of the left side of the Filecube in a preferred embodiment of the invention (see FIG. 11B). FIG. 15E is a drawing of the Filecube Navigator indicating a view of the top side of the Filecube in a preferred embodiment of the invention (see FIG. 11C). FIG. 15F is a drawing of the Filecube Navigator indicating a specific "wall" grouping of sub-cubes or column of drawers by File Phase (in this case indicating "all Live files") in a preferred embodiment of the invention. FIG. 15G is a drawing of the Filecube Navigator indicating a specific "wall" grouping of sub-cubes or column of drawers by File Category (in this case indicating "all Category 2 or Career and Education files") in a preferred embodiment of the invention. FIG. 15H is a drawing of the Filecube Navigator indicating a specific "wall" grouping of sub-cubes or row of drawers by File Type (in this case indicating "all Project files") in a preferred embodiment of the invention. FIG. 15J is a drawing of the Filecube Navigator indicating a specific Front side "strand" grouping of sub-cubes or drawer by File Phase and File Type (in this case indicating all "Live—Reference Information" files). FIG. 15K is a drawing of the Filecube Navigator indicating a specific left side drawer or "strand" grouping of sub-cubes by File Category and File Type (in this case indicating all "Home/Family—Project" files). FIG. 15L is a drawing of the Filecube Navigator indicating a specific top side drawer or "strand" grouping of sub-cubes by Phase and File Category descriptors (in this case indicating all "Archived—Home/Family" files). FIG. 15M is a drawing of the Filecube Navigator indicating a specific "sub-cube" or box for a specific File Phase, File Type and File Category as viewed from the front side of the Filecube (in this case indicating all "Live—Career and Education—Reference Information" files in the Live—Reference Information file drawer). FIG. 15N is a drawing of the Filecube Navigator indicating a specific box or "sub-cube" for a specific File Phase, File Type and File Category as viewed from the left side of the Filecube (in this case indicating all "Live—Home and Family—Project" files in the Home/Family—Project drawer of files). FIG. 15P is a drawing of the Filecube Navigator indicating a specific box of files or "sub-cube" for a specific File Phase, File Type and File Category as viewed from the top side of the Filecube (in this case indicating all "Discarded—Home and Family—Issue and Problem" files). It should be noted that FIG. 15 provides examples of various configurations and combinations of the Filecube Navigator Interactive Icon utilized by the 4 by 4 by 4 configuration of the Cube used in this example in a preferred embodiment of the present invention. It should also be noted that other three dimensional configurations will have different numbers and types of configurations and combinations.

Figure 16B:
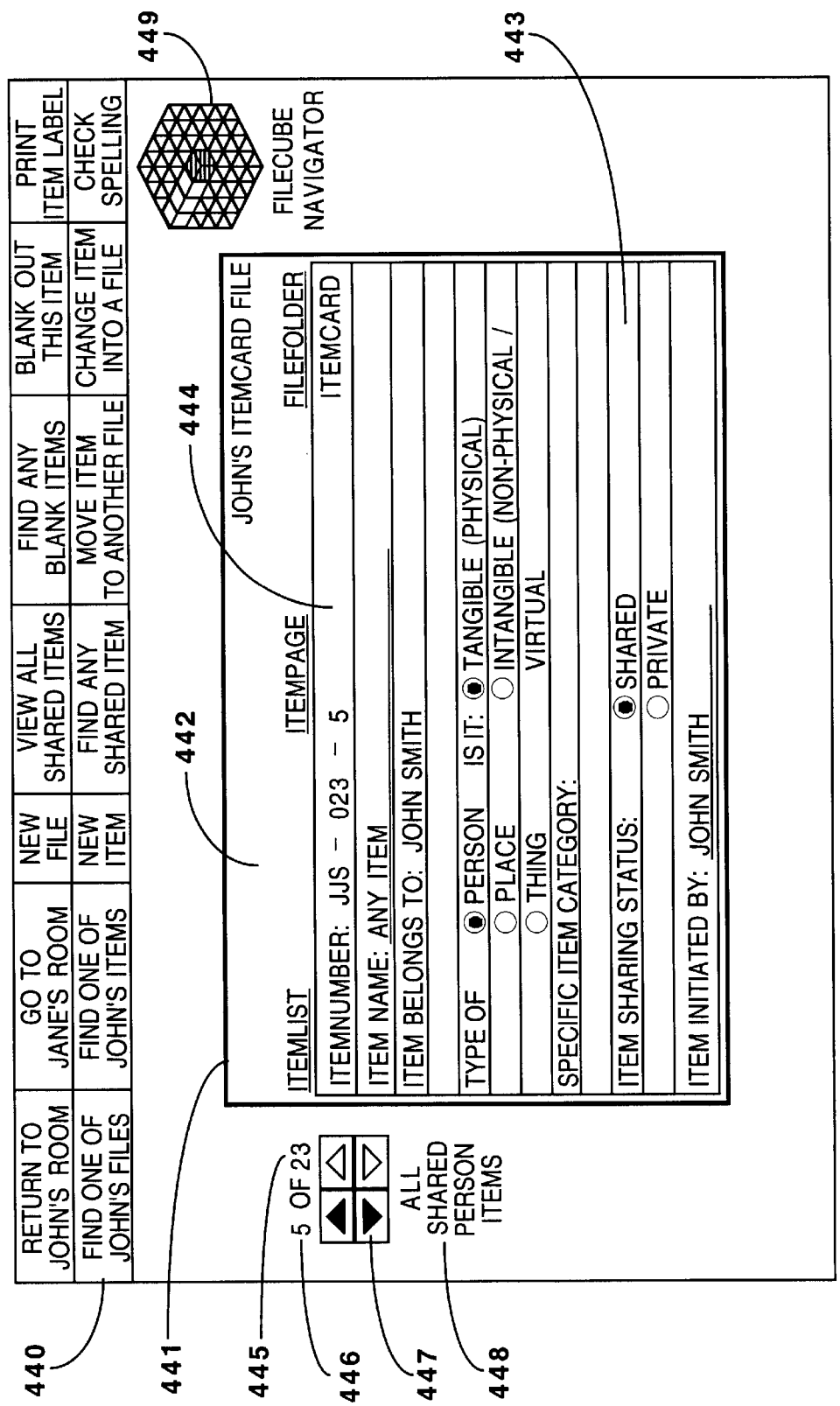
FIG. 16B is a drawing that depicts an example itemcard screen relating to one item of information according to one aspect of the invention.

FIG. 16A depicts a typical open Itemcard drawer screen with ItemCard Tabs which could be accessed by clicking on the "S" index card drawer 108 of FIG. 6. The open ItemCard drawer with tabs should be parallel and analogous to an ItemCard drawer in that persons physical room or office if that person chooses to utilize physical/hard copy Itemcards. As can be seen in FIG. 16A, the three types of Items, those relating to Persons, Places and Things are depicted on the ItemCard Tab labels. On the electronic screen, the ItemCard Tabs portion 420, are actually buttons which when activated by a click of a mouse or any other appropriate input device, take the user to other screens as indicated by the labels on the ItemCard Tabs. In this case, the ItemCard Tab labeled "Persons" will take the user to an Itemcard screen as shown in FIG. 16B of the drawings. The screens to which the tab buttons allow to navigate are completely parallel with the physical ItemCard drawer that the user will have, if desired, to store his or her individual Itemcards thus making the interface and navigation extremely easy to understand and use. Portion 421 of FIG. 16A indicates the ItemQuantity Calculator Field that indicates the total number or count of Items that are stored within this particular tabbed section. Portion 422 of FIG. 16B is a field which indicates specifically the type of grouping of the Items stored within this particular tabbed section, which in this case indicates the grouping of "Shared Items".

FIG. 16B depicts a typical ItemCard screen within a preferred embodiment of the invention. This ItemCard is parallel and analogous to the user's physical numerical ItemCards that are stored within the ItemCard File. Portion 440 of FIG. 16B shows the navigation buttons that are used to perform various functions as indicated by the labels on the individual buttons. Background portion 441 of FIG. 16B indicates the gray colored ItemCard drawer that the Item-Cards are stored within, which is the same color as the drawer 108 in FIG. 6. On the electronic screen, the upper portion of the drawer as indicated by portion 442, is actually a button which, when activated by a click of a mouse or any other appropriate input device, returns the user to the screen indicating the ItemCard Tabs as shown in FIG. 16A of the drawings. Portion 443 of FIG. 16B, shows the ItemCard which is parallel and analogous to the physical ItemCards utilized within a specific embodiment of the invention. The upper area of the Item Card as indicated in portion 444, of FIG. 16B, contains the Item Number which has been assigned to that particular Item based on the particular File that the Item is stored within. Just below that area is a field which indicates the Name of the particular Item. Other key information about the Item is included on the Itemcard as appropriate for the particular type of Item and/or the specific application of the system. In this case, the information shown includes, who the Item belongs to, What the Item is or the type of Item, whether this Item is Tangible (Physical) or Intangible (Non-Physical/Virtual), the Specific Item Category, the Item's sharing status based on the file sharing status of the File that the Item is stored within, and the name of the person who Initiated this particular Item. Other types of information may also be included as required for other possible applications of the present invention. Portion 445 of FIG. 16B indicates the ItemQuantity Calculator Field that indicates the total number or count of Items that have been found in this particular "Find" or inquiry. Portion 446 of FIG. 16B is the field that indicates the number of that particular Item being viewed within the group of items that have been found in this particular "Find" or inquiry. Portion 447 of FIG. 16B shows the indexing buttons that are used to scroll through the group of Items found in this particular "Find" or inquiry. Portion 448 of FIG. 16B is a field which indicates specifically the type of grouping of the Items found in this particular "Find" or inquiry, which in this case, indicates the grouping of "All Shared Person Items". Portion 449 of FIG. 16B is a field which indicates the Filecube Navigator interactive icon which is used to indicate the location of individual Items as well as various groupings of Items within the system. The Filecube Navigator Icon automatically changes to reflect the current status of the File Attributes of File Phase, File Type and File Category of any specific File or Item or groupings of Files and Items. Examples of different combinations of File Attributes as indicated by the Filecube Navigator are illustrated in FIGS. 15A through 15P in the drawings.

FIG. 17 depicts a typical FileList screen within a preferred embodiment of the invention, which could be accessed through the binders of FIG. 13 or the "Filelist" button 193 of FIG. 9B. This FileList is parallel and analogous to the user's physical/hard copy FileList printouts that are available with the system. Various listings of Files and/or Items can be viewed and/or printed based on the specific groupings that are being viewed by the user. Portion 460 of FIG. 17 shows the navigation buttons that are used to perform various functions as indicated by the labels on the individual buttons. Portion 461, indicates that the FileList is personalized based on the current user or visited user for which the list has been generated. Portion 462, shows a field that automatically indicates how the FileList currently being viewed and/or printed, has been sorted. The underlined headings, portion 463, at the top of the columns on the page, are actually buttons which when activated by a click of a mouse or any other appropriate input device, sort the listing by the criteria indicated by the heading name, thus changing this "sorted by" indicator field. Portion 464 of FIG. 17 is a field which indicates specifically the type of grouping of the Files found in this particular "Find" or inquiry, which in this case, it indicates the grouping of "All Shared Files". Portion 465 of FIG. 17 is a field which indicates the Filecube Navigator interactive icon which is used to indicate the location of individual Files and Items as well as various groupings of Files and Items within the system. Portion 466 of FIG. 17 is a FileFolder icon which when activated by a click of a mouse or any other appropriate input device, takes the user immediately to the FileFolder screen similar to that in FIG. 9B, for the particular E-Number that was chosen. The body of the list, Portion 467, contains the information fields that contain the information for the specific files and/or items. This information will vary between the various FileList screens depending on the context of the information being viewed on the particular list. Also, most information fields on the list can be modified without going back to other screens such as the FileFolder screen. Portion 468 of FIG. 17 indicates the ItemQuantity Calculator Field that indicates the total number or count of E-Items that are contained within this particular listed file folder. It should be noted that the quantity of Items automatically changes based on any additions or removals of items to or from that particular file. The FileCard icon, portion 469 of FIG. 17, indicates a button which on the electronic screen, when activated by a mouse or some other input device, takes the user directly to a screen similar to that shown in FIG. 16B of the drawings, which indicates all of the Items stored within that particular file folder. It should be noted that all FileList form printouts are identical between what appears on the computer screen vs. the hard copy printouts which are formatted to allow placement of the forms into hardcopy Binders that are analogous to the virtual binders of FIG. 13. Thus, all lists are parallel and analogous between the virtual forms on the computer screen as well as the hard copy forms that are printed by the system.

FIG. 18 depicts a typical FilePage screen within a preferred embodiment of the present invention that could be accessed through the "FilePage" button 193 of FIG. 9B. This FilePage form, is parallel and analogous to the user's physical/hard copy FilePage printouts that are available with the system, and preferably included as the first sheet in each hardcopy file. Various types of forms can viewed and/or printed based on the specific groupings of Files and/or Items that are being viewed by the user. Also, various types of forms can viewed and/or printed based on the specific focus being viewed by the user. Examples of different types of FilePage forms would be forms designed specifically for example, Issues and /Problems, forms designed specifically for Projects, etc. Portion 480 of FIG. 18 shows the navigation buttons that are used to perform various self explanatory functions as indicated by the labels on the individual buttons. Portion 481, indicates that the FilePage is personalized based on the current user or visited user for which the FilePage has been generated. Portion 482 of FIG. 18 is a field which indicates the Filecube Navigator interactive icon which is used to indicate that the user is currently in the Initiation—Reference Information drawer of files. The body of the FilePage form, Portion 483, contains the information fields which contain the descriptors for that specific file and/or item. This information will vary between the various FilePage screens depending on the context of the information being viewed on the particular form. Also, most information fields on the form can be modified (file relocated) without going back to other screens such as the FileFolder screen. It should be noted that all FilePage form printouts are identical between what appears on the computer screen vs. the hard copy printouts which are formatted to allow placement of the forms into hardcopy Binders if so desired by the user. Thus, all forms are parallel and analogous between the virtual forms on the computer screen as well as the hard copy forms that are printed by the system.

FIG. 19A, 19B, 19C, 19D depict a high level flow chart diagram which outlines the steps that are taken to start the system software and sign on as current user, as well as the steps that can be taken to access various information in the form of FileLists, FilePages, etc. contained in the Filecube within a preferred embodiment of the present invention. It should be noted that this diagram focuses on accessing information within the Filecube aspect of the present invention and that numerous other flow chart diagrams could be presented to indicate all of the other information access steps, navigation steps, etc. that can be performed within the system.

Figure 19A:
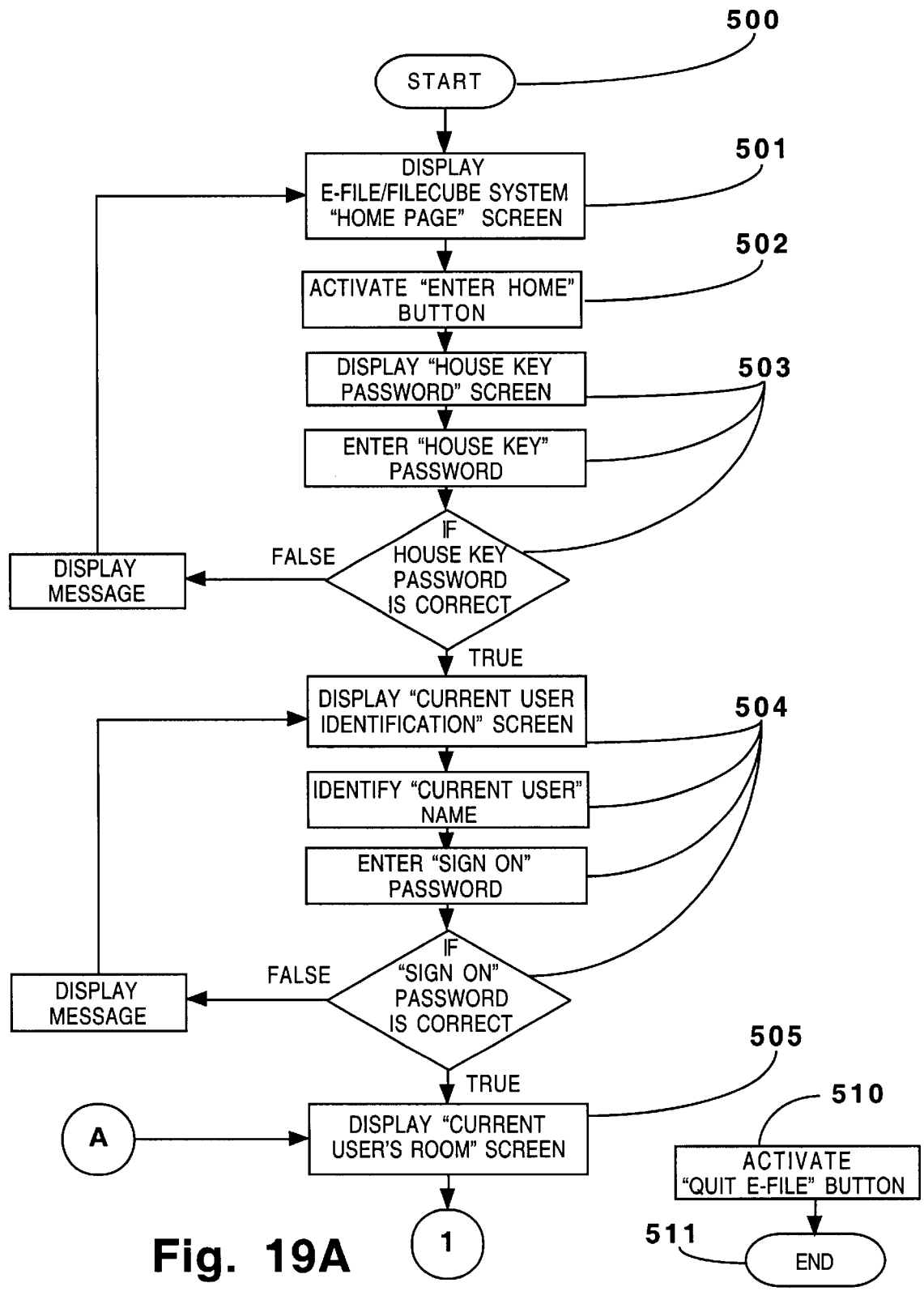
FIG. 19A–D are a high level software flow diagram drawing that depicts the steps taken to access Files and Items in the Filecube within a preferred embodiment of the invention.

FIG. 19A, Portion 500, indicates the startup of the software program which typically would done by activating with a mouse or some other input device, the system Icon on the user's computer screen. Portion 501 indicates that a Home Page screen similar to the one shown in FIG. 5 of the drawings is displayed once the system has started. Portion 502 indicates that to enter the system, the user will activate the "Enter Home" button, Portion 81, shown on the Home Page screen in FIG. 5. Portion 503 indicates that if a "House Key" Password has been designated for the system, the user must enter the correct password to gain access to the files in the system. Portion 504 indicates that the current user is asked to identify his or her name and then is asked to provide their "Sign On" Password to gain access into the system. Once the user has entered the system and signed on correctly, the user is taken to that user's room/office screen , the Current User's Room" Screen, similar to the screen shown in FIG. 6 of the drawings. Displaying the "Current User's Room" Screen is the step on the flow chart diagram of FIG. 19A indicated as portion 505.

Figure 19B:
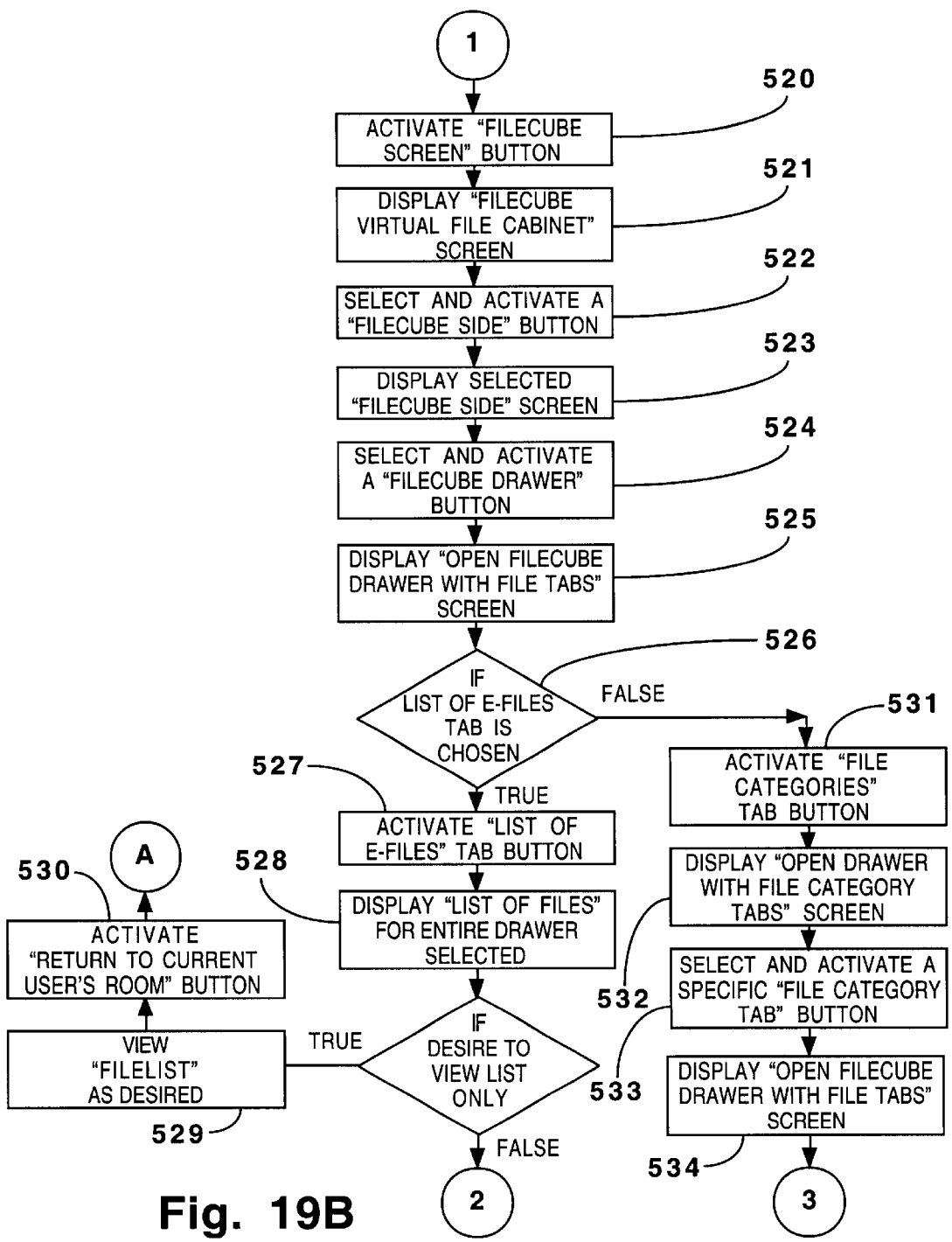
Figure 19C:
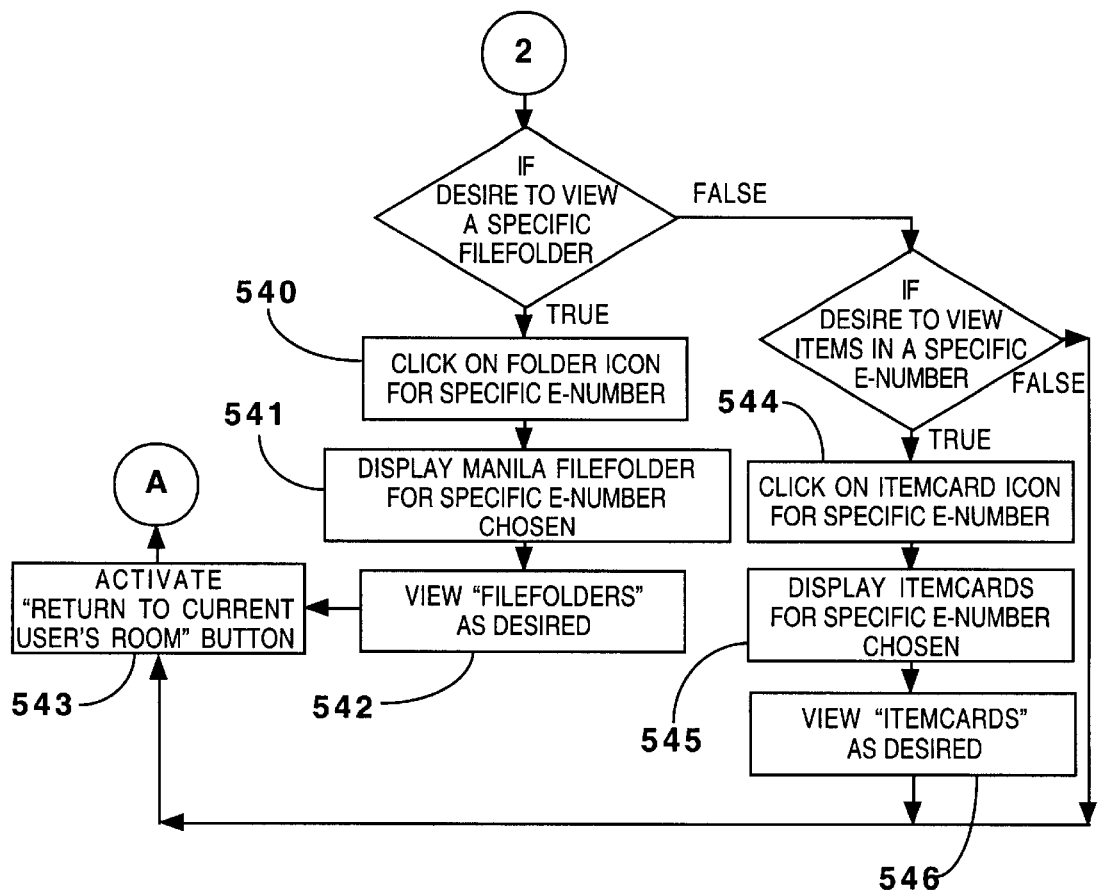
Figure 19D:
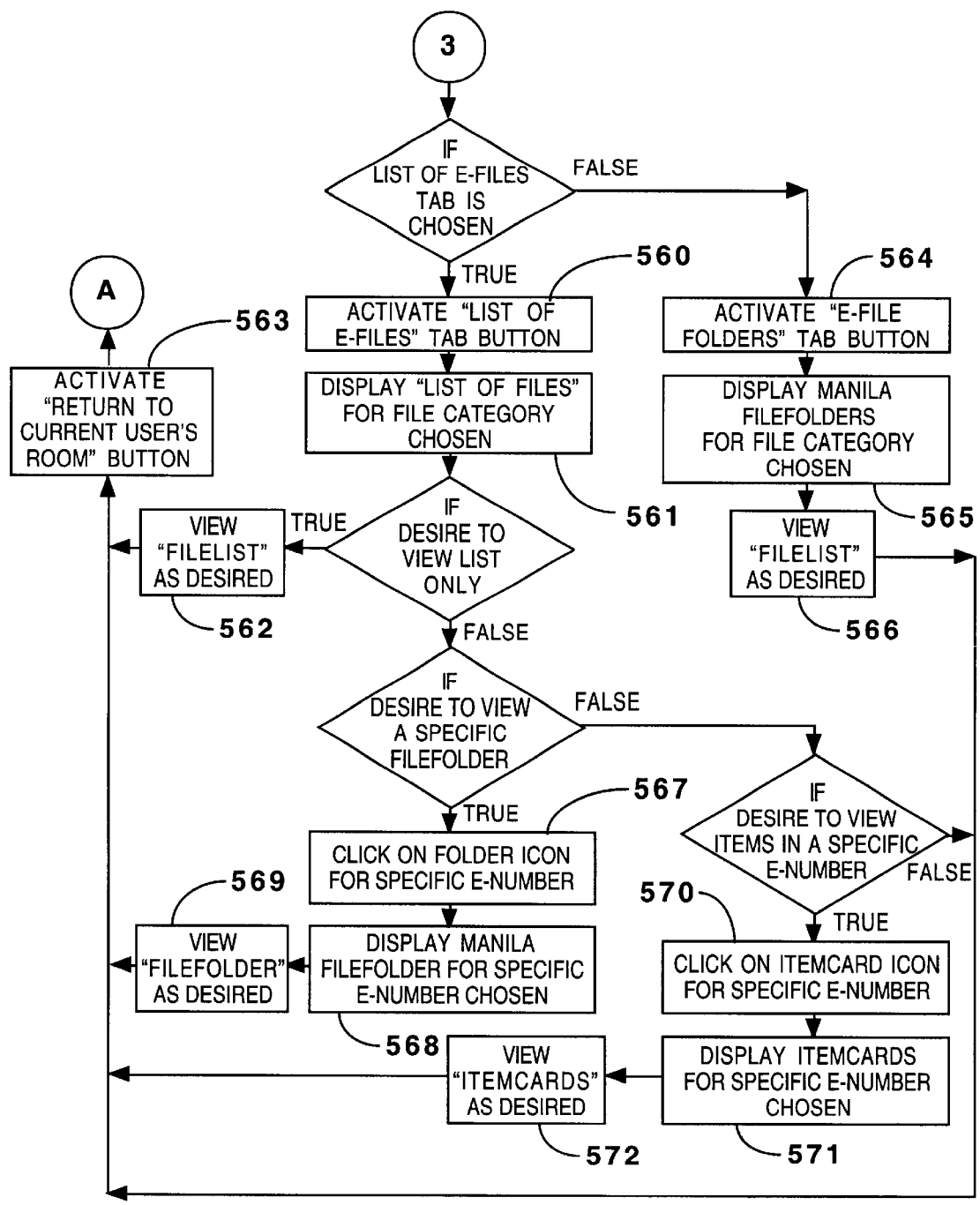

FIG. 19B, Portion 520, indicates that to gain access to the Filecube Virtual File Cabinet, the user must activate the "File Cube" Screen Button which is indicated as Portion 112 on FIG. 6 of the drawings. Portion 521 of FIG. 19B indicates that once the "File Cube" Screen Button has been activated, the user is taken to the "Filecube Virtual File Cabinet" Screen similar to the screen shown in FIG. 10 of the drawings. Portion 522 of FIG. 19B indicates that the user must select which side of the Filecube Virtual File Cabinet that the user wants to view. If the user wishes to view the "Front" side of the Filecube, the user will click on the front side of the cube as indicated in Portion 202 of FIG. 10. If the user wishes to view the "Left" side of the Filecube, the user will click on the left side of the cube as indicated in Portion 203 of FIG. 10. If the user wishes to view the "Top" side of the Filecube, the user will click on the top side of the cube as indicated in Portion 204 of FIG. 10. For this example, it will be assumed that the user has selected the "Front" side of the Filecube. Portion 523 of FIG. 19B indicates that once a "File Cube" Side Button has been activated, Portion 202 of FIG. 10 in this example, the user is taken to the "Filecube Virtual File Cabinet" Screen similar to the one shown in FIG. 11A of the drawings. Portion 524 of FIG. 19B indicates that the user must select one of the file drawers as shown in Portion 221 of FIG. 11A and open that drawer by clicking on the front face of that particular drawer. Clicking on the front of the drawer will open that drawer and, as indicated Portion 525 of FIG. 19B, an open Filecube drawer screen similar to the one shown in FIG. 12A will be displayed. Portion 526 of FIG. 19B indicates that the user then makes a choice of whether to view a list of all Files in that particular drawer or view the individual Category Tabs behind the File Categories tab shown in FIG. 12A. If the user desires to view the list, the "List of Files" Tab on FIG. 12A is activated by clicking on it with a mouse or some other input device as indicated in Portion 527 of FIG. 19B. Portion 528 indicates that as a result, a list of files on a "FileList" screen similar to the one shown in FIG. 17 of the drawings, is displayed. If the user chooses to simply view the list as indicated in Portion 529, or possibly print it, the user can do so and then return to the user's room by activating the "Return to Room" button as indicated in Portion 530 of FIG. 19B. As a result, the user will be taken back to that user's room and the "Current User's Room" Screen will be displayed as indicated in Portion 505 of FIG. 19A. If however, the user chooses to directly view either a specific FileFolder or a specific ltemCard on the list the user may do so as indicated in FIG. 19C of the drawings. Portion 540 of FIG. 19C indicates that to view any specific FileFolder, the user simply clicks on the FileFolder Icon as shown in Portion 466 of FIG. 17 of the drawings. As a result, as indicated in Portion 541 of FIG. 19C, a FileFolder screen similar the one shown in FIG. 12D is displayed. After the user views the file folders as indicated in Portion 542, the user can then return to the users room by activating the "Return to Room" button on FIG. 12D as indicated in Portion 543 of FIG. 19C. As a result, the user will be taken back to that user's room and the "Current User's Room" Screen will be displayed as indicated in Portion 505 of FIG. 19A. Portion 544 of FIG. 19C indicates that to view all of the ltemCards within a particular file folder, the user simply clicks on the ItemCard Icon as shown in Portion 469 of FIG. 17 of the drawings. As a result, as indicated in Portion 545 of FIG. 19C, an ItemCard screen similar the one shown in FIG. 16B is displayed. The user will then be able to view the cards within that particular folder. After the user views the ItemCards as indicated in Portion 546, the user can then return to the users room by activating the "Return to Room" button on FIG. 16B as indicated in Portion 543 of FIG. 19C. As a result, the user will be taken back to that user's room and the "Current User's Room" Screen will be displayed as indicated in Portion 505 of FIG. 19A. Similarly, if as indicated in Portion 526 of FIG. 19B, the user chooses to view Files and/or Items for a specific File Category within a selected file drawer rather than those for the entire drawer, the user will activate the tab button on FIG. 12A of the drawings labeled as "File Categories" as indicated in Portion 531 of FIG. 19B. When this button is activated, Portion 532 indicates that a screen similar to that shown in FIG. 12B will be displayed. To view all of the Files and/or Items within a specific category, the user will click on one of the file category tab buttons as shown on FIG. 12B as indicated in Portion 533 of FIG. 19B. When the tab button is activated, a screen with File Tabs similar to the one shown in FIG. 12C will be displayed as indicated in Portion 534 of FIG. 19B. If the user desires to view the list of files, the "List of Files" Tab on FIG. 12C is activated by clicking on it with a mouse or some other input device as indicated in Portion 560 of FIG. 19D. Portion 561 indicates that as a result, a list of files on a "FileList" screen similar to the one shown in FIG. 17 of the drawings, is displayed. If the user chooses to simply view the list as indicated in Portion 562, or possibly print it, the user can do so and then return to the user's room by activating the "Return to Room" button as indicated in Portion 563 of FIG. 19D. As a result, the user will be taken back to that user's room and the "Current User's Room" Screen will be displayed as indicated in Portion 505 of FIG. 19A. If however, the user chooses to view the file folders, the user will activate the tab button on FIG. 12C of the drawings labeled as "E-File Folders" as indicated in Portion 564 of FIG. 19D. When this button is activated, Portion 565 indicates that a screen similar to that shown in FIG. 12D will be displayed. After the user views the file folders as indicated in Portion 566 of FIG. 12D, the user can then return to the users room by activating the "Return to Room" button as indicated in Portion 563 of FIG. 19D. As a result, the user will be taken back to that user's room and the "Current Users Room" Screen will be displayed as indicated in Portion 505 of FIG. 19A. Portion 567 of FIG. 19D indicates that to view any specific FileFolder directly from the list as shown in FIG. 17, the user simply clicks on the FileFolder Icon as shown in Portion 466 of FIG. 17. As a result, as indicated in Portion 568 of FIG. 19D, a FileFolder screen similar the one shown in FIG. 12D is displayed. After the user views the file folders as indicated in Portion 569, the user can then return to the user's room by activating the "Return to Room" button as indicated in Portion 563 of FIG. 19D. As a result, the user will be taken back to that user's room and the "Current User's Room" Screen will be displayed as indicated in Portion 505 of FIG. 19A. Portion 570 of FIG. 19D indicates that to view all of the ItemCards within a particular file folder FileFolder directly from the list as shown in FIG. 17, the user simply clicks on the ItemCard Icon as shown in Portion 469 of FIG. 17. As a result, as indicated in Portion 571 of FIG. 19D, an ItemCard screen similar the one shown in FIG. 16B is displayed. The user will then be able to view the cards within that particular folder. After the user views the ItemCards as indicated in Portion 572 of FIG. 19D, the user can then return to the user's room by activating the "Return to Room" button as indicated in Portion 563 of FIG. 19D. As a result, the user will be taken back to that user's room and the "Current User's Room" Screen will be displayed as indicated in Portion 505 of FIG. 19A.

To end the session and quit the system, as indicated in Portion 510 of FIG. 19A, the user will activate the button labeled "Quit E-File" as shown on the "Current User's Room" screen as shown in FIG. 6 of the drawings. The session will end as indicated in Portion 511 of FIG. 19A and the system software will shut down.

Network Applicability of the Invention

Because of the fact that the system was conceived and developed in a multiple user networked environment (LAN) for the shared access to information stored in a networked central file, the system easily, intuitively and logically extends to the Internet/World Wide Web since the Web is in essence nothing more than a world wide ubiquitous network identical to the LAN's and WAN's of the past. Thus the system simply treats the Internet as one large world wide network which facilitates the expansion of the basic core principles of the system to the entire world of networked computers. The method, system and apparatus of the present invention are designed to compliment and work in conjunction with the Internet and the Internet search engines to provide a system for the organization, storage, retrieval, and purging of the electronic information obtained from or contained on the Internet in the form of web pages, URL's, etc. in a manner identical to that of all other information organized and stored within the system. Thus, the system, is designed to take full advantage of the present as well as future networking possibilities and capabilities being developed for desktop computers, laptop computers, PDA's, Web TV's, etc. whether connected through conventional modems, phone or cable networks and/or wireless communication systems including the satellite systems that are currently being planned and implemented as well as other possible future networking and connection technologies.

The concept of a Lifetime Central File:

To facilitate a consistent and long term approach to improved information management and improved record keeping, the concept of a Lifetime Central File is incorporated into the present invention. The Central Filing System or "Central File" for information, data, documents, etc. provides both the owner of the information, as well as others, the knowledge of where the information is stored, plus the total ability to find anything and everything at a moments notice. For all information in hard copy form, the physical Central File consists of a central file drawer or cabinet for all Items stored in E-Numbered physical file folders. For all information in electronic form, the electronic Central File consists of an electronic central file drawer or cabinet for all Items stored in E-Numbered electronic file folders. This simple parallel system provides for nearly instantaneous retrieval by anyone of any and all Files and Items whether they are hard copy or electronic or both. A goal of the present invention is to provide the user of the system with a feeling of "comfort" and a feeling of being in "total control" because the need to look for something or the need for trying to remember where something was placed is totally eliminated with the system of the present invention.

Mobility of the Central File

Another aspect of the present invention is the ability to easily move information (Files and Items) both physically and electronically to another location and into another system. An example that would illustrate the need to move information would be the Family product which is designed specifically for a Family as a unit or "Enterprise" which consists of a group of family members or individual Entities. When one of the family members, one of the children for example, grow up, move out and possibly get married, the present invention would provide a method and a system to easily move that person's information (Files and Items) both physical and electronic and automatically incorporate them into another Family System. Thus, two people (Entities) could get married and with the System, very easily unite their information—merge their filecubes—into a new Family System (Enterprise) and have the ability to easily add other family members, children for example, as the family grows. Thus, the system provides for a continuous progression from generation to generation, based on the lifetime central file concept, which protects and preserves valuable information, files, items, assets, etc. with a very powerful yet intuitive and easy to use system which the entire family can use. This ability to move and combine Files and Items from different entities pertains not only to the personal/family applications discussed above but other applications as well including various business applications, etc.

A totally parallel system

The System of the present invention provides a totally parallel, flexible and consistent system for all combinations of either Hard copy or electronic information or both as well as the flexibility for users to change their preferences at any time as they continue to use the system. For instance, some users may prefer to scan hardcopy documents and store, retrieve and use only the virtual electronic copy of the document in the virtual filecube system. Others may not have any intangible information to store and may use the system as little more than a way to organize store and retrieve physical documents and things.

Access, security and span of use

The present invention is designed for the full span of use from a single user on an individual computer to a small number of users on a small local area network (LAN) or an Intranet, to a larger number of users on a larger wide area network (WAN) or an Extranet, to virtually an unlimited number of users on the Internet itself. The flexibility of the system incorporates the ability to provide both registered users as well as visitors access to Files and Items based on various levels of passworded access selected by both the administrator of a specific system as well as all of the registered users/file owners within that system. The system includes a comprehensive but intuitive and easy to understand and use system of keys and passwords which allows for complete control of access of both shared as well as private files and items that are contained within the system. The system is also designed for either local or remote access to Files and Items by both file owners/registered users as well as visitors, based on the levels of access allowed by the file owners/registered users.

The Filecube Virtual File Cabinet

The Filecube virtual file cabinet system introduces a totally new level of intuitive, easy to understand yet powerful organization, storage and retrieval capabilities for all types of information whether in hard copy or in electronic form. The Filecube System is a unique system which uses an extremely simple but powerful building block approach to visually and graphically portray the overall organizational structure of all of the Files and Items within system. It does this in part by retaining some aspects of conventional filing systems, i.e. a filing cabinet with drawers of files, but organizing the files in a three dimensional address structure that would be virtually impossible to build and/or use in the physical world. Each of the three dimensions of the Filecube clearly portrays an important aspect of the overall file organization, storage and retrieval system. The Filecube System provides the organizational core around which all products are designed thus providing a consistent and easy to use interface for all related systems regardless of size or specific application of use. In addition, the Filecube graphics form the interactive computer Icons which are used to provide a simple and easy to use graphical user interface (GUI) to manipulate and retrieve all files and items within the system with a simple point and click of a mouse based on technology currently in use or future interface technologies including voice recognition, etc. The Filecube System provides the user with a feeling of security and a sense of being in total control, because all types of Files and Items, all reference information, all issues of concern, all problems, all projects and all ongoing responsibilities that are stored within the Filecube System are instantly accessible for immediate use.

A new method for organizing and managing virtually all aspects of our lives

In addition to providing an intuitive and easy to use organization, storage and retrieval system, the Filecube virtual file cabinet provides a consistent framework for improved management of all aspects of our lives including personal, family, work, etc. The Filecube Virtual File Cabinet System provides the ability for users to instantly focus on specific aspects of their lives or business based on a specific category, a specific type of file, or a specific phase of file as well as any combination of the above. This ability to instantly focus on a specific area and the ability to get instant printouts of either forms specifically designed for that area of focus and/or lists of files and/or items relevant to that specific area of focus facilitates an instant and specific focus that greatly assists the user in planning, organizing and controlling virtually any and all aspects of that person's life.

Also, the system incorporates various FocusManagers designed to assist a user in focusing specifically on for example, goals, tasks, milestones, expenditures, etc. Some examples of specific FocusManagers include but are not limited to; Multiple Files Manager, Individual File Manager, GoalsManager, ProblemSolver, Reference Information Manager, Issues Manager, Problem Manager, Project Manager, Ongoing Responsibilities Manager, etc. These and other interactive FocusManagers utilize various tools including lists, forms, etc. designed for specific areas of focus to enhance and simplify a person's ability to fully utilize the capabilities of the Filecube System.

Familiar metaphors and ease of use

To facilitate true ease of use and a more widespread acceptance and utilization of the system, another goal of the present invention is to provide a total package of graphical user interfaces (GUI) that provide metaphors that are totally consistent with real world objects that are familiar to all and result in a user interface that is very easy to understand and to use by even the most casual computer users or even younger children. The Filecube System utilizes both physical and electronic objects and metaphors that are consistent with objects in common, everyday use and are consistently used in both the physical/hard copy aspects of the system as well as the electronic/computer screen aspects of the system. This helps even casual users to easily understand and accept the system and quickly grow to fully utilize its various features and capabilities with little or no instruction or training or use of complicated instruction manuals. Examples of such objects and metaphors utilized in the system include but are not limited to: File Folders, File Drawers, File cabinets, Index cards, Binders, 8 ½ by 11 forms, 8 ½ by 11 lists, file separators, offices/rooms, hallways with doors, keys and locks for passwords and security, etc. All of these objects are traditional real world objects familiar to everyone and are used consistently and in a parallel fashion between both the physical/hard copy aspects of the system as well as the virtual or electronic aspects of the system making the system extremely easy to use and understand.

It should be noted that, where reference has been made to specific hardware, software and functional elements, these are meant as illustrative only and one of skill in the art may alter such elements without departing from the spirit and intent of the present invention. It should also be noted that, although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. An information organization, storage and retrieval system comprising:
   a computer;
   a memory storage device operably connected to said computer and having stored therein a plurality of virtual file folders that are labeled with different identifiers and contain at least one item of information;
   an input device operably connected to said computer;
   an output device operably connected to said computer;
   means for locating said virtual file folders in a three dimensional address structure having an X-axis with a plurality of first descriptors, a Y-axis with a plurality of second descriptors and a Z-axis with a plurality of third descriptors;
   each of said virtual file folders being classified into one of said first descriptors, one of said second descriptors and one of said third descriptors; and
   said one of said first descriptors, said one of said second descriptors and said one of said third descriptors being attributes of said at least one item of information.

2. The system of claim 1 wherein said means for locating includes means for displaying on said output device a representation of said three dimensional address structure in which each combination of one of said first descriptors, one of said second descriptors and one of said third descriptors is depicted as a different box in a cubical structure.

3. The system of claim 1 further including a plurality of hardcopy file folders, each being marked with one of said different identifiers; and
   each of said hardcopy file folders having a corresponding virtual file folder with an identical identifier.

4. The system of claim 1 wherein said plurality of first descriptors includes different time based file descriptors;
said plurality of second descriptors includes different file type descriptors; and
said plurality of third descriptors includes different file category descriptors.

5. The system of claim 4 wherein said time based file descriptors include initiation file folders, live file folders, archived file folders and discarded file folders; and
said file type descriptors include reference information file folders, issue file folders, project file folders and ongoing file folders.

6. The system of claim 1 wherein said first descriptors are time based and sequentially coupled to the colors blue, green, yellow and red.

7. The system of claim 1 wherein said means for locating includes means for retrieving different groups of said virtual file folders that share at least one of said first descriptors, said second descriptors and said third descriptors in common.

8. The system of claim 1 wherein said identifiers are alpha-numeric and include a plurality of sequential numbers.

9. A method of organizing information to facilitate storage and retrieval comprising the steps of:
   placing a new item of information into a virtual file folder;
   labeling said virtual file folder with an identifier;
   classifying said virtual file folder with a first descriptor, which is one of a plurality of first descriptors, and said first descriptor being an attribute of said new item of information;
   classifying said virtual file folder with a second descriptor, which is one of a plurality of second descriptors, and said second descriptor being an attribute of said new item of information;
   classifying said virtual file folder with a third descriptor, which is one of a plurality of third descriptors, and said third descriptor being an attribute of said new item of information;
   locating said virtual file folder in a three dimensional address structure having an X-axis with said plurality of first descriptors, a Y-axis with said plurality of second descriptors and a Z-axis with said plurality of third descriptors.

10. The method of claim 9 further including a step of displaying a representation of said three dimensional address structure in which each combination of one of said first descriptors, one of said second descriptors and one of said third descriptors is depicted as a different box in a cubical structure.

11. The method of claim 9 including the steps of:
   retrieving existing virtual file folders in a virtual box corresponding to said first descriptor, said second descriptor and said third descriptor;
   determining whether said new item of information belongs in one of said existing virtual file folders;
   if not, then creating a new virtual file folder for said new item of information.

12. The method of claim 9 including the steps of:
   preparing first virtual binders for said plurality of first descriptors that contain lists of virtual file folders classified into each of said first descriptors;
   preparing second virtual binders for said plurality of second descriptors that contain lists of virtual file folders classified into each of said second descriptors; and
   preparing third virtual binders for said plurality of third descriptors that contain lists of virtual file folders classified into each of said first descriptors.

13. The method of claim 9 further comprising the steps of:

merging a plurality of different three dimensional address structures into a single grouped three dimensional address structure; and assigning each of said plurality of different three dimensional address structures to a different entity.

14. The method of claim 9 further comprising the steps of:

retrieving an existing virtual file folder; and relocating said existing virtual file folder into a different virtual box by changing at least one of its said first descriptor, its said second descriptor and its said third descriptor.

15. The method of claim 9 further comprising a step of:

attaching at least one searchable keyword to each virtual file folder which relates to items of information contained in said virtual file.

16. A computer program stored in a memory executable by a processor for organizing, storing and retrieving information, comprising:

means for creating a three dimensional address structure having an X-axis with a plurality of first descriptors, a Y-axis with a plurality of second descriptors and a Z-axis with a plurality of third descriptors;

means for locating virtual file folders in said three dimensional address structure at least in part by classifying each of said virtual file folders with one of said first descriptors, one of said second descriptors and one of said third descriptors;

means for placing an item of information into one of said virtual file folders, and said one of said first descriptors, said one of said second descriptors and said one of said third descriptors being attributes of said item of information; and means for retrieving said virtual file folders.

17. The computer program of claim 16 wherein said means for retrieving includes means for retrieving a virtual box that contains different groups of said virtual file folders that share at least one of said first descriptors, said second descriptors and said third descriptors in common.

18. The computer program of claim 16 further comprising means for attaching searchable keywords to each of said virtual file folders; and means for retrieving a group of virtual file folders that have a keyword that matches a keyword query.

19. The computer program of claim 16 further comprising a means for displaying a representation of said three dimensional address structure in which each combination of one of said first descriptors, one of said second descriptors and one of said third descriptors is depicted as a different box in a cubical structure.

20. The computer program of claim 16 further comprising a means for displaying a file count for a group of file folders having a particular combination of said first descriptors, said second descriptors and said third descriptors.

21. The computer program of claim 16 further comprising means for assigning each of a plurality of different three dimensional address structures to a different entity; and means for merging said plurality of different three dimensional address structures into a single grouped three dimensional address structure.

\* \* \* \* \*